United States Patent
Stewart et al.

(10) Patent No.: US 7,985,456 B2
(45) Date of Patent: Jul. 26, 2011

(54) OXYGEN-SCAVENGING POLYMER BLENDS SUITABLE FOR USE IN PACKAGING

(75) Inventors: Mark Edward Stewart, Kingsport, TN (US); Rodney Scott Armentrout, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 262 days.

(21) Appl. No.: 12/432,288

(22) Filed: Apr. 29, 2009

(65) Prior Publication Data

US 2010/0279048 A1 Nov. 4, 2010

(51) Int. Cl.
*B29D 22/00* (2006.01)
*B29D 23/00* (2006.01)
*B32B 1/08* (2006.01)

(52) U.S. Cl. .................. 428/35.7; 428/36.9; 428/36.92; 428/542.8; 252/188.28; 252/184; 252/399; 252/400.1; 252/400.2; 252/400.21; 252/400.22; 252/400.23; 252/400.24

(58) Field of Classification Search ................. 428/35.7, 428/36.9, 36.92, 542.8; 252/188.28, 184, 252/399, 400.1, 400.2, 400.21, 400.22, 400.23, 252/400.24
See application file for complete search history.

(56) References Cited

U.S. PATENT DOCUMENTS
2007/0066735 A1* 3/2007 Quillen et al. ................. 524/404

FOREIGN PATENT DOCUMENTS
WO WO 2006/025827 * 3/2006

* cited by examiner

*Primary Examiner* — Michael C Miggins
(74) *Attorney, Agent, or Firm* — Oblon, Spivak, McClelland, Maier & Neustadt, L.L.P.

(57) ABSTRACT

Polymer blends are disclosed that comprise one or more polybutadiene homopolymers or copolymers having at least one functionality capable of entering into condensation reactions; one or more polyethylene terephthalate homopolymers or copolymers obtained using a catalyst system comprising aluminum atoms and one or more alkaline earth metal atoms, alkali metal atoms, or alkali compound residues, optionally obtained by a melt-phase polymerization process; and one or more transition metal atoms. The blends are useful for packaging, and exhibit improved oxygen-scavenging activity compared with blends made using many conventional polyethylene terephthalate polymers prepared with conventional catalyst systems.

25 Claims, 22 Drawing Sheets

OXYGEN-SCAVENGING POLYMER BLENDS SUITABLE FOR USE IN PACKAGING

FIELD OF THE INVENTION

The invention relates generally to polymer blends, and in particular, to polymer blends having oxygen-scavenging properties making them suitable for use in the packaging of oxygen-sensitive products.

BACKGROUND OF THE INVENTION

Certain foods, beverages, and other packaged goods—such as beer and fruit juices, certain cosmetics and medicines, and the like—are sensitive to oxygen exposure, and require packages having high oxygen barrier to preserve the freshness of the contents and avoid changes in flavor, texture, or color. For many applications, the oxygen barrier properties of PET homopolymers and copolymers are satisfactory. However, for very oxygen-sensitive products, the oxygen barrier properties of such polymers do not provide adequate protection for the product.

A variety of approaches have been used to enhance the passive barrier properties of PET, including blends with high barrier polymers or additives that decrease the permeability of the resin, incorporation of impermeable fillers, the use of coated or multilayer structures, and copolymerization with comonomers that produce a lower permeability polymer than unmodified PET.

To further reduce the entry of oxygen into the contents of the package, oxygen-scavenging technologies have been developed for PET packages. These may include oxidizable moieties, such as polyamides, polydienes, or polyethers, blended or reacted into PET. Typically, small amounts of transition metal salts, such as cobalt salts of organic acids, are also incorporated to catalyze and actively promote the oxidation of the oxidizable moiety. The use of such oxidizable moieties, which chemically remove oxygen migrating through the walls of the package, can be a very effective method to reduce the oxygen transmission rates of plastics used in packaging.

U.S. Pat. No. 5,310,497 discloses a composition for scavenging oxygen that is said to have high oxygen scavenging rates at low temperatures. The composition comprises an ethylenically unsaturated hydrocarbon and a transition metal catalyst and can be incorporated into various types of layers. It is preferred that the composition be incorporated into layers of multilayered articles used for packaging oxygen-sensitive products such as food products.

U.S. Pat. No. 5,211,875 discloses a method of initiating oxygen scavenging by compositions that contain oxidizable organic compounds and transition metal catalysts. The method comprises initiating scavenging by exposing the composition to radiation. The method can be used for initiating scavenging in packaging layers or articles for oxygen sensitive products such as foods and beverages.

U.S. Pat. Nos. 5,021,515 and 5,955,527 disclose a wall for a package which comprises a polymer, and which is capable of scavenging oxygen through the metal-catalyzed oxidation of an oxidizable organic component. The oxidizable organic component may itself be a polymer, and preferred compositions are said to include a blend of 96% polyethylene terephthalate and 4% poly(m-xylyleneadipamide) containing 200 ppm cobalt as catalyst.

U.S. Pat. No. 6,083,585 discloses compositions for scavenging oxygen that comprise condensation copolymers comprising predominantly polyester segments and an oxygen-scavenging amount of polyolefin oligomer segments. The polyester segments comprise segments derived from typical bottling and packaging polyesters such as PET and PEN. The copolymers are preferably formed by transesterification during reactive extrusion and typically comprise about 0.5 to about 12 wt % of polyolefin oligomer segments. Use of these oxygen-scavenging compositions in bottles is said to provide a clear and rigid bottle similar in appearance to unmodified polyester bottles.

U.S. Pat. No. 6,544,611 discloses an oxygen-scavenging PET-based copolymer comprising from about 10 to about 120 ppm cobalt based on the PET polymer, and from about 15 to about 150 ppm zinc based on the PET polymer.

U.S. Pat. No. 6,863,988 discloses monolayer packages comprised of an oxygen scavenging composition suitable for direct contact with package contents and recycle with other polyester bottles are disclosed. The oxygen scavenging composition is comprised of a modified copolymer which is comprised of predominantly polyester segments and an oxygen scavenging amount of oxygen scavenging segments. The polyester segments comprise segments derived from typical bottling and packaging polyesters such as PET and PEN. Use of these oxygen scavenging copolymers in bottles provides a clear and rigid monolayer bottle similar in appearance to unmodified polyester bottles. In a series of preferred embodiments, bottles fabricated with the oxygen scavenging copolymers of this invention are over 99 wt % PET and contain less than 50 ppb of extractable components.

U.S. Pat. No. 7,186,464 discloses an oxygen barrier composition comprising an oxygen barrier polymer and an oxygen scavenging polymer. The composition can be in the form of a physical blend or a cross-linked blend, and can further comprise a compatibilizer, a transesterification catalyst, or both. Preferably, the oxygen barrier polymer is poly(ethylene/vinyl alcohol) (EVOH), polyethylene terephthalate (PET), or polyamide other than MXD6. Preferably, the oxygen scavenging polymer comprises an ethylenic backbone and a pendant cyclic olefinic group, or the oxygen scavenging polymer is a polyamide derived at least in part from a xylene diamine-based monomer. The oxygen barrier composition can be formed into an oxygen barrier layer of a packaging article. Such layers and articles, and methods for making same, are also disclosed.

U.S. application Ser. No. 11/364,916 discloses a composition comprising (i) an aromatic polyester resin, and (ii) a polydiene, where greater than 20 mole percent of the mer units of said polydiene have a 1,2 microstructure or the hydrogenated residue thereof.

U.S. patent application Ser. No. 11/495,431 filed Jul. 28, 2006 and having common assignee herewith, discloses polyester compositions that include aluminum atoms in an amount of at least 3 ppm, based on the weight of the polymer, and that further include alkaline earth metal atoms or alkali metal atoms or alkali compound residues, the polymers having an It.V. of at least 0.72 dL/g obtained through a melt-phase-only polymerization process ("melt-phase-only process").

U.S. patent application Ser. No. 11/229,238, filed Sep. 16, 2005 and having common assignee herewith, discloses polyester compositions comprising polyester polymers, aluminum atoms, alkaline earth atoms or alkali metal atoms or alkali compound residues, and particles that improve the reheat rate of the compositions.

While compositions such as those described are effective oxygen scavengers, and find use according to the present invention, we have found that performance may vary significantly depending upon the nature of the polyester and the oxygen-scavenging component.

We have unexpectedly discovered that PET polymers made using the catalysts system of the present invention, when blended with an oxygen-scavenging polymer and a transition metal, result in polymer blends having better oxygen-scavenging properties than polymer blends made with PET polymers prepared using most conventional catalyst systems, while maintaining the properties that make the blends suitable for use in the packaging of oxygen-sensitive products, including transparency, miscibility, rigidity, good barrier properties, recyclability, and reasonable cost.

SUMMARY OF THE INVENTION

In one aspect, the invention relates to polymer blends having oxygen-scavenging activity that include one or more polybutadiene homopolymers or copolymers having at least one functionality capable of entering into condensation reactions; one or more polyethylene terephthalate homopolymers or copolymers obtained using a catalyst system comprising aluminum atoms in an amount from, for example, about 3 ppm to about 100 ppm and one or more alkaline earth metal atoms, alkali metal atoms, or alkali compound residues in an amount, for example, from about 1 ppm to about 25 ppm, in each case based on the weight of the one or more polyethylene terephthalate homopolymers or copolymers; and one or more transition metal atoms in an amount from about 10 ppm to about 1,000 ppm metal, based on the total weight of the polymer blend.

In another aspect, the invention relates to polymer blends having one or more polybutadiene homopolymers or copolymers present in an amount, for example, from about 0.01 wt % to about 5 wt % or from 0.1 wt % to 1 wt %, based on the total weight of the polymer blend.

In another aspect, the invention relates to polymer blends having one or more polybutadiene homopolymers or copolymers provided with an average of at least two functionalities capable of entering into polycondensation reactions.

In still another aspect, the invention relates to polymer blends having one or more polybutadiene homopolymers or copolymers wherein the functionality capable of entering into polycondensation reactions comprises hydroxyl functionality.

In yet another aspect, the invention relates to polymer blends wherein the weight average molecular weight of the one or more polybutadiene homopolymers or copolymers is, for example, from about 100 g/mol to about 10,000 g/mol or from 1,000 g/mol to 3,000 g/mol.

In another aspect, the invention relates to polymer blends having one or more polybutadiene homopolymers or copolymers provided as a copolycondensate comprising the reaction product of one or more polyethylene terephthalate homopolymers or copolymers, or one or more conventional polyethylene terephthlate homopolymers or copolymer, and the one or more polybutadiene homopolymers or copolymers.

In one aspect, the invention relates to one or more polyethylene terephthalate homopolymers or copolymers that include a carboxylic acid component comprising, for example, at least 80 mole % of the residues of terephthalic acid and a hydroxyl component comprising, for example, at least 80 mole % of the residues of ethylene glycol or 1,3-propanediol, based on 100 mole percent of carboxylic acid component residues and 100 mole percent of hydroxyl component residues in the one or more polyethylene terephthalate homopolymers or copolymers.

In one aspect, the invention relates to one or more polyethylene terephthalate homopolymers or copolymers having an It.V. of, for example, at least 0.72 dL/g, or at least 0.76 dL/g, or at least 0.80 dL/g, or at least 0.84 dL/g obtained by a melt-phase-only polymerization process.

In one aspect, the invention relates to aluminum atoms present in an amount, for example, from 5 ppm to 25 ppm, based on the weight of the one or more polyethylene terephthalate homopolymers or copolymers.

In one aspect, the invention relates to the aluminum atoms present in an amount, for example, from 5 ppm to 60 ppm, based on the weight of the one or more polyethylene terephthalate homopolymers or copolymers, and one or more alkaline earth metal atoms, alkali metal atoms, or alkali compound residues comprising one or more of: lithium atoms, sodium atoms, or potassium atoms.

In one aspect, the invention relates to one or more alkaline earth metal atoms, alkali metal atoms, or alkali compound residues comprising lithium atoms, sodium atoms, potassium atoms, or mixture thereof present in a molar ratio to aluminum atoms within a range of, for example, about 0.5 to about 10.

In one aspect, the invention relates to one or more alkaline earth metal atoms, alkali metal atoms, or alkali compound residues comprising sodium or lithium atoms.

In one aspect, the invention relates to the aluminum atoms provided as one or more aluminum compounds having at least one organic substituent.

In one aspect, the invention relates to one or more polyethylene terephthalate homopolymers or copolymers made without the addition of any catalyst metal atoms other than the aluminum atoms and the one or more of: lithium atoms, sodium atoms, or potassium atoms.

In one aspect, the invention relates to one or more polyethylene terephthalate homopolymers or copolymers further comprising residues of a catalyst deactivator, including those containing phosphorus atoms, for example phosphoric acid, phosphorous acid, polyphosphoric acid, pyrophosphoric acid, carboxyphosphonic acids, or phosphonic acid derivatives, or each of their salts, esters, or derivatives.

In one aspect, the invention relates to one or more polyethylene terephthalate homopolymers or copolymers further comprising residues of a catalyst deactivator containing phosphorus atoms present in an amount such that a molar ratio of phosphorus atoms to the total moles of aluminum atoms and one or more alkaline earth metal atoms or alkali metal atoms is, for example, about 0.5 to about 1.5.

In one aspect, the invention relates to polymer blends having a degree of crystallinity of at least about 30%, an AA generation rate of about 20 ppm or less, an L* of at least about 60, and an It.V. of at least about 0.72 dL/g obtained in a melt phase polymerization.

In one aspect, the invention relates to polymer blends in the form of a bottle preform.

Further aspects of the invention are as set out below.

DETAILED DESCRIPTION OF THE INVENTION

Figure 1A:
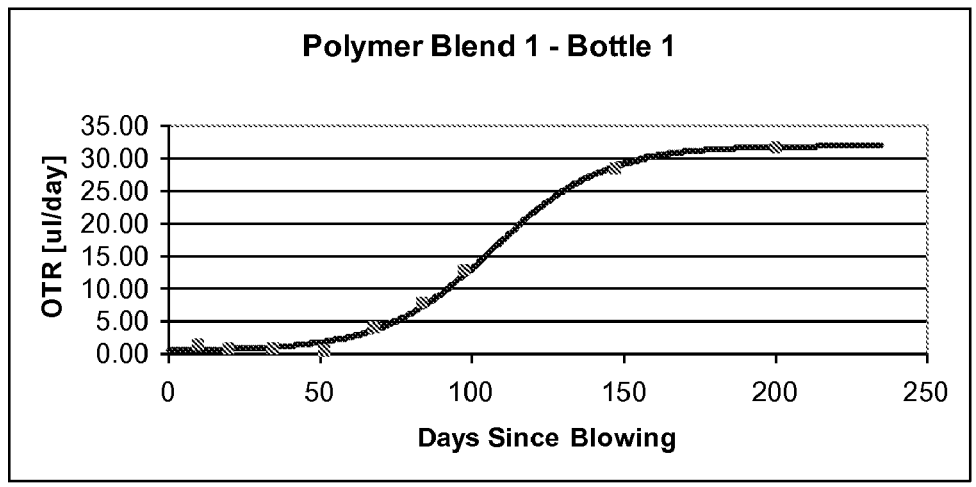
FIG. 1A-1C is a plot of the oxygen transmission rate (OTR) as a function of time for three bottles made from Polymer Blend 1. A non-linear curve is superimposed over the OTR data in each plot using the parameters reported in Table 16 with Eqn. 1.

The present invention may be understood more readily by reference to the following detailed description of the invention.

As used in the specification and the appended claims, the singular forms "a," "an" and "the" include plural referents unless the context clearly dictates otherwise. For example, reference to processing or making a "polymer," "preform," "article," "container," or "bottle" is intended to include the processing or making of a plurality of polymers, preforms, articles, containers, or bottles.

Specifically, when a "polymer" is referred to in the specification and the claims, the term should be construed to include not just the reaction product of a single polymerization, but also to blends or physical mixtures of more than one polymer, since the thermoplastic polymers described herein may be satisfactorily blended with one another so that it may be difficult to afterward identify the source. Thus, the phrase a "PET homopolymer or copolymer" (sometimes hereinafter described simply as a "PET polymer") should be construed, for example, to include both the product of a single polymerization as well as mixtures of more than one PET homopolymer or copolymer. Likewise, the phrase a "polyolefin polymer" or a "polybutadiene homopolymer or copolymer" should be construed, for example, to include both the reaction product of a single polymerization as well as mixtures of more than one polybutadiene homopolymer or copolymer.

References to a composition or a polymer blend containing "an" ingredient or "a" polymer is intended to include other ingredients or other polymers, respectively, in addition to the one named.

By "comprising" or "containing" or "having" we mean that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

When we say that an oxygen-scavenging polymer is added to, blended with, or reacted with the PET polymer, the oxygen-scavenging polymer may either be added neat or as a concentrate, unless the context indicates otherwise. Furthermore, when the oxygen-scavenging polymer is functionalized and capable of reacting with the PET polymer, the oxygen-scavenging polymer may be added as a copolycondensate.

It is also to be understood that the mention of one or more method steps does not preclude the presence of additional method steps before or after the combined recited steps or intervening method steps between those steps expressly identified, unless otherwise indicated.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

As used throughout the specification, "ppm" is parts per million by weight.

When we say "a transition metal catalyst, or an oxidation catalyst, is used in the inventive polymer blends", the amounts given are based on the weight of the polymer blends and the measured weight of the metal in the polymer blend, not the weight of the metal compound as added to the polymer blends.

By "atoms" of a metal we mean the metal atom occupying any oxidation state, any morphological state, any structural state, and any chemical state, whether as added to or as present in the polymer or composition of matter.

The intrinsic viscosity (It.V.) values described throughout the description are set forth in dL/g units as calculated from the inherent viscosity measured at 25° C. in 60/40 wt/wt phenol/tetrachloroethane, as further described herein.

When we say that the inventive polymer blends of the invention have "oxygen-scavenging activity," we mean that the blends react with oxygen within the blends or permeating through the blends, or that the blends exhibit a lower rate of transmission of oxygen through the blends than comparative polymers or blends not comprising the oxygen-scavenging polymer. Thus, blends having "oxygen-scavenging activity" absorb or react with oxygen within or permeating through the polymer blend, or exhibit reduced oxygen transmission through the blend. When we use the term "oxygen-scavenging capacity," we refer to the total amount of oxygen the polymer blend is capable of absorbing before the polymer blend is no longer effective to absorb, or react with, oxygen.

We have discovered that polymer blends that include: a transition metal catalyst; one or more PET homopolymers or copolymers prepared using a catalyst system comprising aluminum atoms and one or more alkaline earth atoms, alkali metal atoms, or alkali compound residues (e.g., example lithium); and an oxygen-scavenging polymer (e.g., one or more functionalized polybutadiene homopolymers or copolymers as described herein), exhibit improved oxygen-scavenging activity compared with blends of certain conventional PET polymer prepared using conventional catalyst systems (i.e., a "conventional PET polymer"). For example, the comparative polymer blends of the examples which include conventional PET copolymers were prepared via a conventional process comprising a first melt-phase polycondensation process, or step, using antimony catalysts, followed by a solid-state polymerization process, or step, to achieve the final It.V, exhibit relatively poor oxygen-scavenging activity compared with the inventive blends described herein.

As further described below, the term "melt-phase-only PET polymer" describes a polyethylene terephthalate homopolymer or copolymer which is polycondensed entirely (i.e., to the final, target It.V.) in a melt phase (i.e., in a melt-phase-only polymerization process), and is distinguished from conventional PET polymer prepared by first polymerizing the PET polymer to a moderate molecular weight in a melt phase followed by further polymerizing the PET polymer to a final, target IV, in a solid state (e.g., by solid-state polymerization), as evidenced by an increase in IV after solidification, typically by heating. Other polyethylene terephthalate homopolymers or copolymers useful according to the invention include those polycondensed in the melt phase to a desired minimum intrinsic viscosity, whether or not the polymer is afterward further polycondensed in the solid state.

In one aspect, the invention relates to polymer blends that comprise one or more polyethylene terephthalate (PET) homopolymers or copolymers prepared using aluminum atoms and one or more alkaline earth metal atoms, alkali metal atoms, or alkali compound residues as a catalyst system and optionally prepared by a melt-phase-only polymerization process. The polymer blends of the invention further comprise one or more oxygen-scavenging polymers and a transition metal catalyst.

Oxygen-scavenging polymers useful in this invention comprise an oxidizable organic moiety that reacts with oxygen. The oxygen scavenging polymers may be addition polymers, condensation polymers, or copolymers comprising both addition polymers and condensation polymers. Such oxygen scavenging polymers may include allylic or tertiary hydrogen containing oxidizable organic moieties.

Many hydrocarbons such as polyolefins, especially those containing one or more double bonds between carbon atoms in the linear chain (a.k.a., olefinics), such as ethylenically unsaturated hydrocarbons, are capable of scavenging oxygen.

In another aspect, the inventive polymers blend may comprise one or more ethylenically unsaturated homopolymers or copolymers, such as those described in U.S. Pat. No. 5,310,497 incorporated herein by reference in its entirety and further elaborated upon below.

Ethylenically unsaturated hydrocarbons may be either substituted or unsubstituted.

As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises less than 100% by weight carbon and hydrogen. Suitable substituted or unsubstituted ethylenically unsaturated hydrocarbons include those having two or more ethylenically unsaturated groups per molecule. Especially suitable, are polymeric compounds having three or more ethylenically unsaturated groups and a molecular weight equal to or greater than about 1,000 weight average molecular weight. The amount of ethylenically unsaturated hydrocarbon may vary, so long as the desired scavenging effect is provided and inventive polymer blend may be formed into the desired article. Typical amounts for scavenging include, for example, from about 0.1 wt % to about 10 wt % ethylenically unsaturated hydrocarbon, or from 0.2 wt % to 6 wt %, or from 0.5 wt % to 2 wt % ethylenically unsaturated hydrocarbon, based on the total weight of the polymer blend.

Substituted ethylenically unsaturated hydrocarbons include, for example, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids and their partially polymerized derivatives such as oleic, ricinoleic, dehydrated ricinoleic, and linoleic acids and derivatives thereof, e.g., esters. Such hydrocarbons also include polymers or copolymers derived from (meth) allyl(meth)acrylates.

Unsubstituted ethylenically unsaturated hydrocarbons include, for example, diene polymers such as polyisoprene, (e.g., trans-polyisoprene), polybutadiene (e.g., atactic-1,2-polybutadienes or 1,4-polybutadiene, which are defined as those polybutadienes possessing greater than or equal to 50% atactic-1,2 and 1,4 microstructures, respectively), and copolymers thereof, e.g., ethylene-butadiene or styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

In another aspect, the oxygen-scavenging polymers useful in the inventive polymer blends may be copolycondensates comprising predominantly segments, or moieties, of PET polymer condensed with functionalized oxygen-scavenging moieties (e.g., olefinic segments such as the unsubstituted ethylenically unsaturated hydrocarbons segments, or moieties, as described above) wherein the oxygen-scavenging moiety is present in sufficient quantity to provide the needed oxygen-scavenging capacity. In still another aspect, the oxygen-scavenging polymers useful in the inventive polymer blends may be copolycondensates comprising predominantly segments, or moieties of conventional PET polymers, condensed with functionalized oxygen-scavenging moieties (e.g., olefinic segments, or moieties) wherein the oxygen-scavenging moiety is present in sufficient quantity to provide the needed oxygen-scavenging capacity. Olefinic moieties for use as functionalized hydrocarbon segment in the oxygen-scavenging polymers include those disclosed in U.S. Pat. Nos. 6,083,585 and 6,544,611 and U.S. patent application Ser. No. 10/649,747 filed Aug. 8, 2003, each incorporated herein in their entirety) and may vary from low molecular weight olefinic moieties (e.g., 3-hexenedioic acid; 1,4-butenediol; and 1-cyclohexene-1,4-dimethanol) to high molecular weight olefinic polymers (e.g., diols of polypropylene, poly(4-methyl-1-pentene), polybutdiene, and polyethylene/polybutadiene copolymers). The oxygen-scavenging polymers may also comprise a mixture of two or more of the olefinic moieties. The polybutadiene diol moiety is especially suitable since it has a high oxygen scavenging propensity and is commercially available. Olefinic oligomer segments in the range of, for example, about 0.5 wt % to about 15 wt %, or 2 wt % to 10 wt %, or 2 wt % to 8 wt %, based on weight of the oxygen-scavenging polymer, are useful for the inventive polymer blends.

When we say that the one or more oxygen-scavenging moieties (e.g., polybutadiene homopolymers or copolymers) useful according to the invention are provided with one or more functionalities, or are polyfunctional, we mean that they are provided with one or more chemically compatible, functional groups that are capable of entering into polycondensation reactions. Examples of such functionality include hydroxyl; carboxylic acid including carboxylic acid, anhydrides, carboxylic acid chlorides, and alkyl ester derivatives of carboxylic acids; amine; and epoxy. The functionalities provided may be the same, or different, and preferred terminal functionalities include hydroxyl, carboxylic acid, and amino.

When we say that the one or more oxygen-scavenging polymers (e.g., polybutadiene homopolymers or copolymers) include hydroxyl functionality, we mean that the polymers include one or more hydroxyl groups, for example in predominantly primary, terminal positions on the main hydrocarbon chain that are allylic in configuration. For example, the one or more polybutadiene homopolymers or copolymers may include at least 1.8 hydroxyl groups per molecule, or at least 2 hydroxyl functionalities per molecule, or up to about 3 hydroxyl groups per molecule, or even greater amounts of functionality per polymer molecule.

Polybutadiene homopolymers or copolymers having the functionalities just described may be referred to hereinafter simply as "functionalized polybutadiene homopolymers or copolymers," or simply as "functionalized polybutadiene," but in each instance, the terms should be construed to include copolymers, unless otherwise indicated. We have found unhydrogenated polybutadiene homopolymers or copolymers having oxygen-scavenging properties and provided with functionality, for example at least two hydroxyl functionalities per molecule that may react with the one or more PET homopolymers or copolymers with which they are blended, to be especially suitable for use according to the invention. In one aspect, polybutadiene having an average of at least two functionalities capable of entering into condensations reactions or transesterification reactions during the polymerization of the PET polymer or during melt blending of the functionalized polybutadiene with the PET polymer are suitable for the inventive blends.

The functionalized polybutadiene homopolymers or copolymers useful according to the invention may be provided with one or more of a number of types of functionality. Thus, as described in U.S. Pat. No. 6,083,585, the preparation of the inventive blends, and the oxygen-scavenging polymers useful according to the invention, typically includes a step of adding functionality to at least one or more (preferably more) of the terminal sites available in the polybutadiene homopolymer or copolymer. The functionally added should be a moiety capable of entering into polycondensation reactions and forming polycondensation linkages when incorporated into a polymer. There may, of course, be more than two end sites available for functionalization when there is crosslinking or branching in the polybutadiene homopolymer or copolymer. In instances where di- or multiple-functionality is contemplated, generally it will be multiples of the same functionality (i.e., all epoxy, all hydroxyl, all carboxy, or all amino added at plural end sites of the polybutadiene homopolymer or copolymer oligomer molecule), although the invention may be practiced even when different, but chemically compatible, terminal functional groups are present on plural end sites of the polybutadiene homopolymer or copolymer. As noted, the terminal functionality should be capable of entering into polycondensation reactions. Terminal functional groups useful according to the invention include hydroxyl, carboxylic acid, carboxylic acid anhydrides, alcohol, alkoxy, phenoxy, amine, and epoxy. The preferred terminal functional groups are epoxy, hydroxyl, carboxylic acid, and amino. For example, polybutadiene having hydroxyl functionality capable of entering into polycondensation reactions are suitable for the polymer blends of the invention.

A separate step in the preparation of the inventive blends or oxygen-scavenging polymers useful according to the invention may be avoided by using polybutadiene that is already appropriately terminally-functionalized and commercially available as such. In this regard, carboxyl-terminal functional groups and hydroxyl terminal functional groups are suitable for use according to the invention since they are commercially available. Suitable products are believed to include Sartomer carboxyl-terminated polybutadiene (Sartomer product Poly bd 45CT) and hydroxyl-terminated polybutadienes (Sartomer products R2OLM; MW of 1230 g/mol and R45HTLO; MW of 2800 g/mol).

In one aspect, the oxygen-scavenging polymer may be provided to the inventive blend as a copolycondensate comprising the reaction product of a polyester with the functionalized polybutadiene; the inventive blend comprising a melt-blend of the copolycondensate with the one or more polyethylene terephthalate (PET) homopolymers or copolymers. In another aspect, the functionalized polybutadiene may be provided to the inventive blend neat; the inventive blend comprising a melt-blend of the neat functionalized polybutadiene and the one or more polyethylene terephthalate (PET) homopolymers or copolymers.

In another aspect, the polymer blends of the invention may further comprise a transesterification catalyst, such as a transition metal carboxylate, to facilitate reaction of the one or more PET homopolymers with the one or more functionalized polybutadiene homopolymers or copolymers.

In yet another aspect, the polymer blends of the invention may further comprise one or more transition metal catalysts, provided, for example, as a transition metal salt such as a cobalt salt, that increase the oxygen-scavenging properties of the functionalized polybutadiene.

The polymer blends of the invention comprise one or more polybutadiene homopolymers or copolymers having functionality reactive with the one or more PET homopolymers or copolymers with which they are blended, including those further described, for example, in U.S. Pat. No. 6,083,585, incorporated herein by reference in its entirety, and from which a portion of the present disclosure is derived. Suitable functionalized polybutadienes comprise hydroxyl functionality, for example in an amount of at least two hydroxyl functionalities per molecule of the polybutadiene polymer. Such polymers are often described herein simply as "functionalized polybutadiene."

The functionalized polybutadiene need be present only in an amount necessary to provide the degree of oxygen scavenging capacity needed for the particular application.

A variety of polybutadiene homopolymers or copolymers may be suitable for use according to the invention, so long as the homopolymers or copolymers selected provide the polymer blends of the invention with the necessary properties, for example suitable transparency and mechanical properties, as well as the appropriate processing characteristics, in addition to the requisite oxygen-scavenging activity.

The basic microstructural units found in polybutadiene homopolymers and copolymers include, for example, cis-1,4; trans-1,4; and 1,2 units, as further described below.

The functionalized polybutadienes suitable for use according to the invention thus comprise residues of 1,3-butadiene, and include, for example, those known as 1,2-polybutadienes, such as atactic-1,2-polybutadiene, and those known as 1,4-polybutadienes, whatever the morphology. Suitable polymers typically have a low degree of crystallinity, for example less than 30%, as measured, for example, using wide angle x-ray scattering analysis, and a low Tg, for example less than 15° C.

The morphologies just described result from the various ways (i.e., polymerization processes) in which the functionalized polybutadiene may be made as further discussed herein.

In processes for producing the functionalized polybutadienes useful according to the invention, 1,3-butadiene monomers undergo polymerization to produce polybutadiene. In a chain propagation step, a new monomer may add at either the 2 position or the 4 position of the preceding monomer that has become a part of the polymer chain. When the new monomer bonds to the 4 position, that is, at the terminal carbon of the previous monomer, this is described as 1,4-addition. This results in a residual unsaturation at the 2,3-position of the preceding monomer such that the backbone of the polymer contains the unsaturation, which may be in either the cis or trans configuration. Alternatively, the new monomer may bond at the second position of the previous monomer, that is, a 1,2-addition. This addition results in the unsaturation in the previous monomer remaining, but as a side group with respect to the polymer backbone.

For example, suitable functionalized polybutadienes having predominantly 1,2-polybutadiene units include those having, for example, at least about 50% 1,2 units, or at least 75 % 1,2 units, or at least 90% 1,2 units, as measured, for example, using infrared spectroscopy or $^{13}$C NMR. When functionalized polybutadienes with greater than 20 mole % 1,2 units are used as the one or more oxygen-scavenging polymer in the inventive blends, it may be desirable to hydrogenate the double bonds in the side chains (i.e., the vinyl double bonds) as described in U.S. application Ser. No. 11/364,916, incorporated herein by reference in its entirety, to prevent unacceptable discoloration of the inventive blend when exposed to extended melt processing temperatures (e.g., when the inventive blends are recycled) and to control the number of sites for functionalization.

Similarly, suitable functionalized polybutadienes having predominantly 1,4-polybutadiene units include those having, for example, at least about 50% 1,4 units, or at least 75% 1,4 units, or at least 90% 1,4 units, as measured, for example, using infrared spectroscopy or $^{13}$C NMR. Further, the 1,4 units may be predominantly cis-1,4 units; predominantly trans-1,4 units, or approximately equivalent amounts of each.

Those skilled in the art of addition polymers understand that the ratio of cis-1,4; trans-1,4 and 1,2 units, as well as the molecular weight, are a function of the polymerization temperature, the catalyst used, and the reaction medium, as further described herein.

In addition to functionalized polybutadiene homopolymers, functionalized polybutadiene copolymers may also be used according to the invention. For example, other monomers possessing secondary and tertiary hydrogens may be incorporated in the polybutadiene, such as unsubstituted, 2-substituted or 2,3-disubstituted 1,3-dienes of from 4 to 12 carbon atoms, or from 4 to 6 carbon atoms. The substituents in the 2- and/or 3-position may be, for example, hydrogen, alkyl (generally lower alkyl, e.g., of 1 to 4 carbon atoms), aryl (substituted or unsubstituted), halogen, nitro, nitrile, etc. Typical diene comonomers include isoprene; chloroprene; 2-cyano-1,3-butadiene; 2,3-dimethyl-1,3-butadiene; 2-phenyl-1,3-butadiene; 2-methyl-3-phenyl-1,3-butadiene, etc. other dienes (e.g., isoprene). Further, the copolymers useful according to the invention may further comprise styrene, vinyl acetate, acrylonitrile, vinyl chloride, allyl acrylates, 2,3-dimethylbutadiene, ethylene, propylene, isobutylene, alkyl acrylates, and methacrylates (e.g., methyl and t-butyl), and vinyl pyridines.

The functionalized polybutadienes of the invention thus comprise residues of butadiene, and may optionally include residues or segments of one or more of the foregoing, for example isoprene or polyisoprene (e.g., trans-polyisoprene), styrene residues or styrene-butadiene oligomers, segments of one or more of polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated), all as further described, for example, in U.S. Pat. No. 6,083,585, incorporated herein by reference in its entirety.

In preferred embodiments, the one or more functionalized polybutadiene homopolymers or copolymers useful according to the invention typically comprise at least about 50 wt. % butadiene residue content, or at least 75 wt. % or at least 90 wt. %, or at least 95 wt. % butadiene residue content. Alternatively, the one or more functionalized polybutadiene homopolymers or copolymers may comprise polybutadiene homopolymers, comprised of substantially 100 wt. % butadiene residue content, with little or no amounts of other monomer residues present.

The molecular weight of the one or more functionalized polybutadiene homopolymers or copolymers may vary widely, but may be an important consideration depending on the end use application, since it may affect the properties of the resulting blends. For example, the use of low molecular weight segments may result in a more uniform dispersion of the segments throughout a copolycondensate. The use of lower molecular weight segments may cause the segments to be physically smaller than the segments obtained at the same loading level with higher molecular weight segments. The use of low molecular weight polybutadiene segments may thus be preferred where clarity of such copolycondensates is important. The polybutadiene segments may otherwise scatter the transmission of light, thus reducing clarity.

The weight average molecular weight of the one or more functionalized polybutadiene homopolymers or copolymers may thus range, for example, from about 100 g/mol to about 10,000 g/mol, resulting in copolycondensates or blends having the desired physical and oxygen scavenging properties. Alternatively, the molecular weights may range from 1,000 g/mol to 3,000 g/mol, resulting in polycondensates that are particularly well suited for those applications in which clarity is important.

Thus, low molecular weight hydroxyl-terminated polybutadiene homopolymers and copolymers may be prepared by either free radical polymerization or by anionic polymerization catalyzed by a metal compound, for example lithium. The process of choice will depend on, for example, the desired type and amount of functionality, the desired comomoner composition, and the desired microstructure of the butadiene units. For example, hydrocarbon monomers having unconjugated ethylenic unsaturation such as isobutylene, propylene, butane and cyclohexene may be difficult to incorporate via anionic polymerization. Styrene, which has an unusually active vinyl group, is one exception and may be copolymerized with the conjugatged dienes. Monomers such as acrylonitrile, ethylacrylate, and methyl methacrylate may also be unsuitable with anionic polymerization process because the cyano and ester groups may react with the organic metallic end groups from which chain growth propagation occurs.

Suitable functionalized polybutadiene homopolymers and copolymers, and especially hydroxyl-terminated butadiene homopolymers and copolymers, may be prepared, for example, by the methods described in U.S. Pat. Nos. 3,055,952, 3,333,015, 3,796,762, 3,987,012, 4,039,593, 4,518,770, 4,593,128, 4,883,859, 5,043,484, and 5,159,123 and U.S. application Ser. No. 11/364,916, incorporated herein by reference in their entirety.

For example, a reaction solution may be prepared that includes, by weight, 100 parts polymerizable monomer; from about 0.5 to about 10 parts, or from 1 to 5, or from 2 to 4 parts organic peroxide initiator; from about 10 to about 200 parts, or from 25 to 100, or from 30 to 50 parts alcohol. Alternatively, as disclosed in U.S. Pat. No. 3,796,762 incorporated herein by reference, an essentially water-insoluble, alicyclic alcohol or ketone solvent which produces a two phase system may be employed in place of a conventional alcohol. This reaction solution is then heated, for example at a temperature in the range from greater than about 100° C. to about 200° C., or from 105° C. to 150° C., or from 115° to 130° C., for a period that may vary significantly, for example from about 10 minutes to about 10 hours, and to a conversion of monomer to polymer of, for example, at least 35%, or at least 50%, or at least 75%, or at least 90%, or at least 95%, or at least 99%, or more. The liquid polymer produced may have, for example, at least about 1.8, or about 2.0 to about 3.0, or from 2.1 to 2.5, hydroxyl groups per molecule. The molecular weight may be, for example, from about 400 to about 25,000 g/mol, or from 900 to 10,000 g/mol.

Polybutadiene homopolymers and copolymers with hydroxyl functional groups may be prepared by anionic polymerization processes, for example, as described in Kirk-Othmer *Encyclopedia of Chemical Technology*, Vol 8, 4$^{th}$ ed., (1993) pp. 1031-1045, U.S. Pat. Nos. 3,055,952, 4,039,593, 4,721,754 and 5,405,911, and U.S. application Ser. No. 11/364,916 incorporated herein by reference in their entirety.

In anionic polymerization processes, a metal initiator is typically used to initiate the butadiene polymerization, the reaction taking place, for example, in an organic reaction medium such as a non-polar solvent (e.g., hydrocarbons like n-pentane, n-hexane, n-heptane and cyclohexane) that exhibit limited interaction with the propagating anionic ends or a polar solvent (e.g., tetrahydrofuran) that solvates the ion pair formed between the metal catalyst and propagating anionic end, as well as various mixtures of these, optionally with a structure modifier, as disclosed in U.S. Pat. No. 5,405,911 and U.S. application Ser. No. 11/364,916. When the monomer is added to the organic solvent, an exothermic reaction occurs and the polymer is formed. Following the completion of the exotherm, excess ethylene oxide is added to the solution, followed by addition of water, to thereby form the hydroxyl-functionalized polybutadiene.

The anionic polymerization may be carried out in the presence of structure modifiers, such as diethylether or glyme, to obtain a desired amount of 1,4-addition, as described in U.S. Pat. No. 5,405,911, already cited, and U.S. application Ser. No.11/364,916. For example, amounts of 1,4 units from about 45 to about 99, or from 55 to 90, or from 70 to 90, are suitable for use according to the invention.

In the functionalized polybutadienes of the invention, there may, of course, be more than two end sites available for functionalization, for example when there is crosslinking or branching in the polyolefin oligomer.

Polybutadiene homopolymers and copolymers having hydroxyl-terminal functional groups are preferred for use according to the invention, especially dihydroxyl-terminated polybutadienes having molecular weights from about 100 g/mol to about 10,000 g/mol or from 1,000 g/mol to about 3,000 g/mol. For example, Sartomer products Poly BD R20LM and Poly BD R45 HTLO are well suited for use according to the invention, as are polycondensates such as those condensation copolymers comprising functionalized polybutadiene disclosed and claimed in U.S. Pat. No. 6,083,585, incorporated herein by reference.

The polymer blends of the invention further comprise a transition metal as an oxidation catalyst. Although we use the term "catalyst," the transition metal may or may not be consumed in the oxidation reaction, or if consumed, may only be consumed temporarily by converting back to a catalytically active state.

The amount of transition metal used in the inventive blends is an amount effective to induce oxygen scavenging in the blend. This amount may vary depending on, for example, the transition metal used, the oxygen-scavenging polymer and loading, and the degree of oxygen scavenging desired or needed in the application. For example, one or more transition metals, such as cobalt provided as a cobalt salt, may be present in the polymer blends of the invention in amounts, for example, from about 10 ppm to about 1,000 ppm, or from 20 ppm to 750 ppm, or from 25 ppm to 500 ppm, in each case expressed as the weight of the metal atoms based on the total weight of the polymer blends. Alternatively, the transition metal may be present in the blends of the invention in an amount of at least about 10 ppm, or at least 15 ppm, or at least 25 ppm, or at least 50 ppm, up to 500 ppm, or up to 750 ppm, or up to 800 ppm, or up to about 1,000 ppm, in each case expressed as the weight of the metal atoms based on the total weight of the blend. If present in the inventive blends, the transition metal may be present in amounts, for example, from about 35 ppm to about 5,000 ppm or more, or from 100 ppm to 3,000 ppm, or from 500 ppm to 2,500 ppm, based on the total weight of the blends.

Suitable transition metals include those which can readily interconvert between at least two oxidation states. The transition metal may be provided in the form of a transition metal salt, with the metal selected from the first, second, or third transition series of the Periodic Table. Suitable metals and oxidation states include manganese II or III, iron II or III, cobalt II or III, nickel II or III, copper I or II, rhodium II, III or IV, and ruthenium I, II or IV. Suitable counterions for the metal include, but are not limited to, chloride, acetate, acetylacetonate, stearate, palmitate, 2-ethylhexanoate, neodecanoate, octanoate, or naphthenate, and mixtures thereof. The metal salt may also be an ionomer, in which case a polymeric counterion is employed. An amount of catalyst which is effective in catalyzing oxygen scavenging may be used. Typical amounts in the blends of the invention are at least about 10 ppm, or at least 25 ppm, or at least 50 ppm, or at least 100 ppm, up to about 750 ppm, or up to about 1,000 ppm, or from 50 ppm up to 500 ppm. For example, cobalt neodecanoate is found to effectively induce oxygen scavenging in the inventive blends in amounts from about 50 ppm up to about 250 ppm, based on the weight of cobalt to the weight of the inventive polymer blend.

Typical amounts of transition metal catalysts, if provided in the oxygen-scavenging polymer, may be even higher, for example at least about 50 ppm, or at least 250 ppm, or at least 500 ppm, up to about 1,000 ppm, or up to about 2,500 ppm, or up to about 5,000 ppm, or up to about 10,000 ppm or more. Thus, these oxygen-scavenging polymers may also serve as a carrier to be blended with the transition metal catalyst and subsequently introduced into the blends of the invention. It may be an advantage, however, to add the transition metal shortly before or during blending the oxygen-scavenging polymer with the one or more polyester homopolymers or copolymers to impart the maximum oxygen-scavenging capacity to the inventive polymer blends.

We have found cobalt salts to be especially suitable for use according to the invention.

When the inventive blends are intended for packaging compositions, one or more transition metal catalysts in amounts ranging from, for example, about 10 ppm to about 1,000 ppm are suitable for most applications, or in amounts of at least 10 ppm or at least 30 ppm, or at least 50 ppm, or at least 60 ppm, or at least 75 ppm, or at least 100 ppm, or at least 200 ppm. Alternatively, the transition metal catalyst may be present in an amount up to about 300, or up to 200, or up to 100 ppm, or up to 75 ppm, or up to 50 ppm, or up to 25 ppm, or up to 10 ppm, based on the weight of the inventive blend.

The amounts given are based on the weight of the polymer blends and measured as the metal, not the compound weight as added to the inventive blends. In the case of cobalt as the transition metal, suitable amounts may be at least 20 ppm, or at least 30 ppm, or at least 50 ppm, or at least 60 ppm, or at least 100 ppm, or at least 125 ppm, or at least 250 ppm. Alternatively, the cobalt may be present in an amount up to about 200, or up to 100 ppm, or up to 75 ppm, or up to 50 ppm, or up to 25 ppm, or up to 10 ppm, based on the weight of the inventive blend.

In those cases in which the transition metal is added during polymerization of one or more of the PET polymers, it may be necessary or helpful to add the transition metal near the end of the polymerization process, or even later during blending to prepare the inventive blends, in order to retain the desired catalytic activity of the transition metal. For example, the transition metal may be added neat or in a carrier (such as a liquid or wax) to an extruder or other device for making an article comprising the polymer blends of the invention, or it may be added in a concentrate with an additional PET polymer or other thermoplastic polymer, or in a concentrate with the oxygen-scavenging polymer (e.g., the copolycondensates). The carrier may either be reactive or non-reactive with the PET polymer and either volatile or non-volatile carrier liquids may be employed.

Analogous to the blending protocols described below for introducing the oxygen-scavenging polymer into the PET polymer, it is evident that the transition metal catalyst may be added at a variety of points and via a variety of blending protocols during the preparation of the oxygen-scavenging polymer blends of the invention. A particularly useful approach is to bring the inventive blends and the transition metal together late in the preparation of the blends. In some instances, such as when cobalt is provided as a transition metal, it may be preferred to add the cobalt during blending of the PET polymer and the oxygen-scavenging polymer (e.g., during a secondary fabrication process such as bottle preform molding), rather than earlier, for example during the PET polymer polymerization process.

The oxygen-scavenging polymer may also comprise a mixture of two or more oxygen-scavenging polymers or oxygen-scavenging copolycondensates as described above, as well as, a mixture of two or more transition metal catalyst.

The one or more PET homopolymers or copolymers of which the inventive blends are comprised, sometimes hereinafter described simply as the "PET polymers," are thermoplastic and include a catalyst system comprising aluminum atoms, for example in an amount of at least 3 ppm based on the weight of the polymer, as well as one or more alkaline earth metal atoms, alkali metal atoms, or alkali compound residues, for example lithium. Such polymers typically have an It.V. of at least 0.72 dL/g, optionally obtained by the melt-phase-only polymerization process.

The PET homopolymers or copolymers of which the inventive blends are comprised include those disclosed and claimed in U.S. patent application Ser. No. 11/495,431, filed Jul. 28, 2006 and having common assignee herewith, the disclosure of which is incorporated herein by reference in its entirety.

In another aspect, the PET polymers comprise aluminum atoms, as well as one or more alkaline earth metal atoms, alkali metal atoms, or alkali compound residues, provided as a catalyst system, and further comprise one or more catalyst deactivators, further elaborated upon below, effective to at least partially deactivate the catalytic activity of the combination of the aluminum atoms and the alkaline earth metal atoms, alkali metal atoms, or alkali compound residues.

In one aspect, the PET polymers are made by a process comprising polycondensing a polyester polymer melt in the presence of aluminum atoms and one or more alkaline earth metal atoms, alkali metal atoms, or alkali compounds.

The polymer blends of the invention, containing one or more PET homopolymers or copolymers prepared using the catalyst systems just described and further elaborated upon below, blended with the one or more oxygen-scavenging polymers (e.g., one or more polybutadiene homopolymers or copolymers) described elsewhere herein, often maintain significant oxygen-scavenging capacity compared with PET polymers prepared using other catalyst systems, for example conventional catalyst systems such as antimony and titanium.

In yet another aspect of the invention, the PET polymers suitable for use according to the invention may be produced by a process that includes a step of adding a phosphorus containing compound to a polyester melt containing aluminum atoms and one or more alkaline earth metal atoms or alkali metal atoms or alkali compound residues, for example lithium atoms.

In another aspect, the PET homopolymers or copolymers useful according to the invention comprise aluminum atoms and one or more alkaline earth atoms, alkali metal atoms, or alkali compound residues, and further comprise particles of one or more of: titanium, zirconium, vanadium, niobium, hafnium, tantalum, chromium, tungsten, molybdenum, iron, nickel, or nitrides or carbides of the foregoing, for example titanium nitride, titanium carbide, or mixtures thereof, the particles improving the reheat rate of the polyester compositions.

In another aspect, the PET homopolymers or copolymers may be prepared by a process comprising polycondensing a PET polymer melt in the presence of aluminum atoms and one or more alkaline earth metal atoms, alkali metal atoms, or alkali compound residues, and before, during, or after polycondensation, adding particles comprising titanium, zirconium, vanadium, niobium, hafnium, tantalum, chromium, tungsten, molybdenum, iron, or nickel atoms or combinations thereof.

The particles preferably comprise transition metal compounds containing the atoms of boron, carbon, and nitrogen; transition elemental metals, and transition metal alloys, wherein the transition atom comprises titanium, zirconium, vanadium, niobium, hafnium, tantalum, chromium, tungsten, molybdenum, iron, or nickel atoms or combinations thereof, for example titanium nitride, or titanium carbide, or mixtures thereof.

Thus, the PET homopolymers or copolymers useful according to the invention comprise, as a catalyst system, aluminum atoms and one or more alkaline earth atoms, alkali metal atoms, or alkali compound residues, optionally deactivated with one or more catalyst deactivators.

The aluminum atoms may be present, for example, in an amount from about 1 ppm to about 300 ppm, or 3 ppm to 100 ppm, or 5 to 20 ppm. Alternatively, the aluminum atoms may be present, for example, in an amount from about 1 ppm to about 35 ppm, or from 5 ppm to 25 ppm, or from 10 ppm to 20 ppm, in each case based on the total weight of the PET polymers.

The one or more alkaline earth atoms (e.g., lithium, sodium, or potassium), alkali metal atoms (e.g., magnesium or calcium), or alkali compound residues may be present, for example, in a total amount from about 1 ppm to about 25 ppm, or from 1 ppm to 20 ppm, or from 5 ppm to 18 ppm, or from 7 ppm to 15 ppm, in each case based on the total weight of the one or more PET homopolymers or copolymers.

In one aspect, the one or more alkaline earth atoms, alkali metal atoms, or alkali compound residues comprises lithium. In this aspect, the amount of lithium may be, for example, from about 1 ppm to about 25 ppm, or from 5 ppm to 20 ppm, or from 7 ppm to 15 ppm, in each case based on the total weight of the PET polymers.

In the processes by which the PET polymers are prepared, the catalyst systems used may optionally be deactivated by one or more catalyst deactivators, for example phosphorus atoms. If present, the amount of phosphorus atoms may range, for example, up to about 150 ppm, or up to 115 ppm, or up to 70 ppm.

In one aspect, the PET polymers may have intrinsic viscosities (It.V.) in the range, for example, of about 0.52 to about 1.1, or inherent viscosities (Ih.V) in the range of about 0.50 to about 0.90. In another aspect, the PET polymers useful in the inventive blends have an intrinsic viscosity of, for example, at least 0.70 dL/g, or at least 0.76 dL/g, or at least 0.80 dL/g, or at least about 0.84 dL/g obtained using the melt-phase-only polymerization process.

In the processes by which the PET polymers are produced, the final It.V. of the PET polymer is typically attained entirely by the melt-phase-only polymerization process. This is in contrast with conventional processes, in which the molecular weight of the conventional PET polymer is increased to a moderate It.V., solidified, and then followed by solid-phase polymerization to continue the molecular weight increase to the final desired higher It.V. The conventional process does not permit appreciable catalyst deactivation in the melt-phase polymerization step, because the subsequent solid-phase polymerization step requires a catalyst. Since the melt-phase-only polymerization process is capable of building the molecular weight to the desired, final It.V. entirely in the melt phase, the catalyst may be at least partially deactivated to thereby avoid at least some of the catalytic activity upon subsequent melting of particles, which is a common contributor to the generation of additional acetaldehyde.

Thus, in one aspect, the PET polymers comprise aluminum atoms, present in an amount of at least 3 ppm based on the weight of the polymer, said polymer having an It.V. of at least 0.72 dL/g obtained through a melt-phase-only polymerization process.

In another aspect, the PET polymers comprise: (i) aluminum atoms; (ii) one or more alkaline earth metal atoms, alkali metal atoms, or alkali compound residues; and (iii) a catalyst deactivator in an amount effective to at least partially deactivate the catalytic activity of the combination of the (i) aluminum atoms and (ii) the one or more alkaline earth metal atoms, alkali metal atoms, or alkali compound residues.

The PET polymers useful according to the invention preferably comprise:
(i) a carboxylic acid component comprising at least about 80 mole % of the residues of terephthalic acid, and
(ii) a hydroxyl component comprising at least about 80 mole % of the residues of ethylene glycol or 1,3-propanediol, based on 100 mole percent of carboxylic acid component residues and 100 mole percent of hydroxyl component residues in the PET polymer(s).

Typically, the PET polymers are made by a process comprising esterification wherein diols comprising ethylene glycol are reacted with dicarboxylic acids comprising terephthalic acid (as the free acid or its $C_1$-$C_4$ dialkyl ester derivative) to produce an ester monomer and/or oligomers, followed by polycondensation of the ester monomer and/or oligomers to produce the PET polymer. More than one compound containing carboxylic acid group(s) or derivative(s) thereof can be reacted during the process. All the compounds that enter the process containing carboxylic acid group(s) or derivative(s) thereof that become part of the PET polymer comprise the "carboxylic acid component." The mole % of all the compounds containing carboxylic acid group(s) or derivative(s) thereof that are in the product add up to 100 mole %. The "residues" of compound(s) containing carboxylic acid group(s) or derivative(s) thereof that are in the PET polymers refers to the portion of the compound(s) which remains in the PET polymers after the compound(s) is condensed with a compound(s) containing hydroxyl group(s) and further polycondensed to form PET polymer chains of varying length.

More than one compound containing hydroxyl group(s) or derivatives thereof can become part of the PET polymers. All the compounds that enter the process containing hydroxyl group(s) or derivatives thereof that become part of the PET polymers comprise the hydroxyl component. The mole % of all the compounds containing hydroxyl group(s) or derivatives thereof that become part of the PET polymers add up to 100 mole %. The "residues" of hydroxyl functional compound(s) or derivatives thereof that become part of the PET polymers refers to the portion of the compound(s) which remains in the PET polymers after the compound(s) is condensed with a compound(s) containing carboxylic acid group(s) or derivative(s) thereof and further polycondensed to form PET polymer chains of varying length.

The mole % of the hydroxyl residues and carboxylic acid residues in the PET polymers can be determined, for example, by proton NMR.

In other aspects, the one or more PET homopolymers or copolymers comprise:
(a) a carboxylic acid component comprising at least 90 mole %, or at least 92 mole %, or at least about 96 mole % of the residues of terephthalic acid, or diester derivates of terephthalic acid (e.g., dimethylterephthalate), and
(b) a hydroxyl component comprising at least 90 mole %, or at least 92 mole %, or at least about 96 mole % of the residues of ethylene glycol or 1,3-propanediol, more preferably ethylene glycol, based on 100 mole percent of the carboxylic acid component residues and 100 mole percent of the hydroxyl component residues in the polyester polymer.

Modifiers may be present in amount, for example, up to about 40 mole %, or up to 20 mole %, or up to 10 mole %, or up to 8 mole %, or up to 5 mole %, based on the 100 mole percent of their respective component, carboxylic acid or hydroxyl, in the polymer. Mono-, tri-, and higher-functional modifiers are typically present and/or added in amounts of only up to about 8 mole %, or up to 4 mole %, or up to about 2 mole %, based on the 100 mole percent of their respective component, carboxylic acid or hydroxyl, in the polymer.

Derivatives of terephthalic acid suitable for inclusion include $C_1$-$C_4$ dialkylterephthalates, such as dimethylterephthalate.

In addition to a diacid component of terephthalic acid or derivatives of terephthalic acid, the carboxylic acid component(s) of the present PET polymers may include one or more additional carboxylic acid compounds as modifiers, such as isophthalic acid, diester derivatives of isophthalic acid, naphthalene-2,6-dicarboxylic acid, derivatives of naphthalene-2,6-dicarboxylic acid, or mixtures thereof, mono-carboxylic acid compounds, other dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of dicarboxylic acid modifiers useful as part of an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, and naphthalene-2,6-dicarboxylic acid being most preferable. It should be understood that use of the corresponding acid anhydrides, esters, and acid chlorides of these acids are included in the term "carboxylic acid". It is also possible the carboxylic acid component may include tricarboxyl compound branching agents and compounds with a higher number of carboxylic acid groups to modify the PET polymers, along with monocarboxylic acid chain terminators.

In addition to a hydroxyl component comprising ethylene glycol, the hydroxyl component of the present PET polymers may include additional modifier mono-ols, diols, or compounds with a higher number of hydroxyl groups. Examples of hydroxyl modifiers include cycloaliphatic diols preferably having 6 to 20 carbon atoms and/or aliphatic diols preferably having 3 to 20 carbon atoms. More specific examples of such diol modifiers include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. As hydroxyl component modifiers, the PET polymers may preferably contain such comonomers as 1,4-cyclohexanedimethanol and diethylene glycol.

The PET polymers may be blended with polyalkylene naphthalates or other thermoplastic polymers such as polycarbonate (PC) and polyamides. It is preferred, however, that the PET polymers are comprised predominantly of repeating polyethylene terephthalate polymers, for example in an amount of at least 80 wt. %, or at least 90 wt. %, or at least about 95 wt. %, based on the total weight of the PET homopolymers or copolymers.

In one aspect, the composition contains less than about 60 wt %, or less than 40 wt %, or less than 20 wt. %, or less than 10 wt. %, or less than 5 wt. %, or no post-consumer recycled polyester polymer ("PCR") present in the composition, based on the total weight of all polyester polymers. In another embodiment, the composition contains PCR in an amount of greater than zero and up to about 60 wt. %, or up to 40 wt. %, or up to 20 wt %, or up to 10 wt. %, based on the total weight of all polyester polymers.

The PET polymers useful according to the invention thus include aluminum atoms, in the form of an aluminum residue that remains in the PET polymer melt upon addition of the aluminum compound to the melt-phase-only polymerization process for making the PET polymers, without regard to the oxidation state, morphological state, structural state, or chemical state of the aluminum compound as added or of the residue present in the composition. The aluminum residue may be in a form identical to the aluminum compound as added to the melt-phase polymerization process, but typically will be altered since the aluminum is believed to participate in accelerating the rate of polycondensation. By the term "aluminum atoms" or "aluminum" we mean the presence of aluminum in the polyester polymer detected through any suitable analytical technique regardless of the oxidation state of the aluminum. Suitable detection methods for the presence of aluminum include inductively coupled plasma optical emission spectroscopy (ICP). The concentration of aluminum is reported as the parts per million of metal atoms based on the weight of the PET polymers. The term "metal" does not imply a particular oxidation state.

Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-butyrate, aluminum tri-tert-butyrate, mono-sec-butoxyaluminum diisopropylate, aluminum glycolates such as aluminum ethylene glycolate, and aluminum chelates in which the alkoxy group of an aluminum alcoholate is partially or wholly substituted by a chelating agents such as an alkyl acetoacetate or acetylacetone such as ethyl acetoacetate aluminum diisopropylate, aluminum tris(ethyl acetoacetate), alkyl acetoacetate aluminum diisopropylate, aluminum monoacetylacetate bis (ethyl acetoacetate), aluminum tris(acetyl acetate), aluminum acetylacetonate.

Preferred among the aluminum compounds are the basic carboxylic acid salts of aluminum and aluminum alcoholates. Basic carboxylic acid salts of aluminum include monobasic and dibasic compounds. The basic aluminum acetate used can be either the diacetate monohydroxy compound or the monoacetate dihydroxy compound or a mixture thereof. In particular, basic aluminum acetate and aluminum isopropoxide are preferred aluminum compounds. Stabilizing basic aluminum acetate with boric acid may in some instances increases its solubility. Aluminum isopropoxide is desirable.

The amount of aluminum present in the PET polymer generally ranges from, for example, at least 3 ppm, or at least 5 ppm, or at least 8 ppm, or at least 10 ppm, or at least 15 ppm, or at least 20 ppm, or at least 30 ppm, and up to about 150 ppm, or up to about 100 ppm, or up to about 75 ppm, or up to about 60 ppm aluminum based on the weight of the polymer. The preferred range of aluminum is from about 5 ppm to about 60 ppm. Other suitable amounts include from 7 ppm, or from 10 ppm and up to 60 ppm, or up to 40 ppm, or up to 30 ppm aluminum atoms.

An alkali metal residue or an alkaline earth metal residue is the alkali metal atoms or alkaline earth metal atoms present in the PET polymer in any form or oxidation state, or if an alkali compound is used, then the residual remainder of the alkali compound present within the PET melt or the finished PET polymer or PET article, without regard to the oxidation states or ultimate physical, morphological, structural, or chemical states. The word "alkali metal" or "alkaline earth metal" or "metal" includes the atom in its elemental state or in an oxidation state corresponding to its allowable valences in its Periodic group. The chemical state of the alkali compound upon addition is also not limited. The alkali compound may be added as a metal compound, organometallic compound, or as a compound without a metal. Likewise, the chemical state of the alkaline earth metal compound or alkali metal compound upon addition is not limited.

The alkali metals and alkaline earth metals include the metals in Group IA and Group IIA of the periodic table, including Li, Na, K, Rb, Cs, Mg, Ca, Sr, and especially Li, Na or K. If rapid rates and clarity are the primary concern, Li may be preferred. If color is the primary concern, Na may be preferred. The metals may be added to the melt phase as metal compounds (which includes a complex or a salt) having counterions, among which the preferred ones are hydroxides, carbonates, and carboxylic acids disclosed and claimed in U.S. patent application Ser. No. 11/495,431, filed Jul. 28, 2006 and having common assignee herewith, the disclosure of which is incorporated herein by reference in its entirety.

Suitable alkali compounds are those mentioned in U.S. Pat. No. 6,156,867, the relevant disclosure of which is incorporated herein by reference. They include the tertiary amine compounds and the quaternary ammonium compounds. The particular amine compounds selected are desirably those which do not impart more yellow color to the polymer.

The ratio of the moles the one or more of alkali metal atoms, alkaline earth metal atoms, or alkali compound residues to the moles of aluminum (M:Al mole ratio, M:Al MR) generally ranges from at least 0.1, or at least 0.25, or at least 0.5, or at least 0.75, or at least 1, or at least 2, and up to about 75, up to about 50, up to about 25, up to about 20, up to about 15, up to about 10, or up to about 8, or up to about 6, or up to about 5. In one aspect, PET polymers useful for the inventive polymer blends comprise lithium atoms, sodium atoms, potassium atoms, or mixture thereof to aluminum atoms in a M:Al molar ratio, for example, from about 0.5 to about 10.

The weight of aluminum and alkaline earth metal or alkali metal can be measured by analytical techniques for detecting the amount in the finished PET polymer or article. Suitable detection methods for the presence of aluminum and alkali metals or alkaline earth metals include inductively coupled plasma optical emission spectroscopy (ICP). While X-ray fluorescence spectroscopy (XRF) is a suitable detection method for some alkaline earth metals and some alkali metals, it may not be suitable for detecting aluminum at lower levels, like those found in PET polymer. As used herein, the concentration of an alkaline earth metal or an alkali metal is reported as the parts per million of metal atoms based on the weight of the PET polymer. For non-metal, amine or ammonium containing alkali compound residues, loading of residues may by determined by reduced pressure chemiluminescence detection methods using a total nitrogen analyzer from, for example, Mitsubishi Chemical Corporation.

The aluminum and alkali or alkaline earth metals may be added as a solution, fine dispersion, a paste, a slurry, or neat. They are preferably added as a liquid, a melt, or a free flowing solid which can be metered. Most preferably they are added as a liquid, and in particular as a liquid solution or dispersion.

Other catalyst metals may be present, if desired. For example, Mn, Zn, Sb, Co, Ti, and/or Ge catalysts may be used in conjunction with aluminum compound and the one or more alkaline earth metal compound, alkali metal compound, or alkali compound. Titanium catalysts can be used, particularly if the melt-phase process involves ester exchange reactions, or the reactions may be carried out in the substantial absence of titanium. Suitable titanium catalysts include those compounds added in amounts which increase the It.V. of the PET polymer melt by, for example, at least about 0.3 dL/g, if not deactivated, under the operating conditions used to make the PET polymer.

In one aspect, the amount of antimony may be limited, or antimony may be absent from the reaction mixture. Thus, the amount of antimony present may be, for example, 0 ppm, that is, the reactions may be carried out in the absence of antimony. Alternatively, the amount of antimony present may be no more than 10 ppm, or no more than 20 ppm, or no more than 40 ppm, or no more than 60 ppm, in each case based on the weight of the one or more polyethylene terephthalate homopolymers or copolymers. Without wishing to be bound by any theory, we believe that the presence of antimony may interfere with the oxygen-scavenging results of the inventive blends, and that polyesters made using the catalyst systems described herein may have substantially improved oxygen-scavenging activity when compared with polyesters or blends containing substantial amounts of antimony.

In another aspect, antimony may be used as a catalyst, or as a reheat additive, or both, in amounts for example, from about 5 ppm to about 30 ppm, or from about 10 ppm to about 20 ppm.

Preferably, the PET polymers of the inventive polymer blends are made without the addition of titanium, cobalt, or antimony to the melt-phase polymerization process, or even without the addition of any catalytically active metal or metal compounds to the melt-phase polymerization process other than the aluminum compound and the one or more alkali metal compounds, alkaline earth metal compounds, or alkali compounds (e.g., for measurement purposes, compounds are catalytically active if they increase the reaction rate or increase the It.V. by at least 0.1 dL/g from a starting point of 0.2 to 0.4 dL/g after 1 hour at 280° C. and 0.8 mm Hg with agitation). It is to be recognized, however, that one or more of metals such as cobalt or manganese will most likely be present at low levels in the melt because they come as impurities with the terephthalic acid composition made from a metal-catalyzed, liquid-phase oxidation process. Of course, the inventive blends of the invention may contain a transition metal provided to the blend as an oxidation catalyst. It may be best to add such transition metal either late in the polymerization process, or even during the blending to produce the inventive blends.

The PET polymers suitable for use in the inventive blends may also contain a catalyst deactivator. By a catalyst deactivator we mean a compound effective to at least partially deactivate or inhibit the activity of the catalyst system. A compound is effective to at least partially deactivate the catalyst system when by its addition at a given level, and solely for testing the effectiveness of a compound at a given level, when either or both a) the rate of solid-stating under actual operating conditions is reduced relative to the same polymer without the catalyst deactivator ("no additive case") and/or b) when added earlier, the rate of the melt-phase polymerization process under actual operating conditions to a constant It.V. target is reduced, that is, it takes more time to reach the It.V. target, or the It.V. of the polymer is reduced at constant time relative to the no additive case. The catalyst deactivator may also reduce the rate of acetaldehyde (AA) generation upon melting particles relative to the no additive case to lower the contribution of AA generation on AA levels in a molded article, such as a preform, relative to a no additive case, and preferably upon melting particles having an It.V. of at least 0.72 dL/g obtained from a melt-phase polymerization process.

The catalyst deactivator is typically added late during the process of manufacturing the PET polymer in order to limit the activity of the catalyst system during subsequent melt processing steps, in which the catalyst system would otherwise catalyze the conversion of acetaldehyde precursors present in the particles of PET polymer to acetaldehyde and/or catalyze the formation of more AA precursors and their subsequent conversion to AA. Left untreated, the PET polymer would have a high acetaldehyde generation rate during extrusion or injection molding, thereby contributing to an increase in the AA levels in articles made from the PET polymer. The catalyst deactivator may also help thermally stabilize the PET polymer melt near the end of melt phase polycondensation and during remelting which occurs, for example, during melt blending and processing the inventive polymer blends into articles, without which more reactions would occur to cleave the polymer chains in the highly viscous melt, a route to forming more AA precursors and ultimately, more AA. The catalyst deactivator is not added along with the addition of aluminum compounds or the one or more alkali metal compounds or alkaline earth metal compounds or alkali compounds, nor is it added at the commencement of polycondensation because it would inhibit the catalytic activity of the metal catalysts and hence, the rate of polycondensation.

Suitable catalyst deactivator compounds are preferably phosphorus-containing compounds. It should be noted, however, that not all types or forms of phosphorus compounds are catalyst deactivators, and if they are not, they may, if desired, be added along with the catalyst or at the commencement of polycondensation. Suitable catalyst deactivator compounds are preferably phosphorus-containing compounds, for example phosphate triesters, acidic phosphorus compounds or their ester derivatives, and amine salts of acidic phosphorus containing compounds.

Acidic phosphorus compounds have at least one oxyacid group, that is, at least one phosphorus atom double-bonded to oxygen and single-bonded to at least one hydroxyl or OH group. The number of acidic groups increases as the number of hydroxyl groups, bound to the phosphorus atom that is double-bonded to oxygen, increases.

Specific examples of phosphorus compounds include phosphoric acid, pyrophosphoric acid, phosphorous acid, polyphosphoric acid, carboxyphosphonic acids, alkylphosphonic acids, phosphonic acid derivatives, and each of their acidic salts and acidic esters and derivatives, including acidic phosphate esters such as phosphate mono- and di-esters and non-acidic phosphate esters (e.g., phosphate tri-esters) such as trimethyl phosphate, triethyl phosphate, tributyl phosphate, tributoxyethyl phosphate, tris(2-ethylhexyl)phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the PET polymer melt, poly(ethylene)hydrogen phosphate, and silyl phosphates. Haze in solutions of PET polymer comprising phosphorus containing compounds and a solvent that dissolves the PET polymer (e.g., 70/30 wt % methylene chloride/hexafluoroisopropyl alcohol) or haze in articles (e.g., molded parts) of PET polymer comprising phosphorus containing compounds is one indication of the lack of solubility or limited solubility of an the phosphorus containing compound in the PET polymer. Soluble phosphorus containing compounds are generally more likely to deactivate the catalyst system.

Other phosphorus compounds which may be added include the amine salts of acidic phosphorus compounds. The amines may be cyclic or acyclic, may be monomeric, oligomeric, or polymeric, and should be selected so as to minimize haze and/or maximize solubility when these are issues. The organic constituents of the amine may in principle be any organic group. Ammonia and related compounds like ammonium hydroxide are suitable.

The quantity of phosphorus compound or other catalyst deactivator used in this process is effective to reduce the amount of AA generated upon remelting the polymer produced in the melt-phase-only polymerization process by partially or fully deactivating the catalytic activity of the combination of the (i) aluminum atoms and (ii) the one or more alkaline earth metal atoms, alkali metal atoms, or alkali compound residues. Typical amounts of phosphorus atoms are, for example, at least about 15 ppm, or at least 30 ppm, or at least 50 ppm, or at least about 100 ppm.

The cumulative amount of aluminum atoms, alkali or alkaline earth metal atoms, and any other catalyst metals present in the melt should be considered. The ratio of the moles of phosphorus (P) atoms to the total moles of aluminum atoms and alkaline earth metal atoms and/or alkali metal atoms (P:M MR where M is deemed to be the sum of the moles of aluminum, the moles of alkaline earth metals, if present and the moles of alkali metals, if present, and where MR stands for mole ratio) is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Large quantities of phosphorus compounds should be avoided to minimize the loss in polymer It.V. upon addition of the phosphorus compound to the PET polymer melt. A suitable range for P:M MR is, for example, about 0.5 to about 1.5.

Compounds of metals other than aluminum, alkali metals and alkaline earth metals also react with phosphorus compounds. If, in addition to compounds of aluminum, alkali metals and/or alkaline earth metals, other compounds (e.g., compounds of other metals or non-metal containing alkali compounds) that react with phosphorus compounds are present, then the amount of phosphorus compound added late is desirably in excess of that required to achieve the targeted P:M MR to ensure that the phosphorus compounds react or combine with all reactive metals present.

If desired, a partial amount of phosphorus compound may be added early in the melt-phase-only polymerization process, such as at the initiation of polycondensation, and a final amount added late in the course of polycondensation or thereafter but before solidification as explained further below. To maximize polycondensation and/or production rates, the majority, or the bulk, or the whole of the phosphorus compound is added late to the melt-phase-only polymerization process.

The PET polymers useful in the inventive blends may be made by a melt-phase-only polymerization process comprising forming a PET polymer melt in the presence of aluminum atoms and one or more alkali metal atoms, alkaline earth metal atoms, or alkali compound residue. At least a portion of the polycondensation reaction proceeds in the presence of the combination of aluminum atoms and the one or more alkali metal atoms, alkaline earth metal atoms, or alkali compound residues. The various ways in which aluminum atoms and the one or more alkali metal atoms, alkaline earth metal atoms, or alkali residues may be added, their order of addition, and their points of addition are further described in U.S. patent application Ser. No. 11/495,431, incorporated herein by reference in its entirety and further elaborated upon below.

The one or more alkaline earth metal compounds, alkali metal compounds, or alkali compounds may, if desired, be added to the esterification zone before, during, or after completion of esterification, or between the esterification zone and polycondensation zone, or at a point when polycondensation starts. For example, the one or more alkaline earth metal compounds, alkali metal compounds, or alkali compounds may be added before 50% conversion of the esterification reaction mixture. Alternatively, the one or more alkaline earth metal compounds, alkali metal compounds, or alkali compounds may be added between the esterification zone and inception of or during polycondensation or at the inception or during prepolymerization. Since the one or more alkali metal compounds, alkaline earth metal compounds, or alkali compounds operates as part of the polycondensation catalyst system, it is desirable to add the one or more alkali metal compounds, alkaline earth metal compounds, or alkali compounds to the PET polymer melt early in the polycondensation reaction to provide the benefit of shorter reaction time or a higher molecular weight build-up.

In the polymerization process, the PET polymer melt ("polyester melt") is formed by polycondensing the oligomer mixture in the presence of aluminum atoms. Aluminum atoms may be added as an aluminum compound late to the esterification zone, to the oligomer mixture exiting the esterification zone, or at the start of polycondensation, or to the PET polymer melt during polycondensation, and preferably as noted above after at least about 75% conversion in the esterification zone. However, since aluminum atoms operate as part of the polycondensation catalyst system, it is desirable to add aluminum compound to the PET polymer melt early in the polycondensation reaction to provide the benefit of shorter reaction time or a higher molecular weight build-up. An aluminum compound is added preferably when the percent conversion of the acid end groups is at least 75%, more preferably when the % conversion of the acid end groups is at least 85%, and most preferably when the % conversion of the acid end groups from esterification is at least about 93%.

An aluminum compound may be added to the oligomer mixture upon or after completion of esterification or to a PET polymer melt no later than when the It.V. of the melt reaches about 0.3 dL/g, or no later than when the It.V. of the melt reaches 0.2 dL/g, and more preferably to the oligomer mixture exiting the esterification zone or prior to commencing or at the start of polycondensation.

When the catalyst deactivator, for example, the phosphorus compound, is added to a melt-phase-only polymerization process, the catalyst deactivator is added to the PET polymer melt late during the course of polycondensation and before solidification. The deactivator is added to the PET polymer melt late in the course of the polycondensation reaction when one or more of the following conditions are satisfied or thereafter and before solidification of the PET polymer melt:

a) the PET polymer melt reaches an It.V. of at least 0.50 dL/g or
   b) vacuum applied to the PET polymer melt, if any, is released, at least partially, or
   c) if the PET polymer melt is present in a melt-phase-only polymerization process, adding the catalyst deactivator, for example, the phosphorus compound, within a final reactor for making the PET polymer, near its discharge point, or between the final reactor and before a cutter for cutting the polyester melt, or d) if the PET polymer melt is present in a melt-phase-only polymerization process, following at least 85% of the time for polycondensing the polyester melt; or e) the It.V. of the PET polymer melt is within +/−0.15 dl/g of the It.V. obtained upon solidification; or f) at a point within 30 minutes or less, or 20 minutes or less of solidifying the PET polymer melt.

The catalyst deactivator may be added to the PET polymer melt after the PET polymer melt obtains an It.V. of at least about 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least about 0.78 dL/g, and most preferably, regardless of when the catalyst deactivator is added, the resulting PET polymer melt exiting the melt-phase-only polymerization process has an It.V. of at least 0.68 dL/g or at least 0.72 dL/g or at least about 0.76 dL/g.

The catalyst deactivator may be added to the PET polymer melt when the It.V. of the PET polymer melt is within about 0.15 dL/g, or within 0.10 dL/g, or within 0.05 dl/g, or within 0.030 dL/g, or within 0.02 of the It.V. obtained upon solidification. For example, the PET polymer melt could have an It.V. that is 0.10 dL/g below the It.V. obtained upon solidification, or it could have an It.V. that is 0.10 dL/g above the It.V. obtained upon solidification.

The catalyst deactivator may be added to the PET polymer melt at a point within about 30 minutes or less, within 20 minutes or less, or within 10 minutes or less, or 5 minutes or less, or 3 minutes or less of solidifying the PET polymer melt. The solidification of the PET polymer melt typically occurs when the melt is forced through a die plate into a water bath and cut into pellets, or in a melt-to-mold process when the melt is formed into an article (e.g., injection molded into a molded article or extruded into a film). In the broadest sense, solidification occurs when the temperature of the PET polymer melt is cooled below the crystalline melting temperature of the PET polymer.

Once the molecular weight of the PET polymer melt is built to the desired degree, it may be discharged from the final polycondensation reactor, in this case a finisher, to be pelletized. A gear pump may be utilized to facilitate funneling an amount of PET polymer melt through a conduit to exit from the finishing vessel. Prior to cutting the PET polymer melt, and in another aspect, prior to exiting the melt-phase-only polymerization process (e.g., exiting the final reactor), it may be desirable to combine the PET polymer melt in the melt phase with a second stream that is a liquid (which includes a molten stream, dispersions, emulsions, homogeneous liquids, and heterogeneous slurries). The second stream may be introduced into the melt-phase-only polymerization process at any stage prior to solidification, but preferably between the cutter and the entry of the PET polymer melt into the final reactor (such as a finisher). The second stream may be introduced after the last half of the residence time within the final reactor and before the cutter.

The manner in which the second liquid stream is introduced and the source of the second liquid stream is not limited. For example, it may it may be desirable to treat and additionally process a portion of a slip stream. Once treated, the treated portion of the slip stream may be circulated back to the finishing tank. In another example, it may be desirable to introduce a second liquid stream into the finisher through an extruder or a pumping means from a source independent from or other than the PET polymer melt produced in the melt-phase-only polymerization process.

The catalyst deactivator may be added into a slip stream taken from the stream exiting the final polycondensation reactor and recirculated back into the final reactor or at a point before the slipstream is taken from the PET polymer melt stream exiting the final reactor. In addition, other compounds such as UV inhibitors, colorants, reheat additives, or other additives can be added into a slipstream depending upon the fitness for use requirements of the polymer in its ultimate application. Any one or a mixture of these additives may be contained in the second liquid stream.

Once the desired It.V. is obtained, the PET polymer melt in the melt-phase-only polymerization process reactors may be discharged as a melt-phase-only product and solidified.

The PET polymer melt is processed to a desired form, such as amorphous particles; however, crystallized pellets are preferred. The shape of the PET polymer particles is not limited, and can include regular or irregular shaped discrete particles without limitation on their dimensions, including stars, spheres, spheroids, globoids, cylindrically shaped pellets, conventional pellets, pastilles, and any other shape, but particles are distinguished from a sheet, film, preforms, strands or fibers.

The PET polymer is one which is crystallizable. The method and apparatus used to crystallize the PET polymer is not limited, and includes thermal crystallization in a gas or liquid.

Crystallized PET polymers that are catalyzed by aluminum and one or more alkaline earth metal atoms, alkali metal atoms, or alkali compound residues tend to be brighter or have higher L* color values relative to crystallized conventional PET polymers catalyzed by antimony systems under the same polymerization conditions. Moreover, the late addition of a phosphorus compound to PET polymer melts catalyzed by aluminum and one or more alkaline earth metal atoms, alkali metal atoms, or alkali compound residues tend to produce PET polymers which when crystallized have even higher L* color values or higher brightness relative to the no phosphorus case, which may have somewhat higher It.V. For example, the crystallized PET polymers obtained by the process described herein may have an L* of at least about 55, or at least 60, or at least, 65, or at least 70.

Reheat additives (a reheat additive is deemed a compound added to the melt in contrast to forming a reheat aid in situ) may also be added to the PET polymer melt and include, for example, activated carbon, carbon black, antimony metal, tin, titanium nitride, titanium, copper, silver, gold, palladium, platinum, black iron oxide, and the like, as well as near infrared absorbing dyes, including, but not limited to those disclosed in U.S. Pat. No. 6,197,851 which is incorporated herein by reference.

Titanium nitride particles may be added as a reheat additive at any point during polymerization of the PET polymers, or afterward, including to the esterification zone, to the polycondensation zone comprised of the prepolymer zone and the finishing zone, or prior to the pelletizing zone, and at any point between or among these zones. The titanium nitride particles may also be added to solid-stated PET polymer pellets as they are exiting the solid-stating reactor. Furthermore, the titanium nitride particles may be added to the PET pellets in combination with other feeds to the injection molding machine, or may be fed separately to the injection molding machine. For example, the titanium nitride particles may be added to the PET polymer melt in the melt-phase-only polymerization process during production of the PET polymer or to the PET polymer melt in an injection molding machine without solidifying and isolating the PET polymer melt into pellets of PET polymer. Thus, the particles may also be added in a melt-to-mold process at any point in the process for making the preforms. In each instance at a point of addition, the particles can be added as a powder neat, or in a liquid, or a polymer concentrate, and can be added to virgin or recycled PET, or added as a polymer concentrate using virgin or recycled PET as the PET polymer carrier.

The titanium nitride particles may have an average particle size, for example, from about 1 nm to about 1,000 nm, or from 1 nm to 300 nm, or from 1 nm to 100 nm, or from 5 nm to 30 nm, and may be present in the polymer blends of the invention in amounts, for example, from about 0.5 ppm to about 1,000 ppm, or from 1 ppm to 200, or from 1 ppm to 50 ppm.

The polymer blends according to the invention may be prepared, for example, by adding the one or more oxygen-scavenging polymers to the one or more PET homopolymers or copolymers during polycondensation. Likewise, the oxygen-scavenging polymers may be incorporated into the inventive polymer blend by melt-blending with the one or more PET homopolymers or copolymers, for example by heating the components to obtain melt homogenization in an extruder.

The one or more oxygen scavenging-polymers may be provided to the inventive polymer blends as, for example, copolycondensates comprising one or more functionalized polybutadiene homopolymers or copolymers ("functionalized polybutadienes"), such as those described in U.S. Pat. No. 6,083,585 and U.S. application Ser. No. 11/364,916, incorporated herein by reference in their entirety and further elaborated upon below. The one or more copolycondensates may comprise predominantly PET homopolymer or copolymer segments or conventional PET polymers and oxygen-scavenging segments of functionalized polybutadiene in an amount, for example, from about 0.5 wt % to about 25 wt %, or from 5 wt % to 15 wt %, or from 8 wt % to 12 wt %, in each case based on the total weight of the copolycondensate. The oxygen-scavenging polymers may be provided to the polymer blends of the invention in amounts, for example, from about 0.25 to about 10 wt % oxygen-scavenging polymer, or from 0.75 wt % to 5 wt. % oxygen-scavenging polymer, or from 1.5 wt. % to 3.5 wt. % oxygen-scavenging polymer, or from 1 wt % to 3 wt % oxygen-scavenging polymer, in each case based on the total weight of the polymer blends of the invention. Polymer blends of the invention comprising oxygen-scavenging polymers retain significant oxygen-scavenging properties of the oxygen-scavenging polymers upon blending, for example, melt-blending and extrusion, while retaining the properties of the one or more polyethylene terephthalate (PET) homopolymers or copolymers that make them suitable for use in packaging.

Generally, when prepared in advance of incorporation into the blends of the invention, it may be necessary or helpful to maintain the oxygen-scavenging polymers (e.g., the functionalized polybutadiene or the copolycondensates of the functionalized polybutadiene) and the products produced from the inventive blends, in an inert environment during storage prior to use as a packaging article. In some instances, an oxygen exposure induction period is needed before the full scavenging activity is evident. In other instances, and especially when an oxidation catalysts is incorporated into the polymer blend of the invention, the oxygen-scavenging activity of the inventive polymer blend is present as soon as the polymer blend is formed, or soon after the polymer blend is formed. The oxygen-scavenging capacity for useful scavenging of oxygen may thus be significantly diminished if the blend is left exposed to oxygen (or air) for lengthy periods prior to starting its service life. Premature loss of oxygen-scavenging capacity can be avoided by storing the oxygen-scavenging polymers, the inventive blends, and products produced using the inventive blends in an inert environment or by addition of suitable stabilizing agents.

A typical range for polybutadiene segments in copolycondensates useful according to the invention is from about 0.25 wt % to about 25 wt %, or from 1 wt % to 20 wt %, or from 5 wt. % to 15 wt %, in each case based on the total weight of the copolycondensate. The amount of polybutadiene segments in the inventive blends of the invention may thus range from about 0.01 wt % to about 5 wt %, or from 0.02 wt % to 2 wt %, or from 0.1 wt % to 1 wt %, in each case based on the total weight of the inventive blends of the application.

The functionalized polybutadiene may thus form a copolycondensate with the PET polymer via transesterification, a reaction whereby the functionally-terminated polybutadiene segments may be considered to be substituted for some of the former polyester monomeric species originally present in the starting PET polymer. This copolycondensate may then be used to provide the inventive blends with a suitable amount of the functionalized polybutadiene.

Thus, when we say that the polymer blends comprising the one or more PET homopolymers or copolymers (PET polymer) and the oxygen-scavenging polymers of the invention are copolymers, we mean that they are intimately mixed at a temperature at which at least some transesterification occurs. When the functionalized polybutadiene is first prepared with PET polymer (i.e., the one or more PET homopolymers polymers or copolymers of the inventive blends) to obtain a copolycondensate, substantial transesterification occurs during blending at elevated temperatures, such as by extrusion blending, so that it may no longer be possible to entirely recover the polybutadiene polymer from the PET polymer with which it is blended. Indeed, it may be preferred that the functionalized polybutadiene undergoes substantial transesterification with the PET polymer to produce a copolycondensate. This copolycondensate may then be blended with a remaining portion of the one or more PET homopolymers or copolymers, again at an elevated temperature, to obtain the polymer blends of the invention.

The functionalized polybutadiene may be added, either neat or as a copolycondensate, at locations including, but not limited to, the commencement of the esterification, proximate the outlet of an esterification reactor (i.e., where there is greater than 50% conversion), proximate the inlet to a prepolymer reactor, proximate the outlet to a prepolymer reactor, at a point between the inlet and the outlet of a prepolymer reactor, proximate the inlet to a polycondensation reactor, or at a point between the inlet and the outlet of a polycondensation reactor, or at a point between the outlet of a polycondensation reactor and a die for forming pellets, sheets, fibers, bottle preforms, or the like.

In still another aspect, the functionalized polybutadiene may be introduced, either neat or as a copolycondensate, into the final polycondensation reactor producing the one or more PET homopolymers or copolymers near the end of the polymerization process, for example at any of the following points:

a. if the PET polymer melt is present in a melt-phase-only polymerization process, adding the functionalized polybutadiene or copolycondensate within a final reactor for making the PET polymer, near its discharge point, or between the final reactor and before a cutter for cutting the PET polymer melt; or b. after the It.V. of the PET polymer melt has risen to at least 0.5 dL/g, or c. after vacuum applied to the PET polymer melt, if any, is released, at least partially; or d. if the PET polymer melt is present in a melt-phase-only polymerization process, following at least 75% of the polycondensation time;

e. to the PET polymer melt in the melt-phase-only polymerization process at a point within +/−0.15 dL/g, of the It.V. obtained upon solidification; or f. at a point at most 30 minutes before solidifying the PET polymer melt, or at most 20 minutes before solidifying the PET polymer melt.

The total amount of the functionalized polybutadiene in the inventive blends of the invention may vary widely, and will depend in part on the degree of oxygen-scavenging capacity that is desired for the particular application. Typically, the total amount of the one or more polybutadiene homopolymers or copolymers in the inventive blends of the invention will be, for example, from about 0.05 to about 10 wt. %, or from 0.1 wt % to about 5 wt %, or from 0.15 wt % to 2 wt %, in each case based on the total weight of the inventive blend.

Articles can be formed from the inventive blends by any conventional techniques known to those of skill. For example, the inventive blends may be fed to a machine for melt extruding and injection molding the melt into shapes such as preforms suitable for stretch-blow molding into beverage or food containers, or a machine for injection molding, or a machine for merely extruding into other forms such as sheet. Suitable processes for forming the articles are known and include extrusion, extrusion blow molding, melt casting, compression molding, injection molding, a melt-to-mold process, stretch-blow molding (SBM), thermoforming, and the like.

Examples of the kinds of shaped articles which can be formed include sheet; film; packaging and containers such as preforms, bottles, jars, and trays; rods; tubes; lids; and filaments and fibers. Beverage bottles made from poly(ethylene terephthalate) suitable for holding water or carbonated beverages, and heat-set beverage bottles suitable for holding beverages which are hot filled into the bottles are examples of the types of bottles which may be made from the inventive polymer blends. Examples of trays are those which are dual ovenable and other trays thermoformed from poly(ethylene terephthalate) and thereafter crystallized (a.k.a., CPET trays).

Suitable methods for making articles comprise introducing particles of the inventive polymer blends or particles of components of the inventive blends into a melt processing zone and melting the particles to form a molten inventive blend; and forming an article comprising a sheet, strand, fiber, or a molded part from the molten inventive blend.

The form of the inventive polymer blends is not limited and can include a composition in the melt phase, an amorphous pellet, a semi-crystalline particle, a composition of matter in a melt processing zone, a bottle, or other articles.

This invention can be further illustrated by the additional examples of embodiments thereof, although it will be understood that these examples are included merely for purposes of illustration and are not intended to limit the scope of the invention.

EXAMPLES

Example 1

In this example, thirteen polymer blends (Polymer Blends 1-13) were prepared as described below. Polymer Blends-1 through -13 were prepared using copolyesters PET-1 through PET-13, respectively.

PET-1 through PET-10 were polyester copolymers containing residues of terephthalic acid, ethylene glycol, and isophthalic acid, with isophthalic acid residues representing about 2.9 mole % of the dicarboxylic acid residues. Each of copolyesters PET-1 through PET-10 were prepared by means of a melt-phase-only polymerization process using a Li/Al/P catalyst system comprising about 10 to about 17 ppm Al, about 8 to about 13 ppm Li, and up to about 111 ppm phosphorus. The melt-phase-only PET polymers PET-1 through PET-10 were prepared by melt polymerizing the dicarboxylic acids and diol residues in the presence of the aluminum and lithium catalysts, reheat additive, and toners to the intrinsic viscosities as set forth in Table 1, after which phosphorus was added to the molten PET polymers. The molten polymers were then solidified and pelletized. Metal quantities were determined by Inductively Coupled Plasma Optical Emission Spectroscopy (ICP) and are also set forth in Table 1 for PET-1 through PET-10.

For comparison purposes, Polymer Blends-11 through Polymer Blend-13 were prepared using conventional PET polymers PET-11; PET-12; and PET-13, respectively. PET-11 through PET-13 were prepared using conventional polyester polymerization catalysts and a conventional polyester polymerization process whereby the polymer's final molecular weight, or final intrinsic viscosity, was achieved by a first melt-phase polymerization step to produce a conventional PET polymer having an It.V. of about 0.62 to about 0.65, followed by a solid-state polymerization step to further increase the It.V of PET-11 through PET-13 to their respective target It.V.s as reported in Table 1. The catalyst compositions of PET-11 through PET-13 are also reported in Table 1.

PET-11 was a conventional PET copolymer containing residues of terephthalic acid, ethylene glycol, and isophthalic acid, with isophthalic acid residues representing about 2.5 mole % of the dicarboxylic acid residues. The polymer contained about 250 ppm Sb and 25 ppm P, provided as a catalyst system catalyst. PET-11 was prepared by melt polymerizing the dicarboxylic acids and diol residues in the presence of the antimony and phosphorus catalysts to an intrinsic viscosity of about 0.66 dL/g, after which the molten PET was then solidified, pelletized, and solid-state polymerized to an intrinsic viscosity of 0.84 dL/g.

PET-12 was a conventional PET copolymer containing residues of dimethyl terephthalate, ethylene glycol, and cyclohexane dimethanol, with cyclohexane dimethanol residues representing about 1.7 mole % of the diol residues. The polymer contained about 210 to 240 ppm antimony, about 85 to 95 ppm phosphorus, about 50 to 60 ppm manganese, and about 15 to 25 ppm titanium, all provided as catalysts; and further contained a reheat additive, a UV dye, and toner. PET-12 was prepared by first transesterifying the dicarboxylic acid esters and diols in the presence of the manganese, antimony, and titanium catalysts. After transesterification, the phosphorus and other additives were introduced to the reaction mixture and the reaction mixture polycondensed to an intrinsic viscosity of about 0.625 dL/g. The molten PET was then solidified, pelletized, and the PET pellets were then solid-state polymerized to an intrinsic viscosity of about 0.78 to about 0.82 dl/g.

PET-13 was a conventional PET copolymer containing residues of dimethyl terephthalate, ethylene glycol, and cyclohexane dimethanol, with cyclohexane dimethanol residues representing about 1.8 mole % of the diol residues. The polymer contained about 215 to 245 ppm antimony, about 45 to 55 ppm phosphorus, and about 60 to 70 ppm zinc, all provided as catalysts; and further contained a reheat additive, a UV dye, and toner. PET-13 was prepared by first transesterifying the dicarboxylic acid esters and diols in the presence of zinc and antimony catalysts. After transesterfication, the phosphorus and other additives were introduced to the reaction mixture and the reaction mixture polycondensed to an intrinsic viscosity of about 0.625 dL/g. The molten PET was then solidified, pelletized, and then solid-state polymerized to an intrinsic viscosity of about 0.76 to about 0.80 dl/g.

The above PET polymers also contained low levels (less than 5 mol %) of DEG residues, present as a natural byproduct of the melt polymerization process, or intentionally added as a modifier, for example to control the amount of DEG present in the final polymer.

The oxygen-scavenging polymer was supplied by BP Amoco as Amosorb 4020. The oxygen-scanvenging polymer is believed to contain hydroxyl functionalized polybutadiene oligomeric moietites (oligomeric polybutadiene moieties have a molecular weight of about 1000 to 3000 and incorporated at about 12 wt % based on weight of copolycondensate) condensed with PET oligomeric moieties (e.g., oligomers derived from commercial grade PET polymer having a 0.71 I.V. prior to reactive extrusion with the hydroxyl functionalized polybutadiene) and can be prepared as described in U.S. Pat. No. 6,083,588. In addition, the Amosorb 4020 contained about 1500 ppm cobalt metal.

Polymer Blend 1

Polymer Blend 1 was prepared by separately grinding 98 wt % PET-1 (980 g) and 2 wt % Amosorb™ 4020 (20 g) to pass through a 3 mm screen. PET-1 was dried in a desiccant dryer at 150° C. for 15 hours and the Amosorb™ 4020 was ground the day prior to blending and was stored in a freezer overnight after grinding. The above materials were combined, dry-mixed, and introduced into the feed hopper of a BOY 22D molding machine (Boy Machines Inc.; Exton, Pa.). 25.7 gram preforms were molded from the blend of ground materials using the BOY 22D injection molding machine equipped with a single cavity mold. Processing conditions are given in Table 2.

Preforms molded from Polymer Blend 1 were biaxially stretch-blown molded into 500 ml round bottom bottles two days later using a custom-built reheat stretch-blow-molding machine. Bottle blowing conditions were adjusted to produce bottles exhibiting good clarity (i.e., absent haze and pearl due to preform stretch temperatures being too high or low, respectively) with similar material distribution as measured by sidewall thickness.

Polymer Blends-2 through -13

Polymer Blends-2 through -13 and corresponding samples for evaluating OTR were prepared as described for Polymer Blend-1 above using PET-2 through PET-13, respectively. Metal analyses and intrinsic viscosities are reported in Table 1.

TABLE 2

Boy 22D Setup for Molding Preforms

| Machine Parameter | Setting |
|---|---|
| Zone 1-3 Temperature (° C.) | 275-280 |
| Screw Speed (RPM) | 100 |
| Injection Pressure (PSIG) | 800 |
| Inject and Hold Time (sec) | 12 |
| Cooling Time (sec) | 13 |
| Total Cycle Time (sec) | 33 |

Figure 1B:
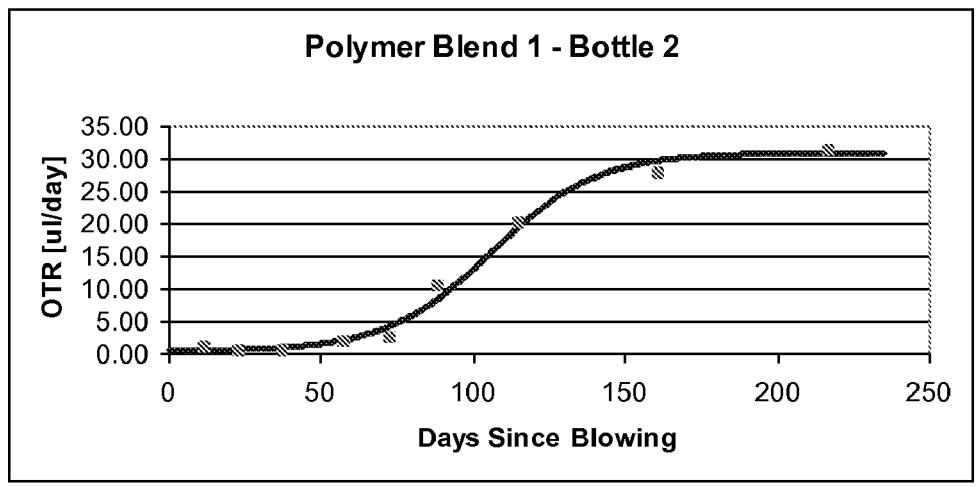
Figure 1C:
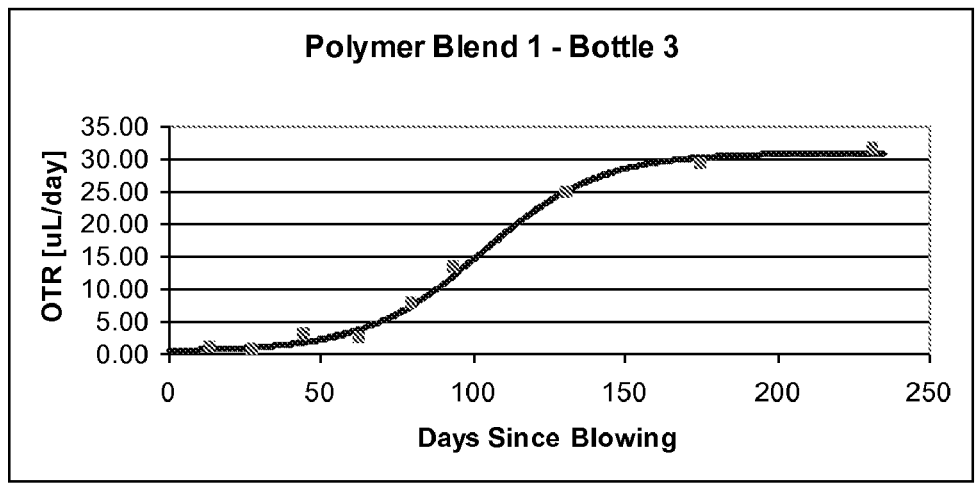
Figure 2A:
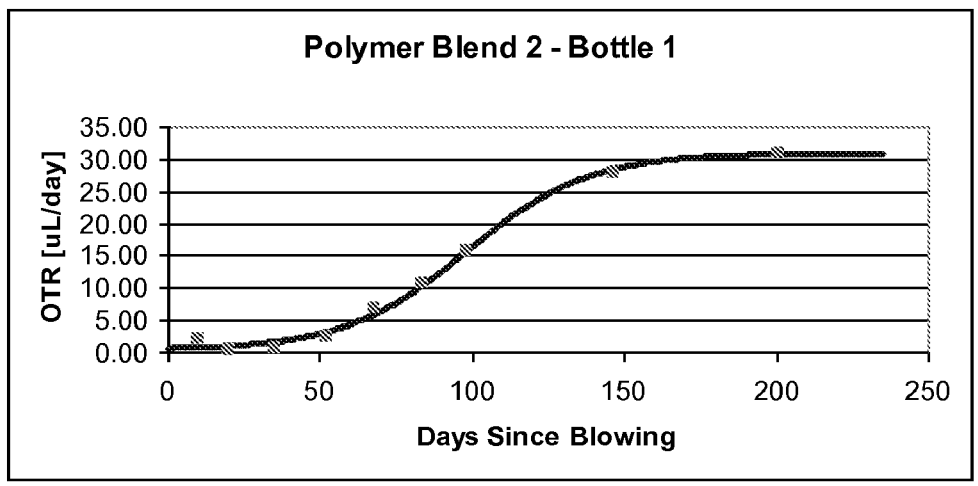
FIG. 2A-2C is a plot of the oxygen transmission rate (OTR) as a function of time for three bottles made from Polymer Blend 2. A non-linear curve is superimposed over the OTR data in each plot using the parameters reported in Table 16 with Eqn. 1.
Figure 2B:
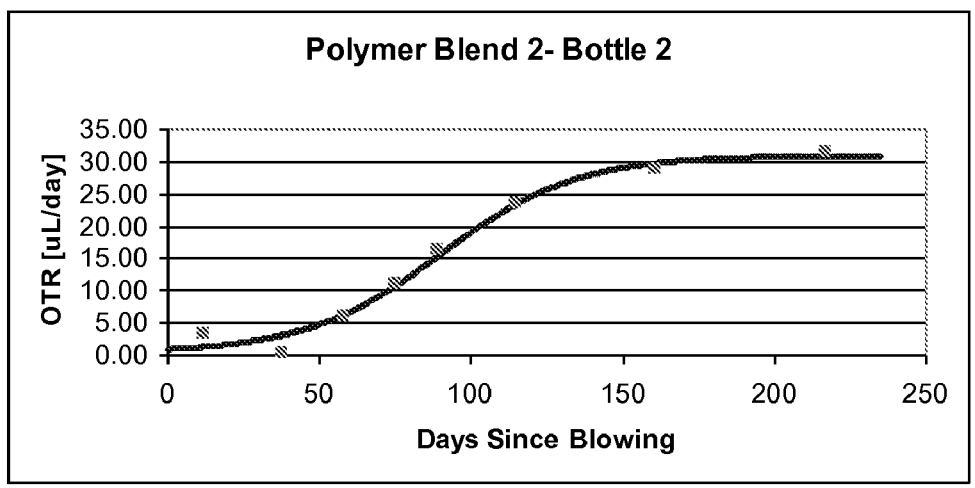
Figure 2C:
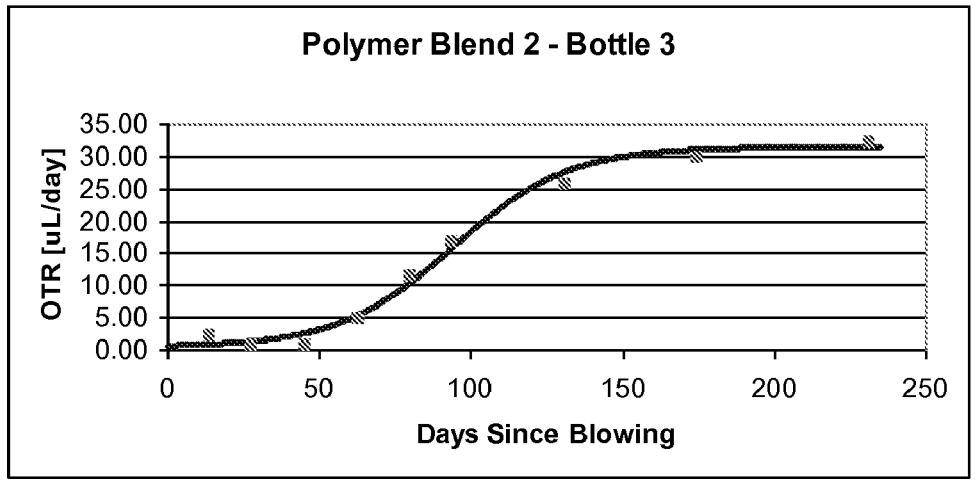
Figure 3A:
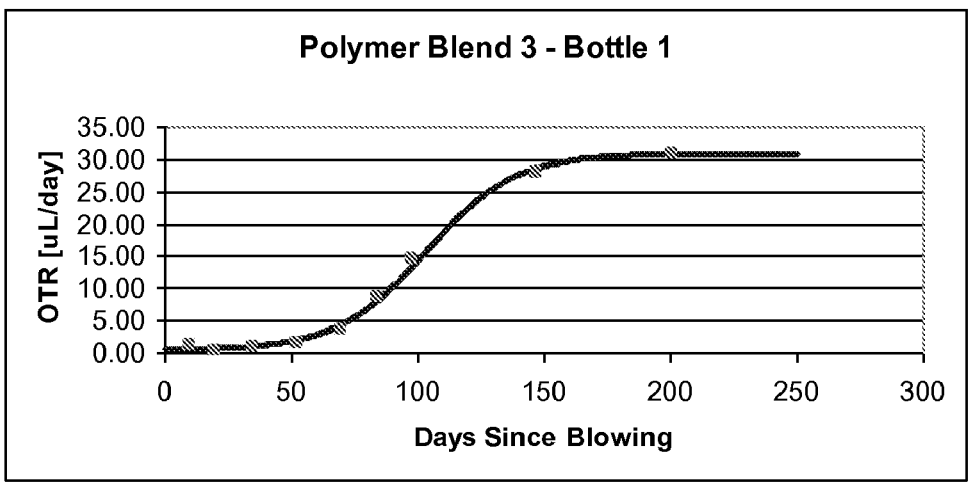
FIG. 3A-3C is a plot of the oxygen transmission rate (OTR) as a function of time for three bottles made from Polymer Blend 3. A non-linear curve is superimposed over the OTR data in each plot using the parameters reported in Table 16 with Eqn. 1.
Figure 3B:
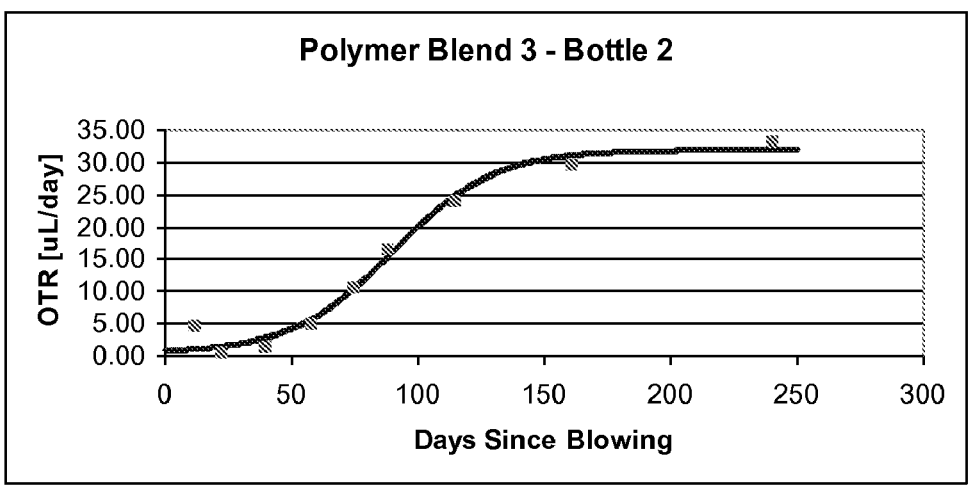
Figure 3C:
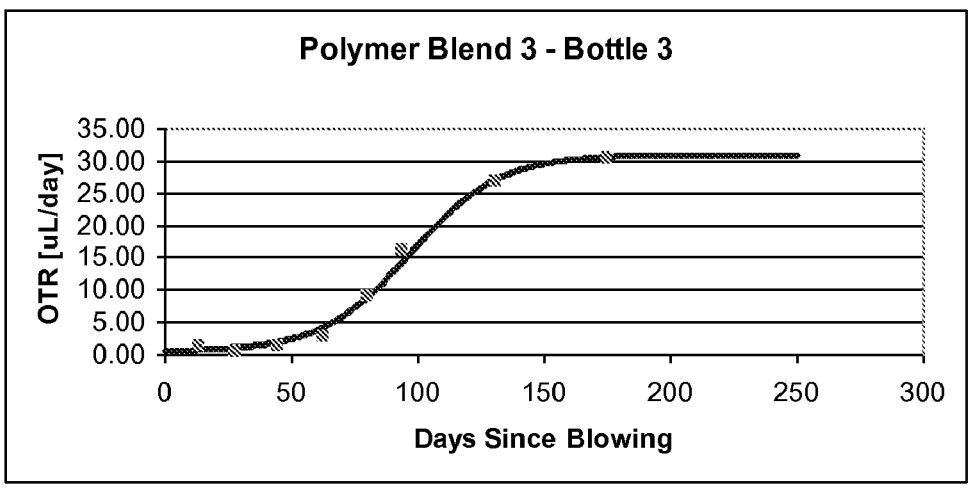
Figure 4A:
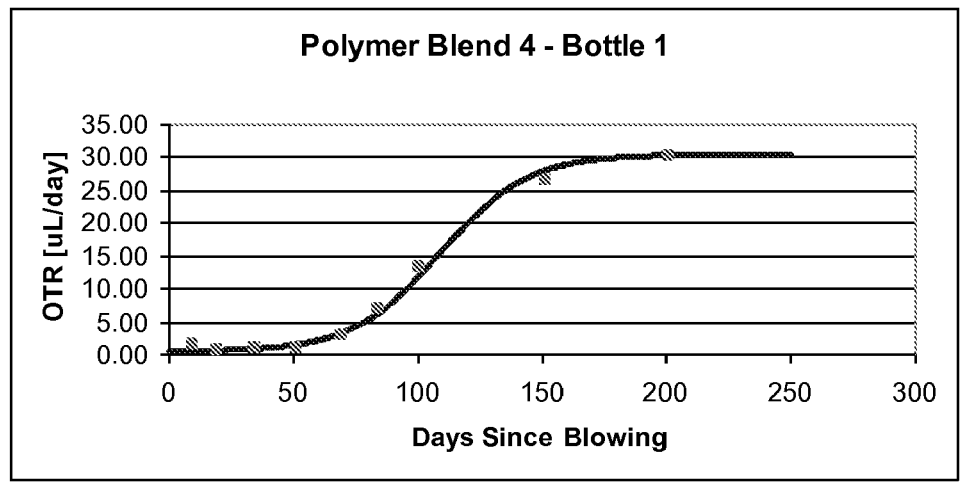
FIG. 4A-4C is a plot of the oxygen transmission rate (OTR) as a function of time for three bottles made from Polymer Blend 4. A non-linear curve is superimposed over the OTR data in each plot using the parameters reported in Table 16 with Eqn. 1.
Figure 4B:
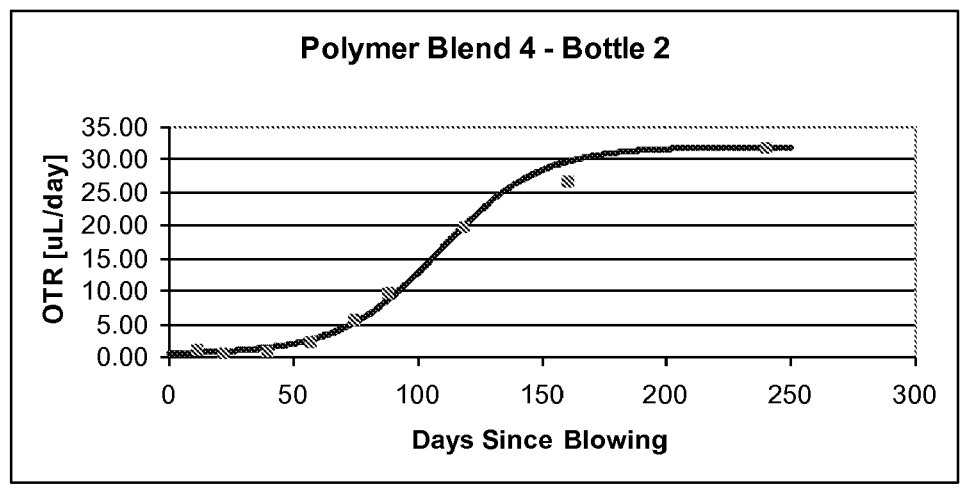
Figure 4C:
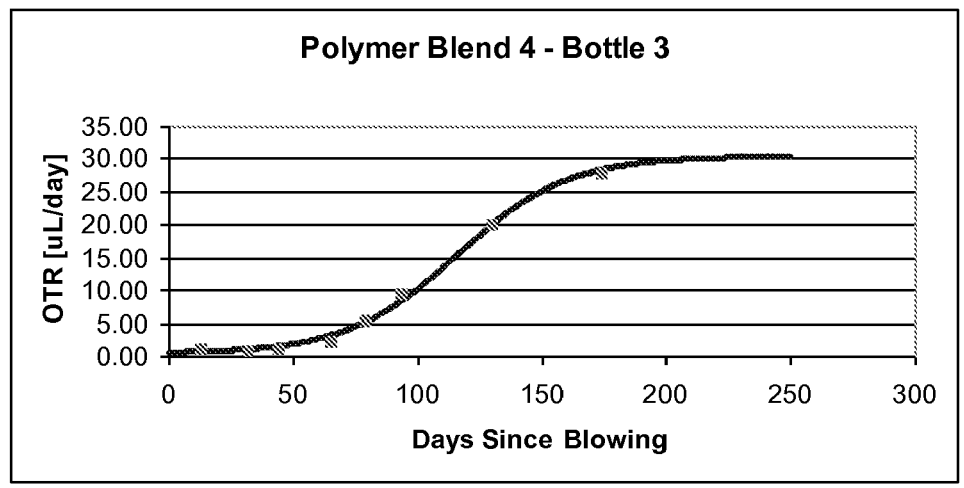
Figure 5A:
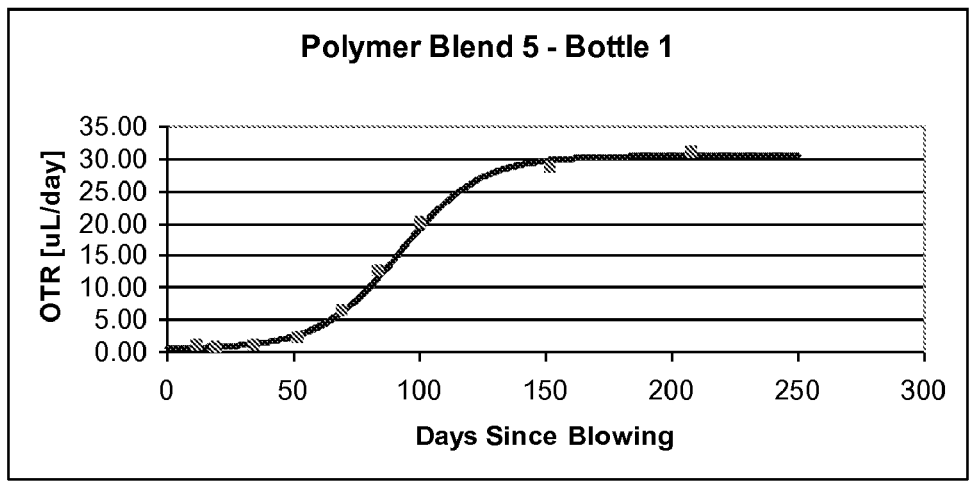
FIG. 5A-5C is a plot of the oxygen transmission rate (OTR) as a function of time for three bottles made from Polymer Blend 5. A non-linear curve is superimposed over the OTR data in each plot using the parameters reported in Table 16 with Eqn. 1.
Figure 5B:
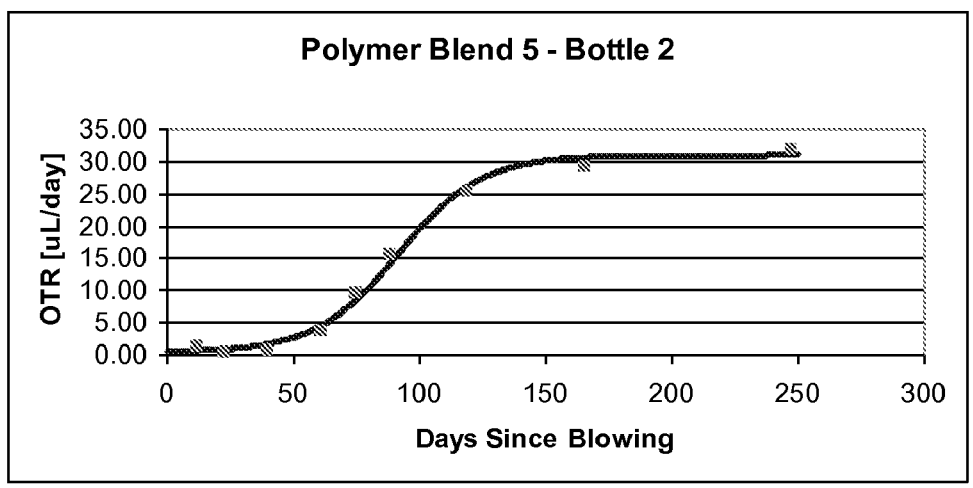
Figure 5C:
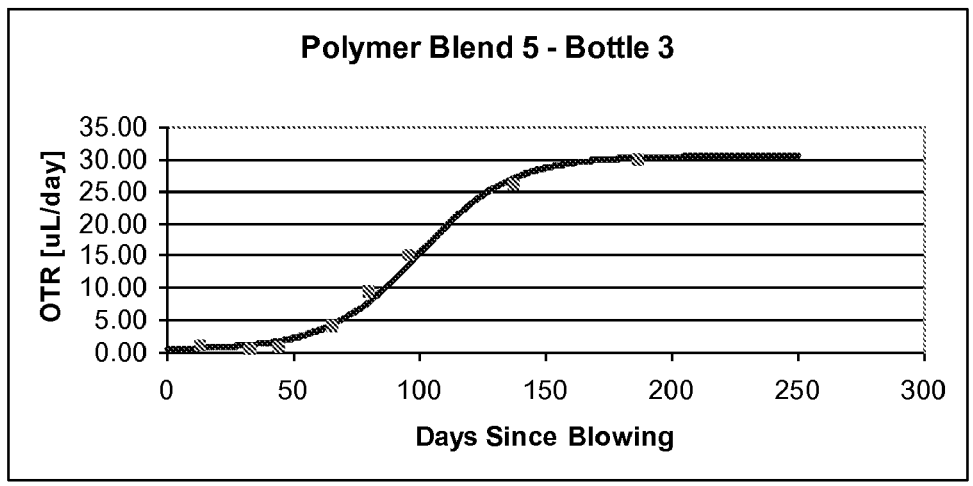
Figure 6A:
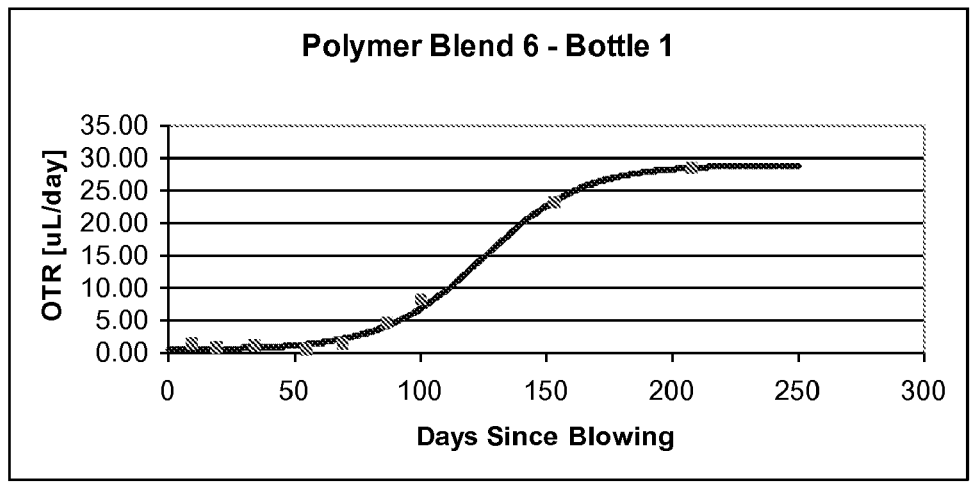
FIG. 6A-6C is a plot of the oxygen transmission rate (OTR) as a function of time for three bottles made from Polymer Blend 6. A non-linear curve is superimposed over the OTR data in each plot using the parameters reported in Table 16 with Eqn. 1.
Figure 6B:
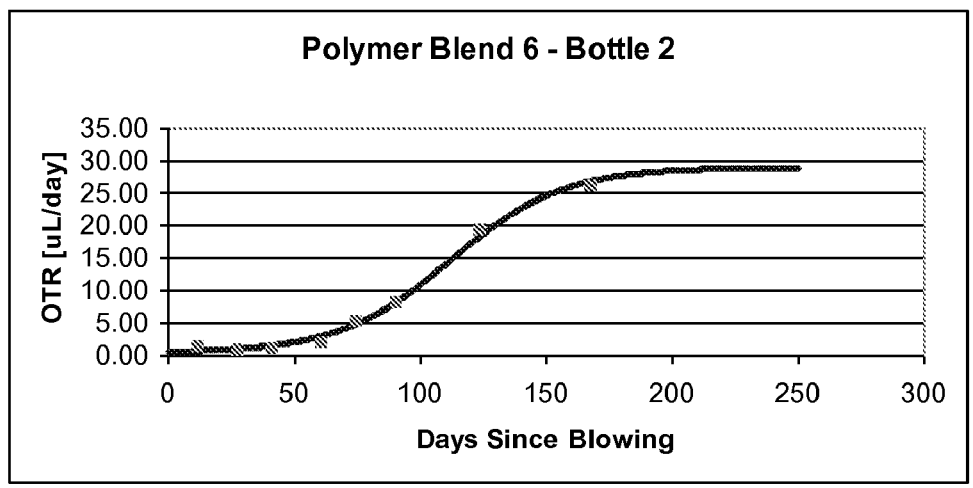
Figure 6C:
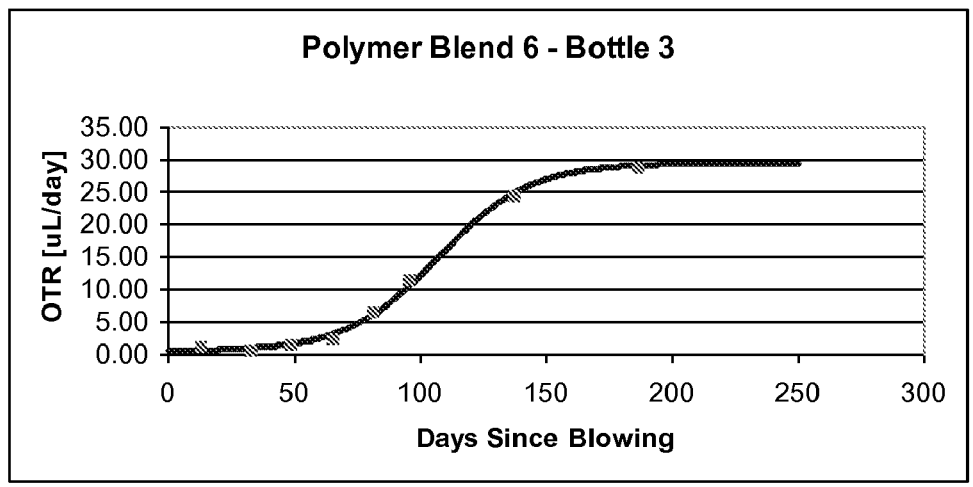
Figure 7A:
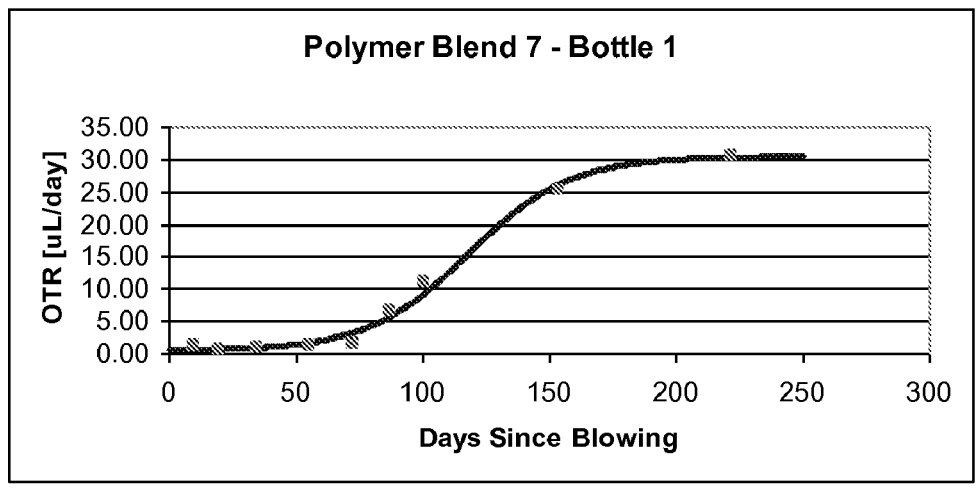
FIG. 7A-7C is a plot of the oxygen transmission rate (OTR) as a function of time for three bottles made from Polymer Blend 7. A non-linear curve is superimposed over the OTR data in each plot using the parameters reported in Table 16 with Eqn. 1.
Figure 7B:
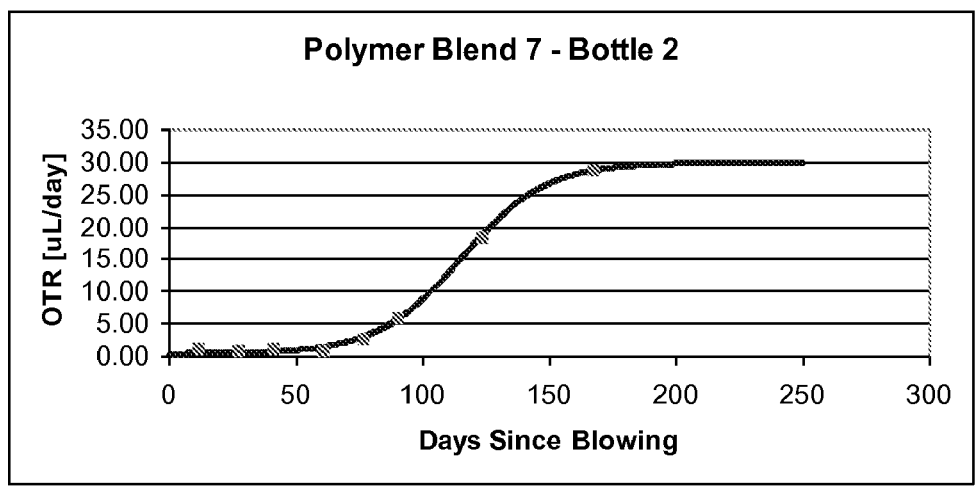
Figure 7C:
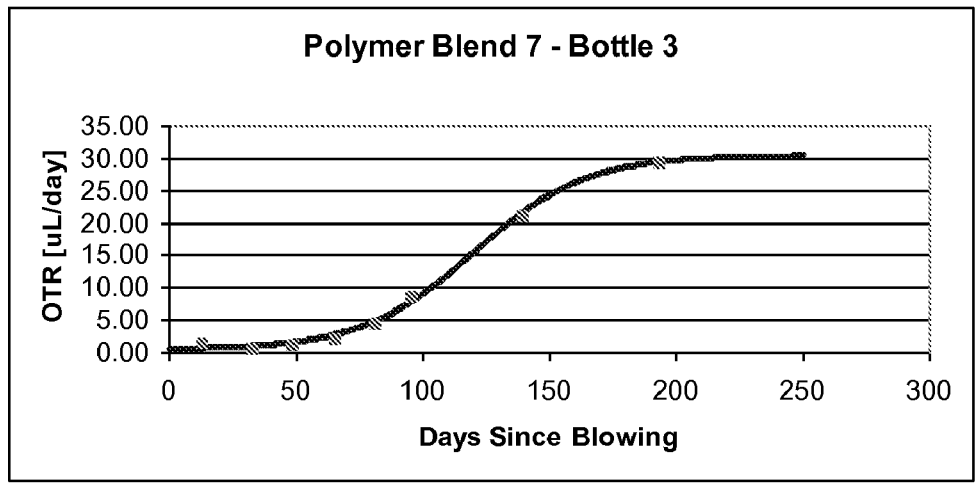
Figure 8A:
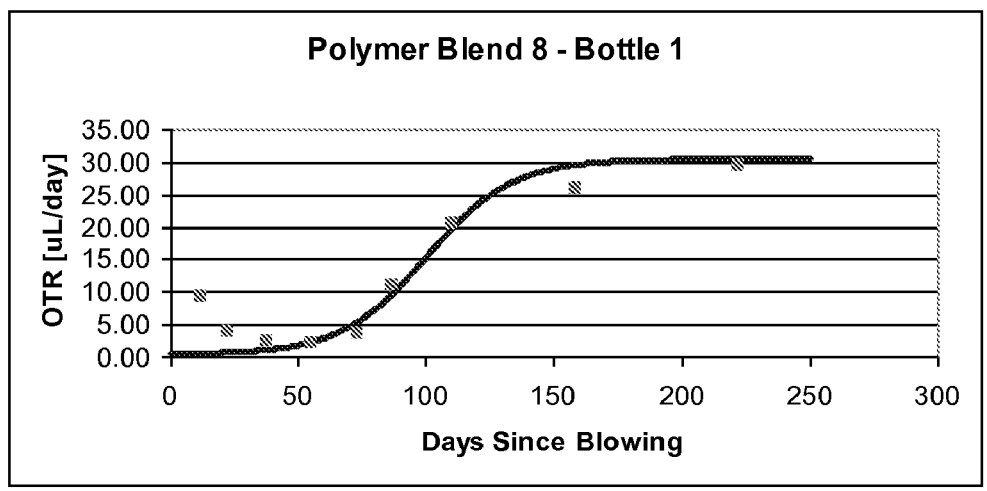
FIG. 8A-8C is a plot of the oxygen transmission rate (OTR) as a function of time for three bottles made from Polymer Blend 8. A non-linear curve is superimposed over the OTR data in each plot using the parameters reported in Table 16 with Eqn. 1.
Figure 8B:
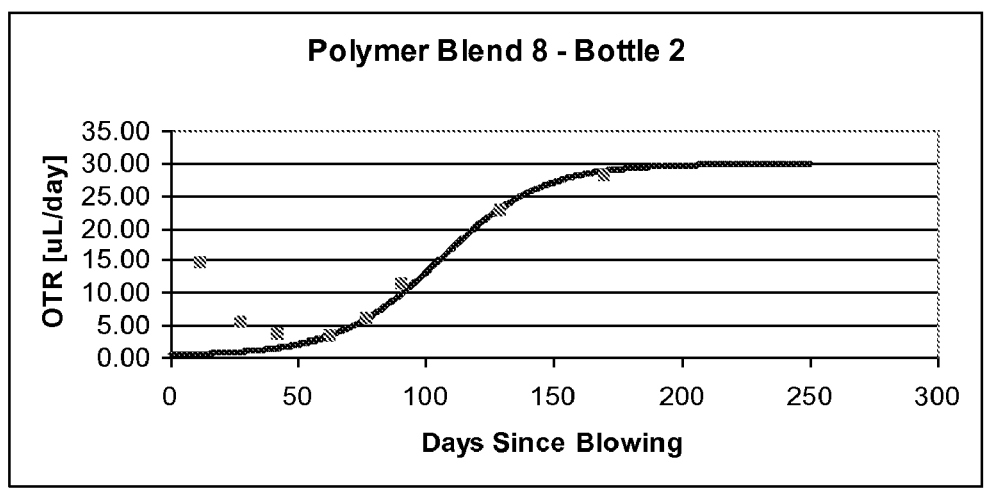
Figure 8C:
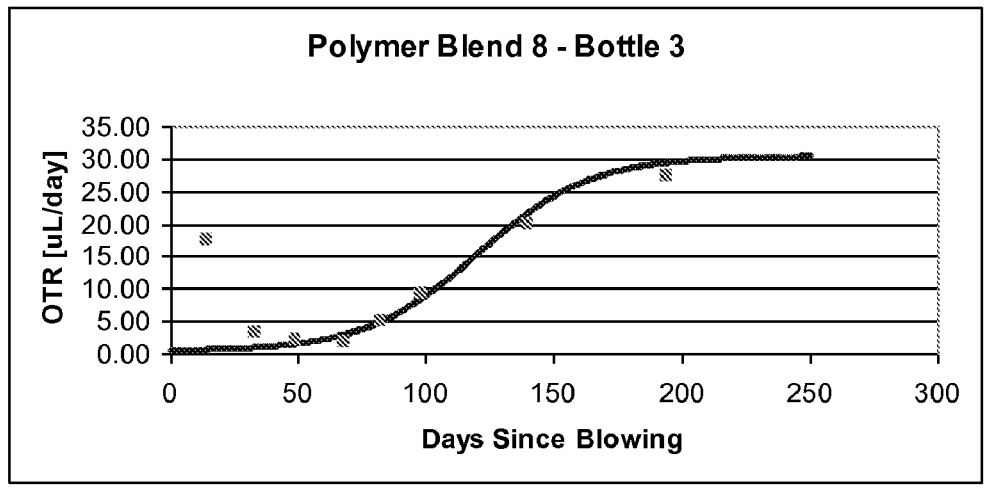
Figure 9A:
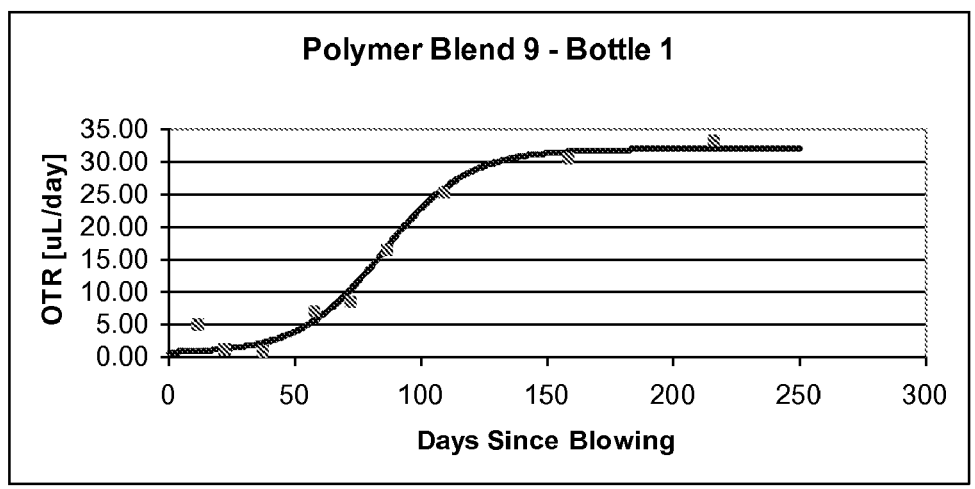
FIG. 9A-9C is a plot of the oxygen transmission rate (OTR) as a function of time for three bottles made from Polymer Blend 9. A non-linear curve is superimposed over the OTR data in each plot using the parameters reported in Table 16 with Eqn. 1.
Figure 9B:
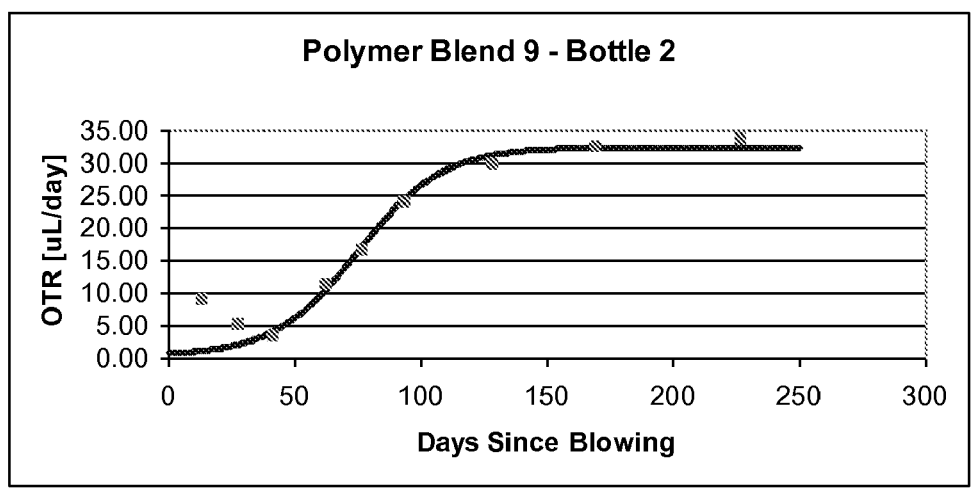
Figure 9C:
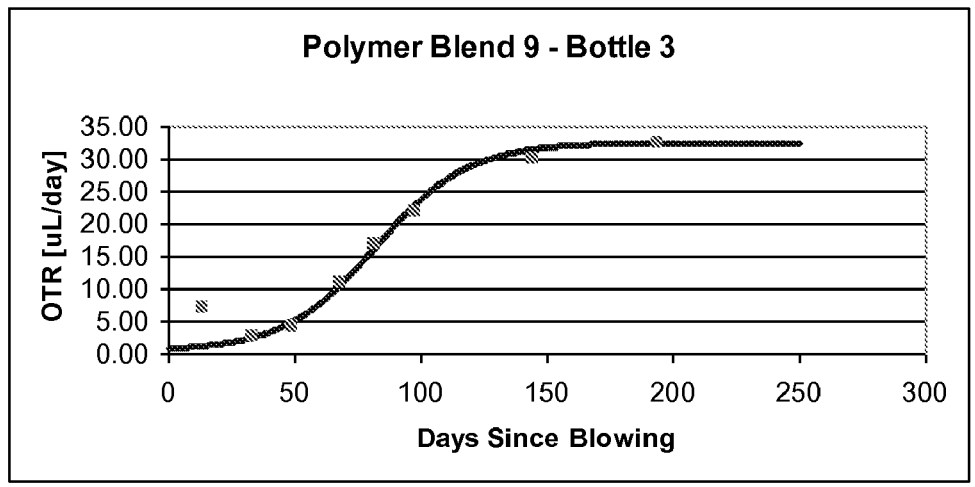
Figure 10A:
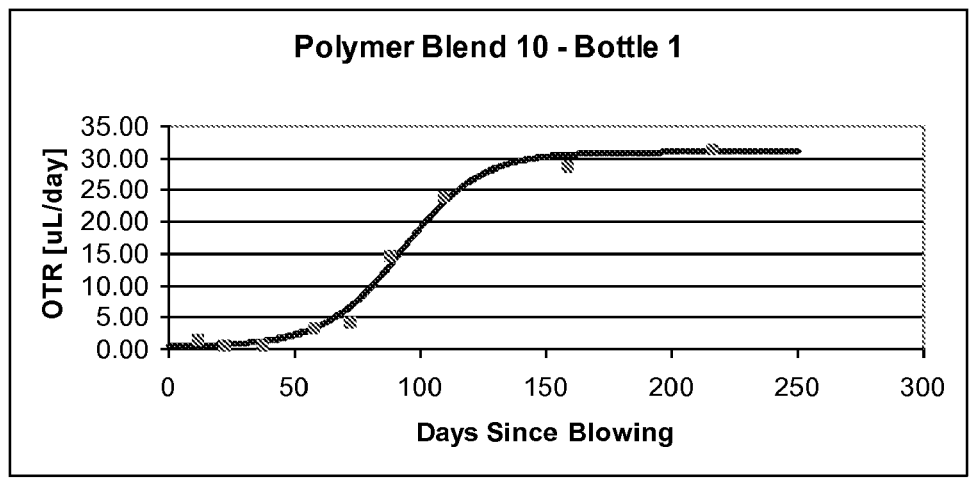
FIG. 10A-10C is a plot of the oxygen transmission rate (OTR) as a function of time for three bottles made from Polymer Blend 10. A non-linear curve is superimposed over the OTR data in each plot using the parameters reported in Table 16 with Eqn. 1.
Figure 10B:
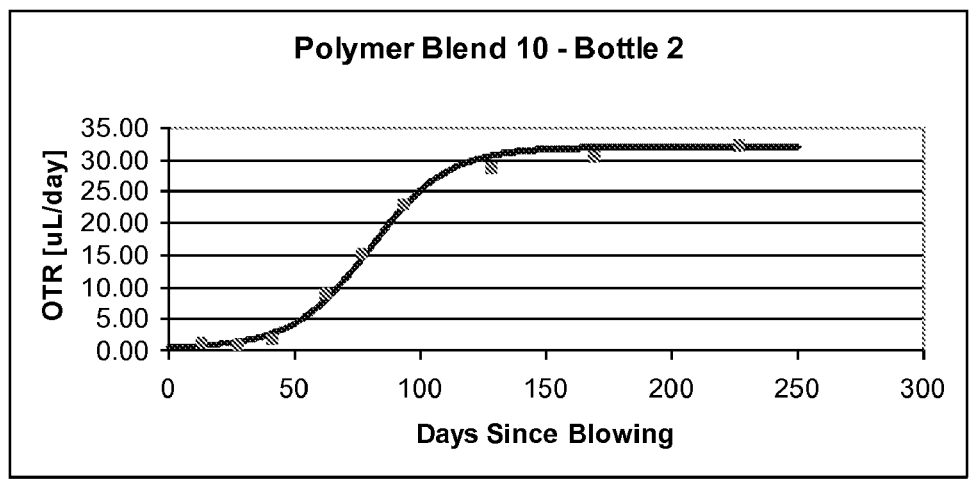
Figure 10C:
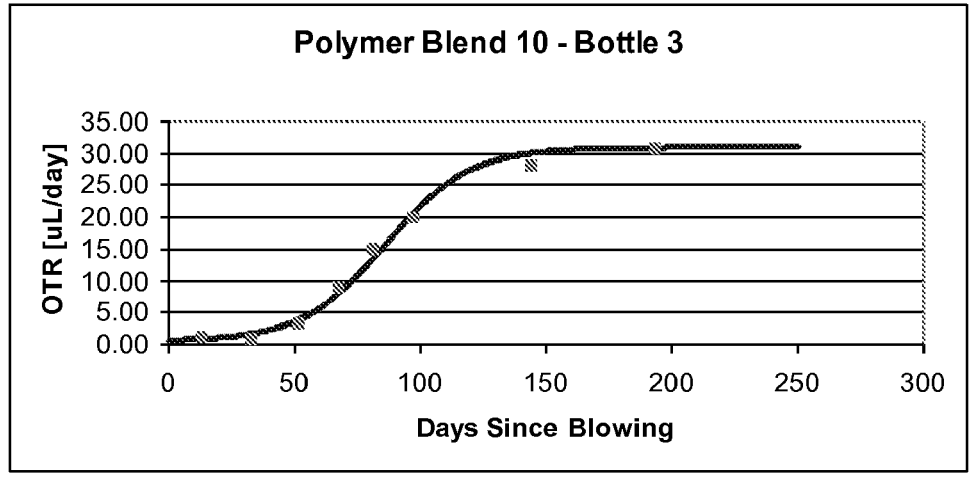
Figure 11A:
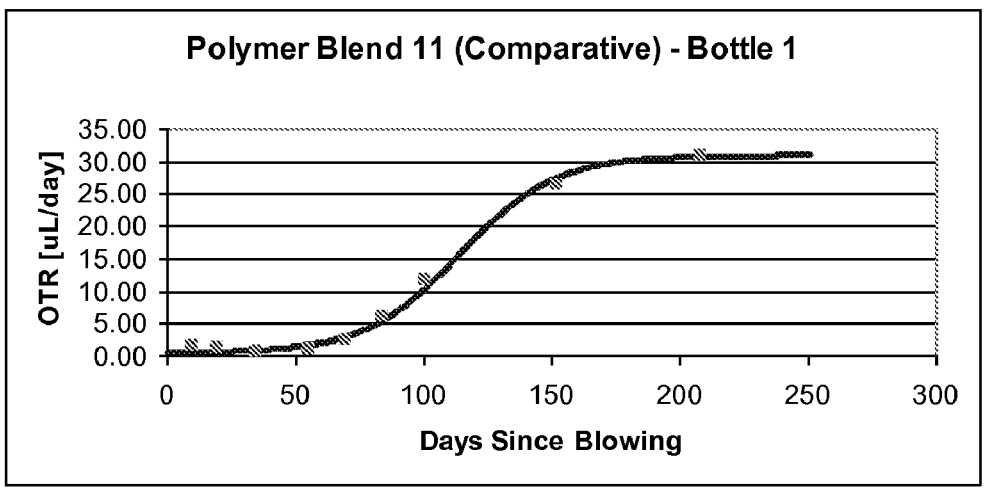
FIG. 11A-11C is a plot of the oxygen transmission rate (OTR) as a function of time for three bottles made from Comparative Polymer Blend 11. A non-linear curve is superimposed over the OTR data in each plot using the parameters reported in Table 16 with Eqn. 1.
Figure 11B:
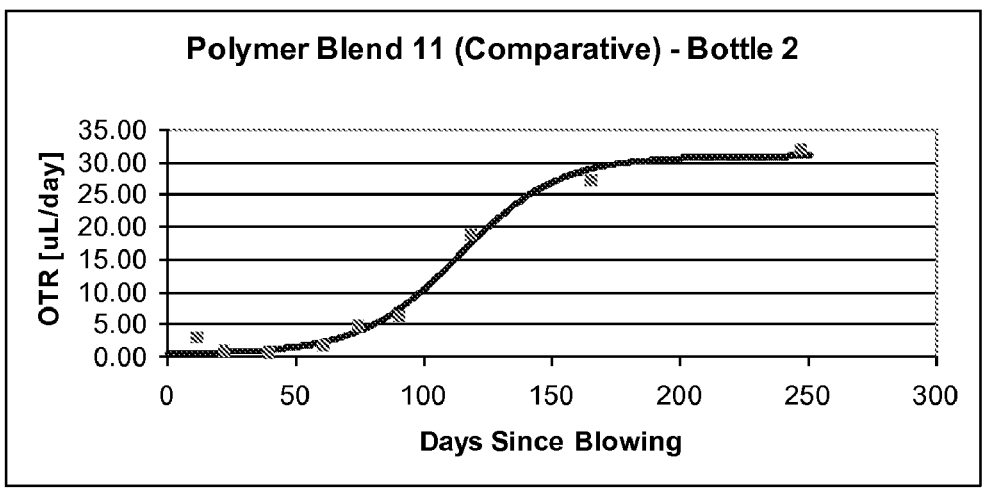
Figure 11C:
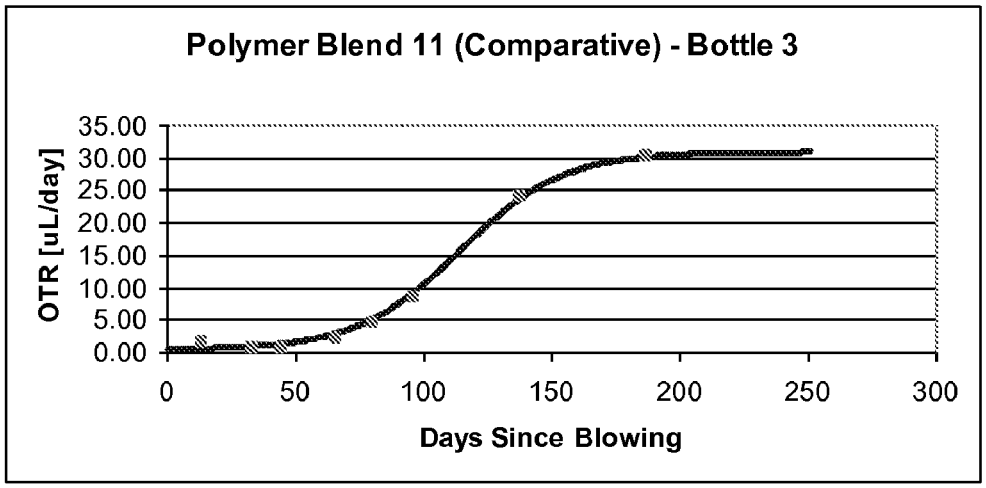
Figure 12A:
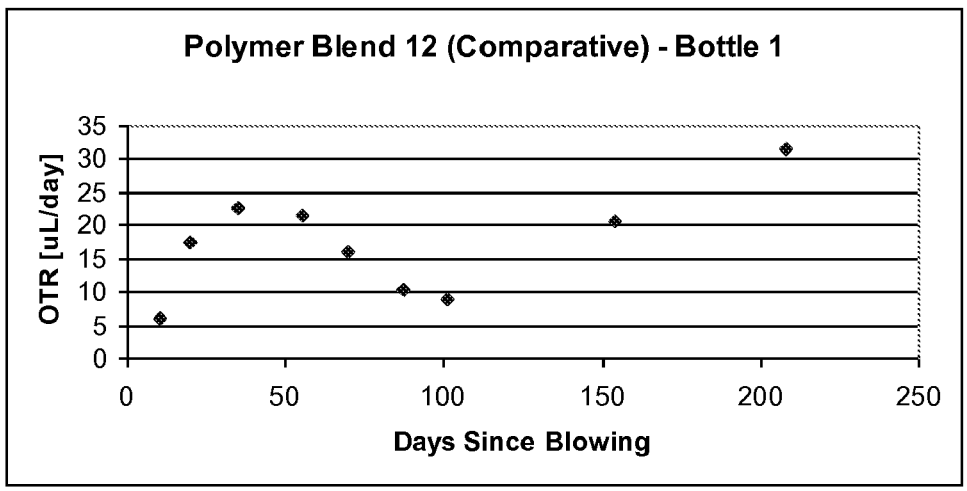
FIG. 12A-12C is a plot of the oxygen transmission rate (OTR) as a function of time for three bottles made from Comparative Polymer Blend 12.
Figure 12B:
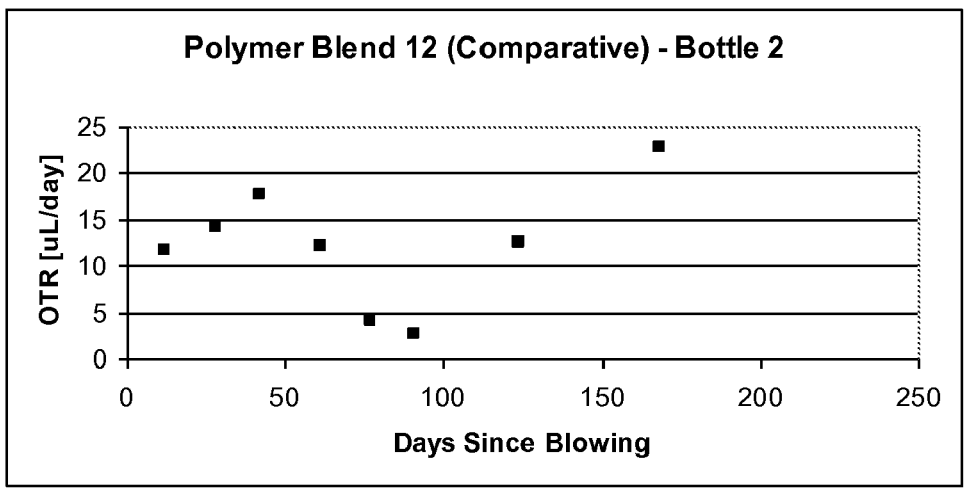
Figure 12C:
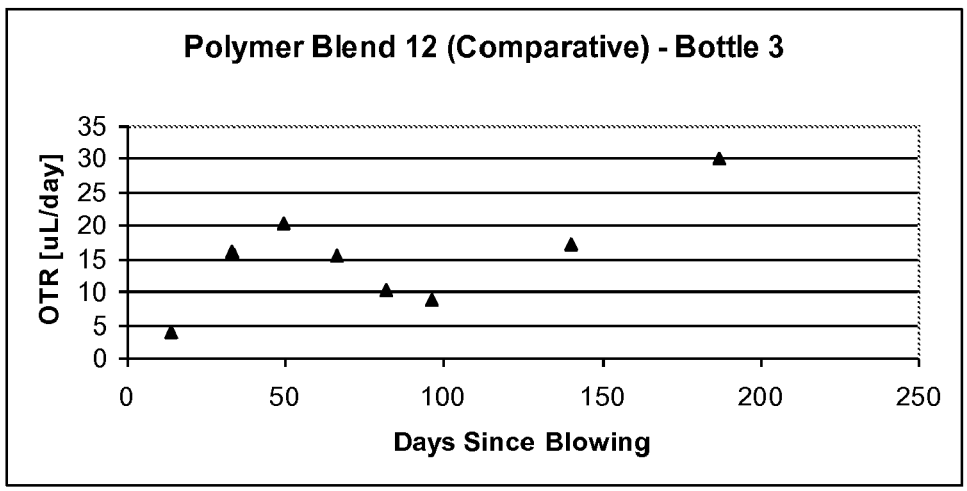
Figure 13A:
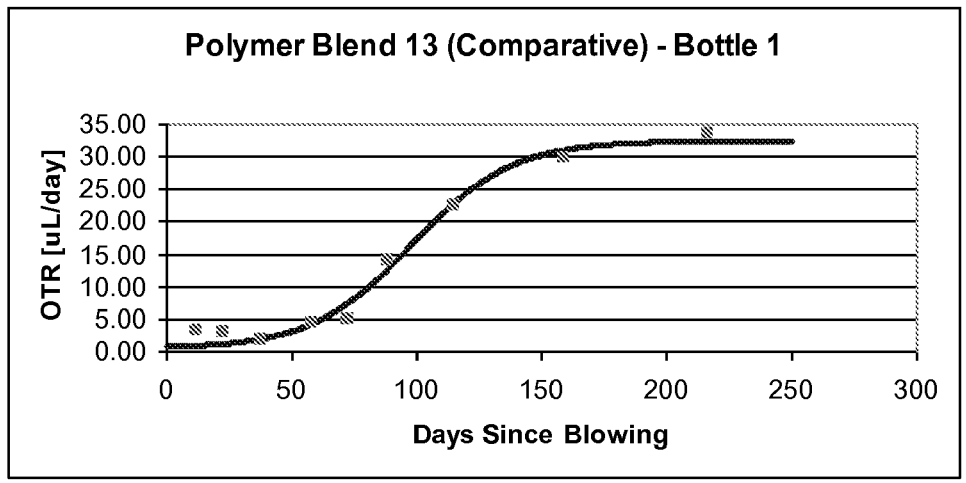
FIG. 13A-13C is a plot of the oxygen transmission rate (OTR) as a function of time for three bottles made from Comparative Polymer Blend 13. A non-linear curve is superimposed over the OTR data in each plot using the parameters reported in Table 16 with Eqn. 1.
Figure 13B:
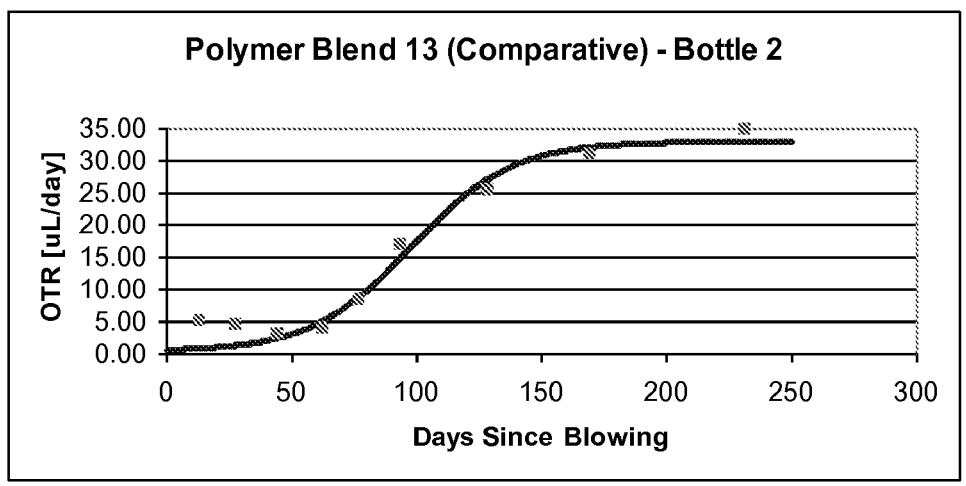
Figure 13C:
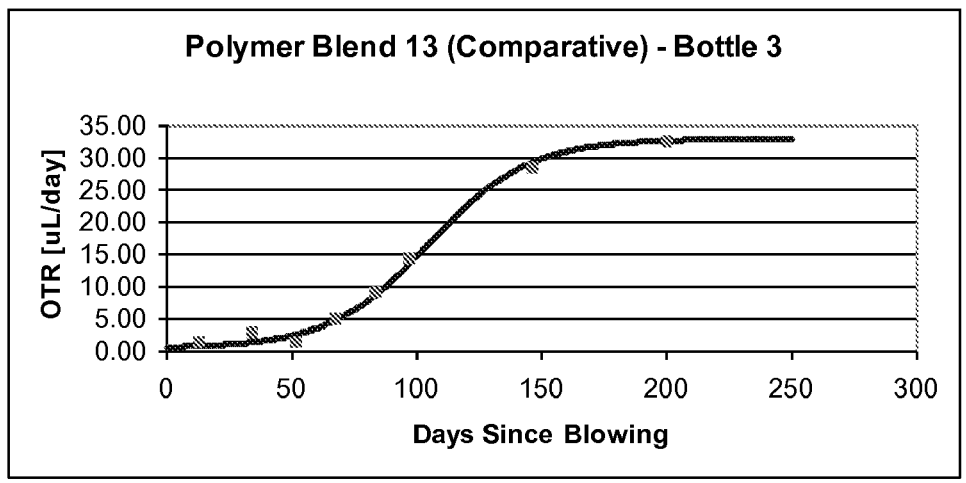
Figure 14A:
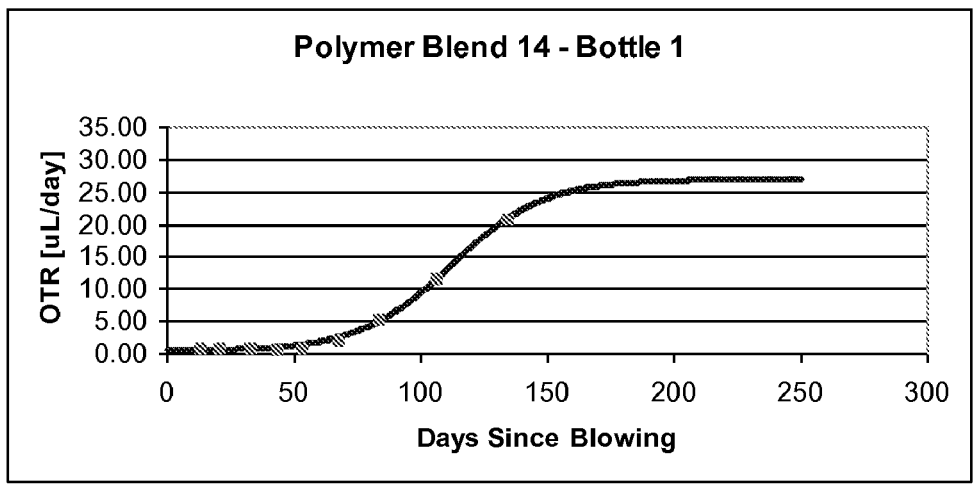
FIG. 14A-14C is a plot of the oxygen transmission rate (OTR) as a function of time for three bottles made from Polymer Blend 14. A non-linear curve is superimposed over the OTR data in each plot using the parameters reported in Table 16 with Eqn. 1.
Figure 14B:
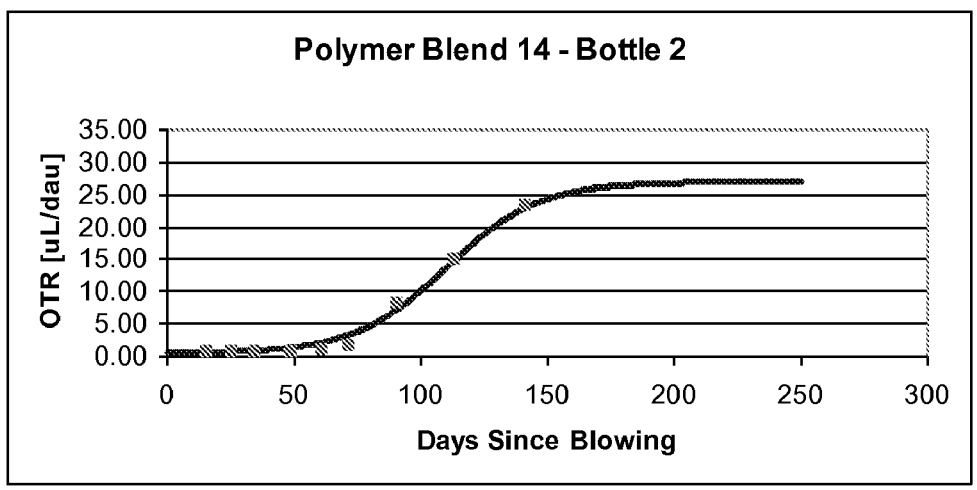
Figure 14C:
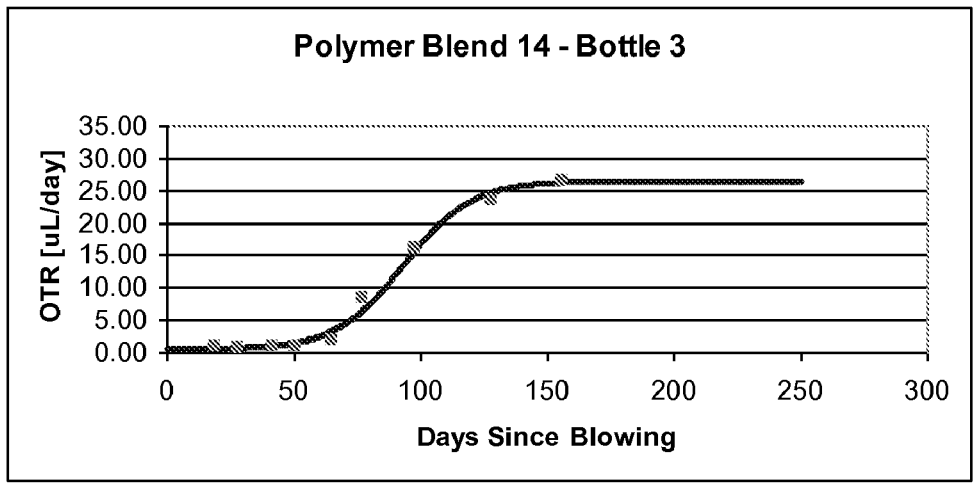
Figure 15A:
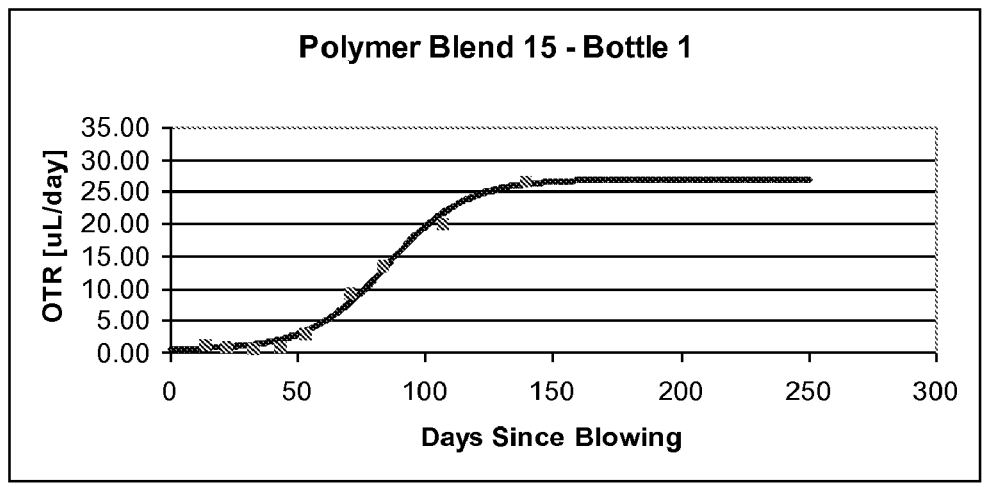
FIG. 15A-15C is a plot of the oxygen transmission rate (OTR) as a function of time for three bottles made from Polymer Blend 15. A non-linear curve is superimposed over the OTR data in each plot using the parameters reported in Table 16 with Eqn. 1.
Figure 15B:
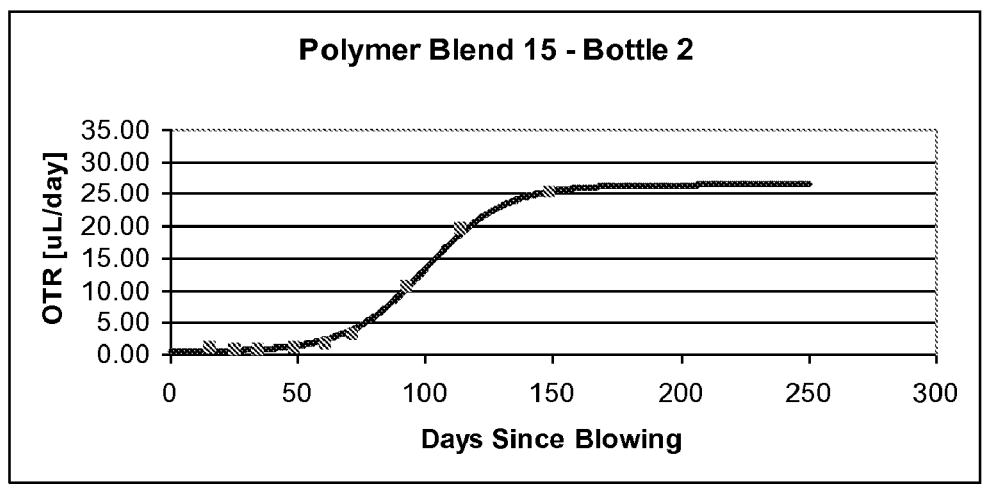
Figure 15C:
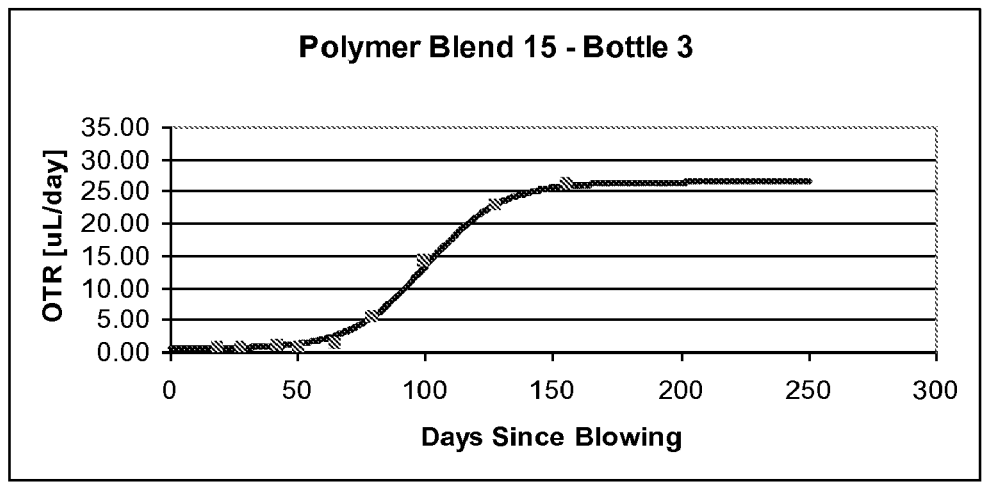
Figure 16A:
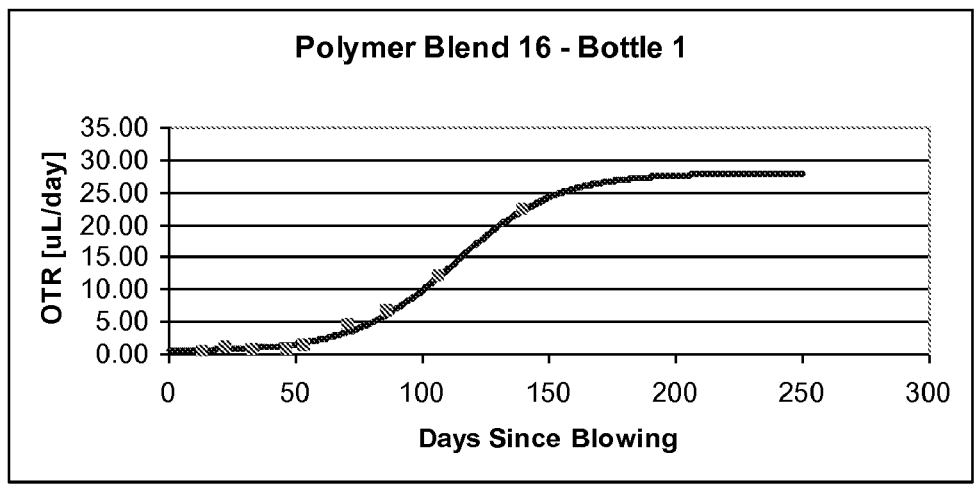
FIG. 16A-16C is a plot of the oxygen transmission rate (OTR) as a function of time for three bottles made from Polymer Blend 16. A non-linear curve is superimposed over the OTR data in each plot using the parameters reported in Table 16 with Eqn. 1.
Figure 16B:
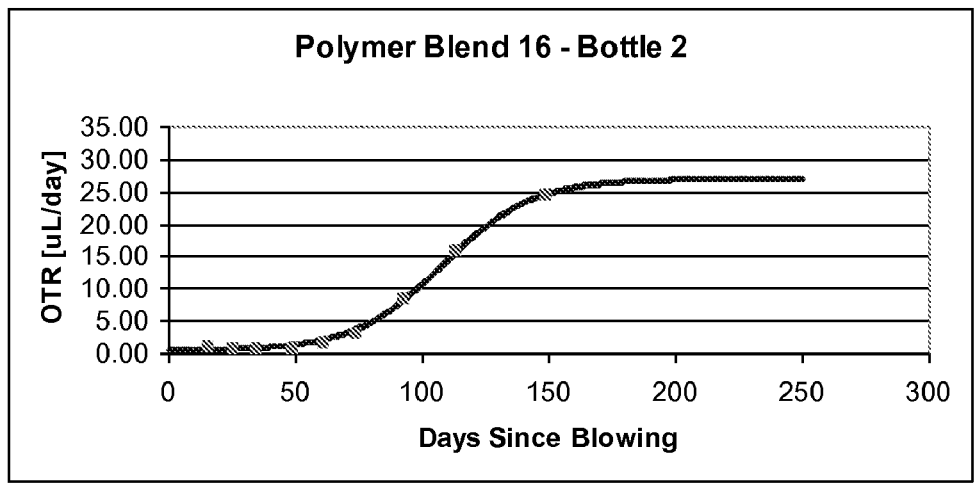
Figure 16C:
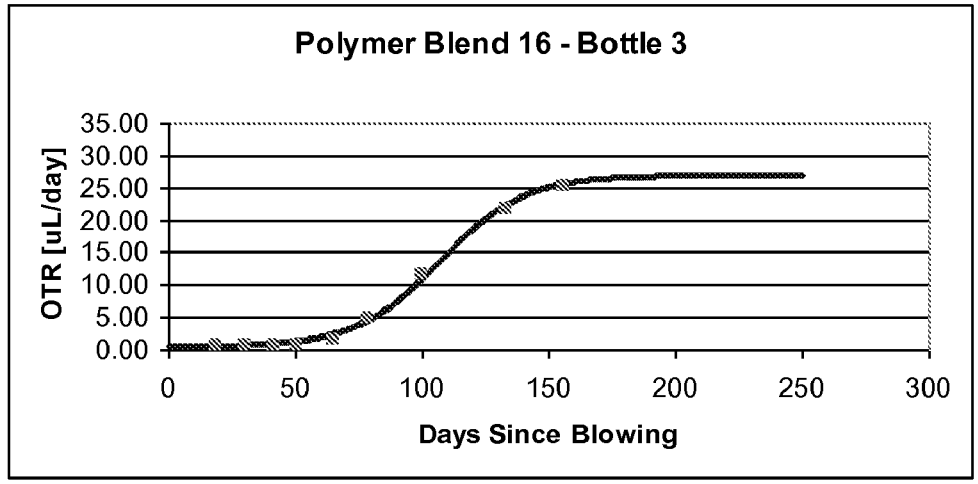
Figure 17A:
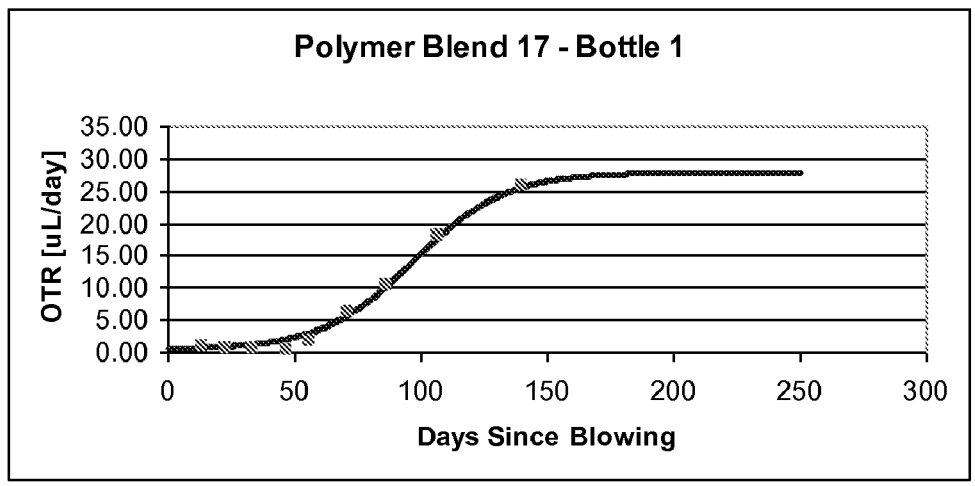
FIG. 17A-17C is a plot of the oxygen transmission rate (OTR) as a function of time for three bottles made from Polymer Blend 17. A non-linear curve is superimposed over the OTR data in each plot using the parameters reported in Table 16 with Eqn. 1.
Figure 17B:
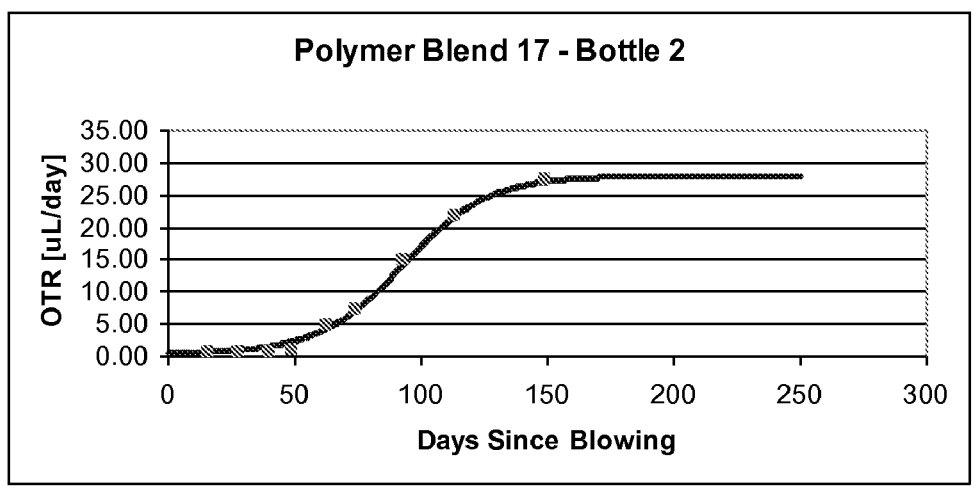
Figure 17C:
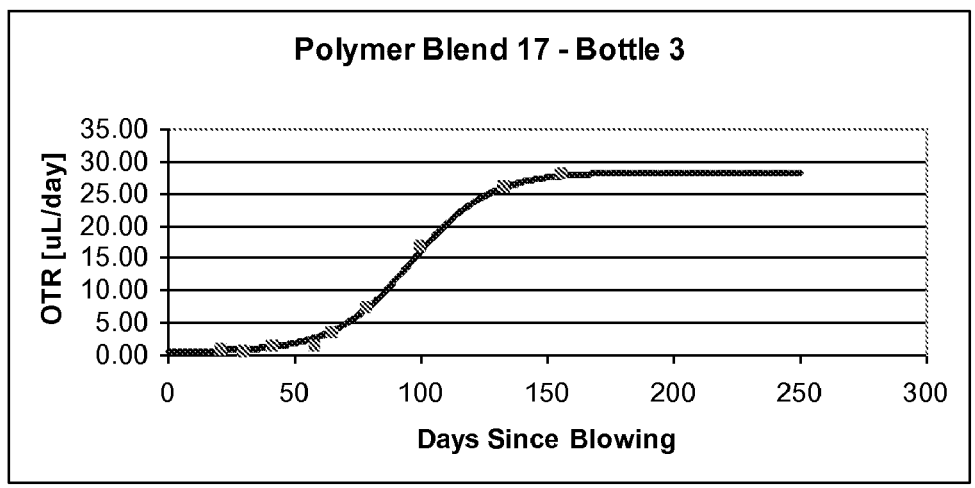
Figure 18A:
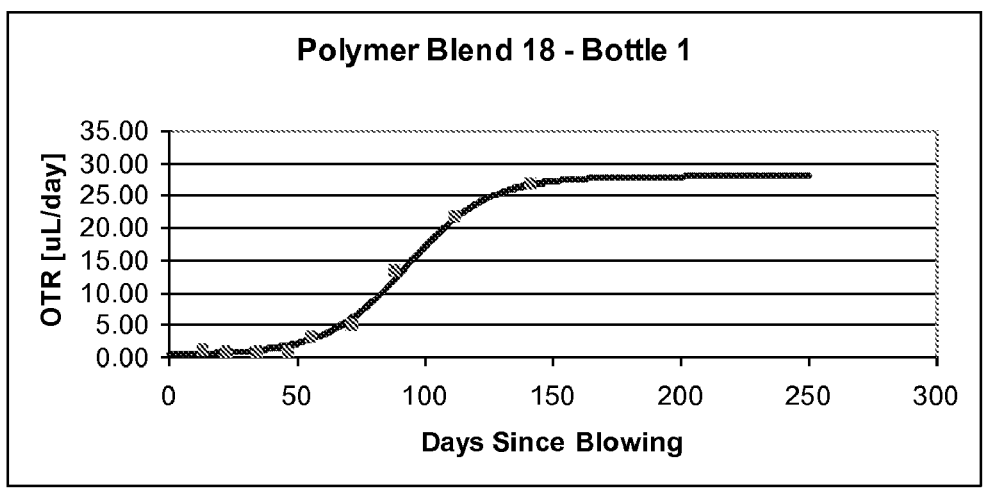
FIG. 18A-18C is a plot of the oxygen transmission rate (OTR) as a function of time for three bottles made from Polymer Blend 18. A non-linear curve is superimposed over the OTR data in each plot using the parameters reported in Table 16 with Eqn. 1.
Figure 18B:
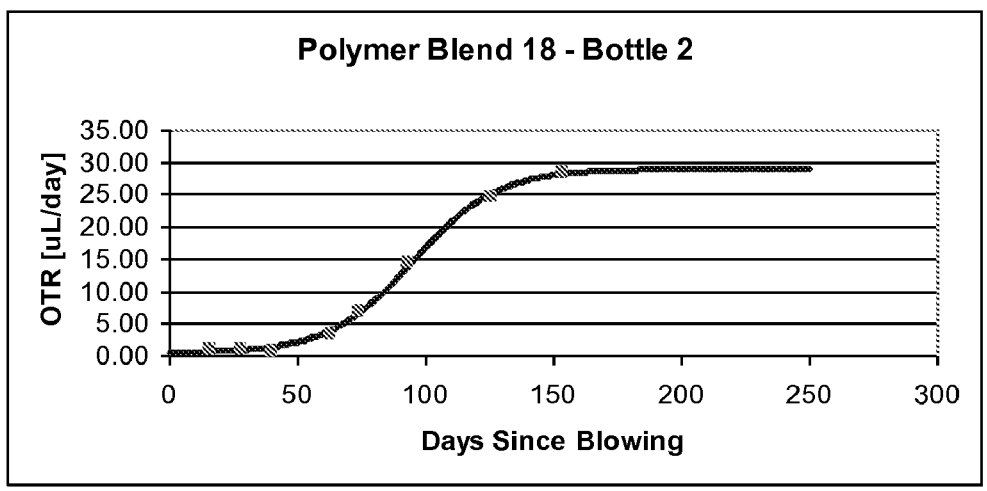
Figure 18C:
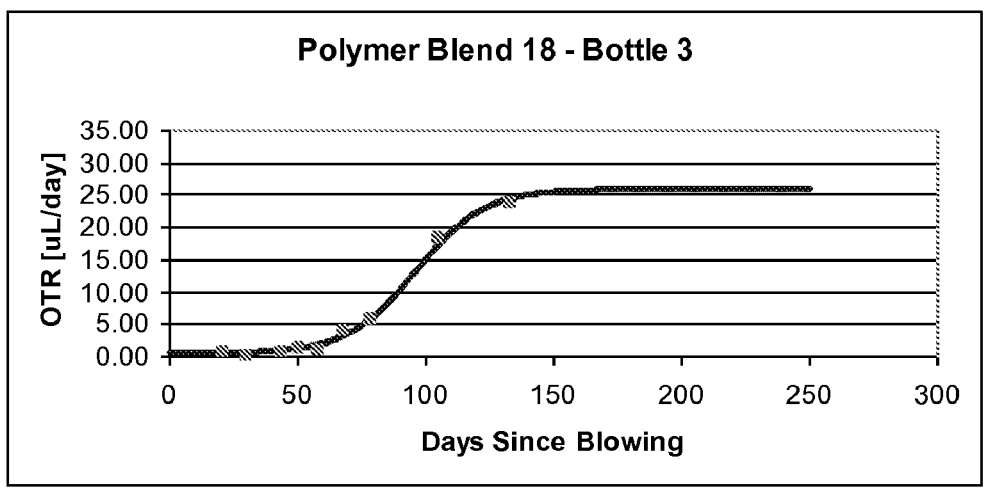
Figure 19A:
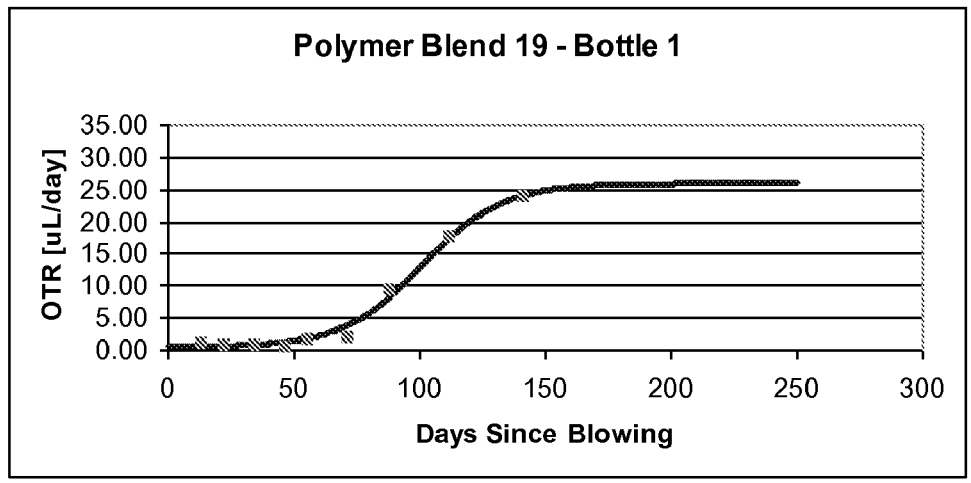
FIG. 19A-19C is a plot of the oxygen transmission rate (OTR) as a function of time for three bottles made from Polymer Blend 19. A non-linear curve is superimposed over the OTR data in each plot using the parameters reported in Table 16 with Eqn. 1.
Figure 19B:
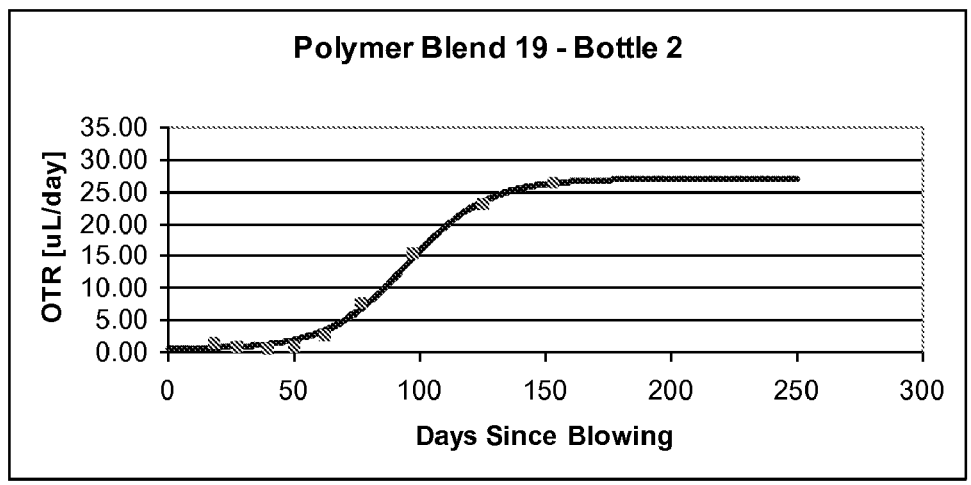
Figure 19C:
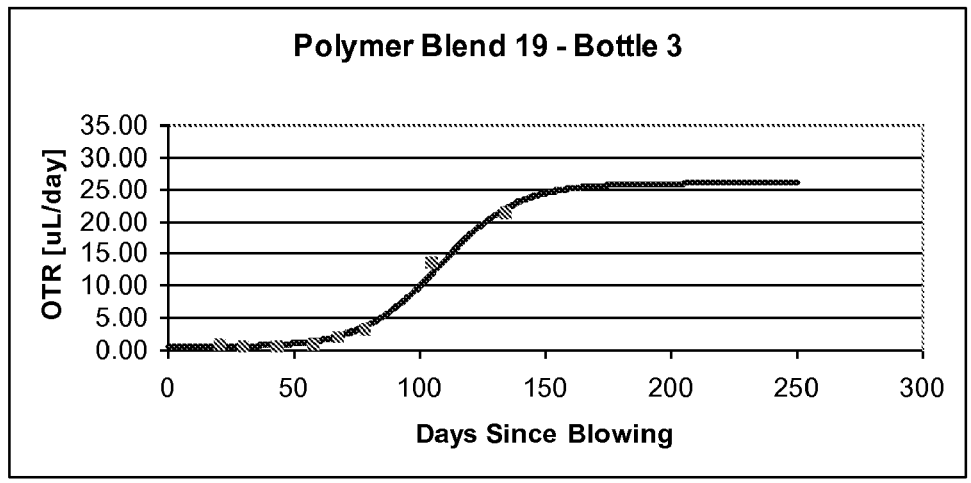
Figure 20A:
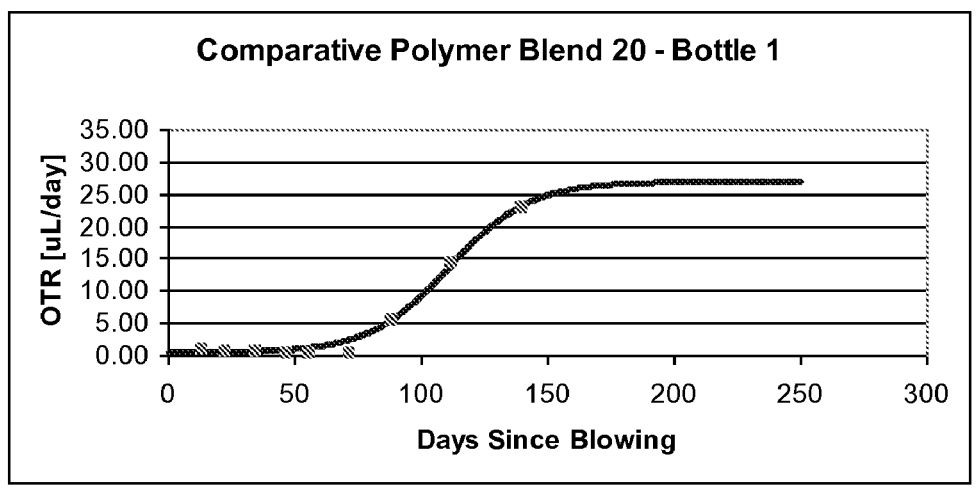
FIG. 20A-20C is a plot of the oxygen transmission rate (OTR) as a function of time for three bottles made from Comparative Polymer Blend 20.
Figure 20B:
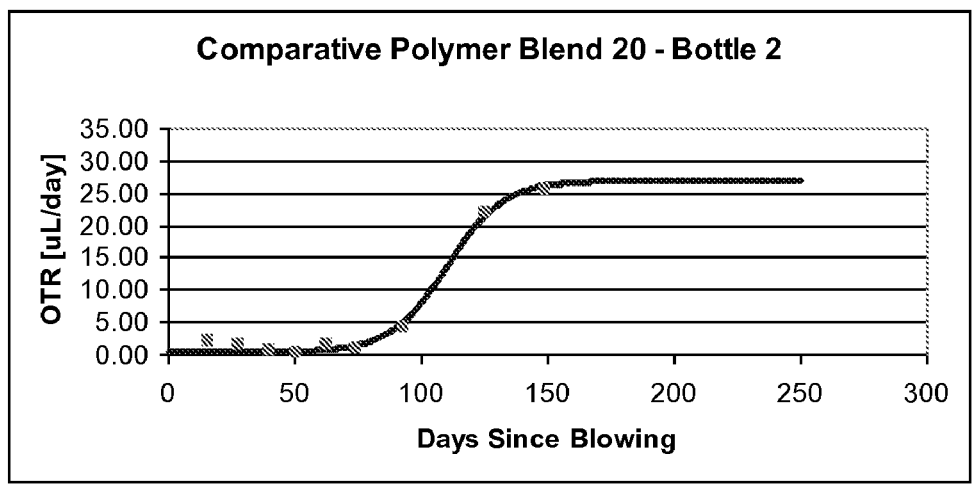
Figure 20C:
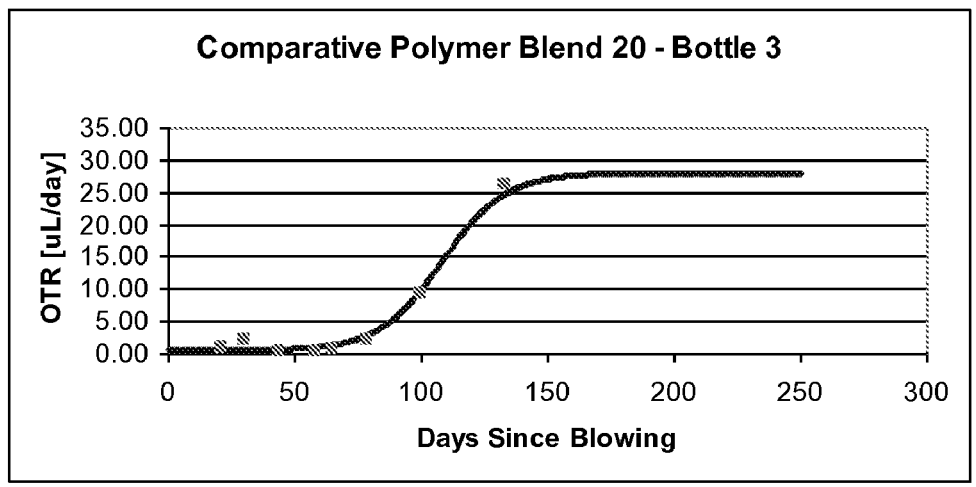
Figure 21A:
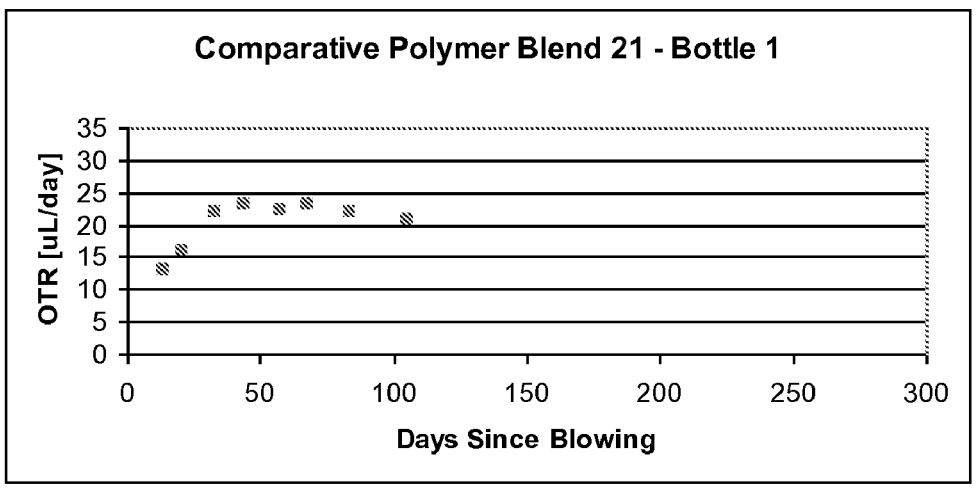
FIG. 21A-21C is a plot of the oxygen transmission rate (OTR) as a function of time for three bottles made from Comparative Polymer Blend 21. A non-linear curve is superimposed over the OTR data in each plot using the parameters reported in Table 16 with Eqn. 1.
Figure 21B:
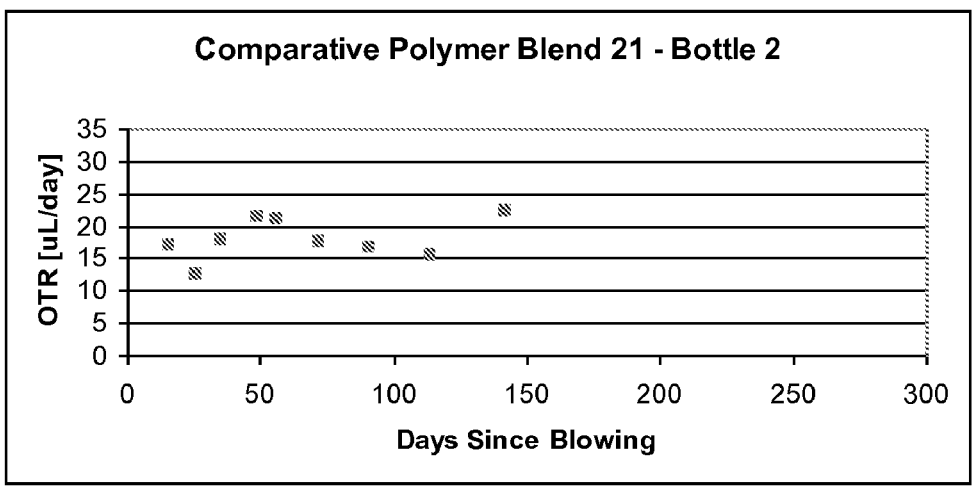
Figure 21C:
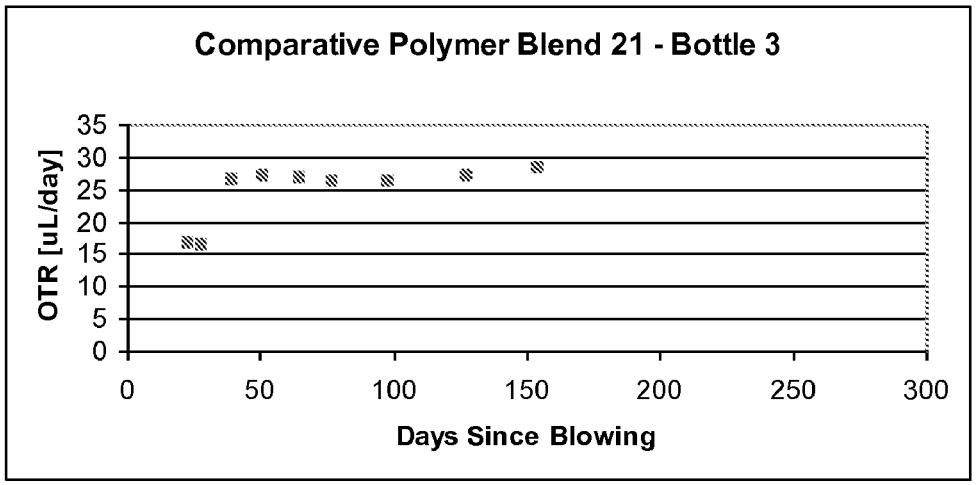
Figure 22A:
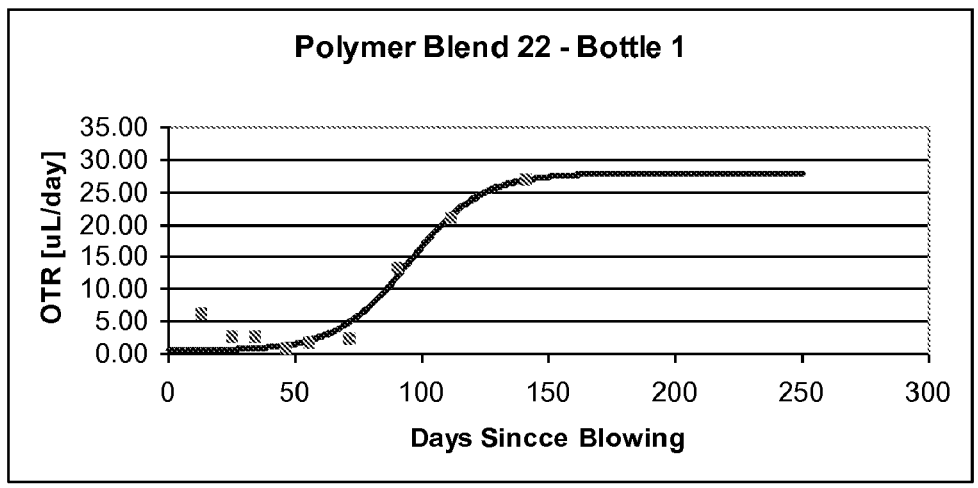
FIG. 22A-22C is a plot of the oxygen transmission rate (OTR) as a function of time for three bottles made from Comparative Polymer Blend 22. A non-linear curve is superimposed over the OTR data in each plot using the parameters reported in Table 16 with Eqn. 1.
Figure 22B:
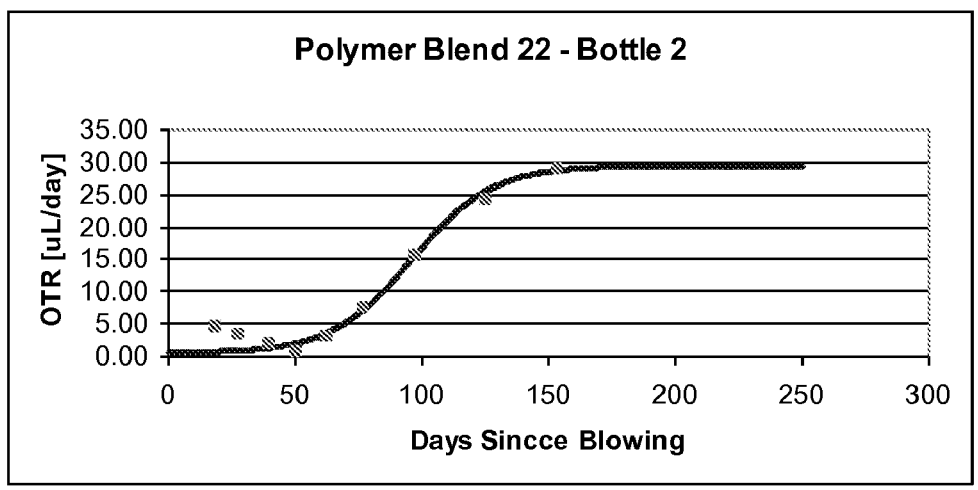
Figure 22C:
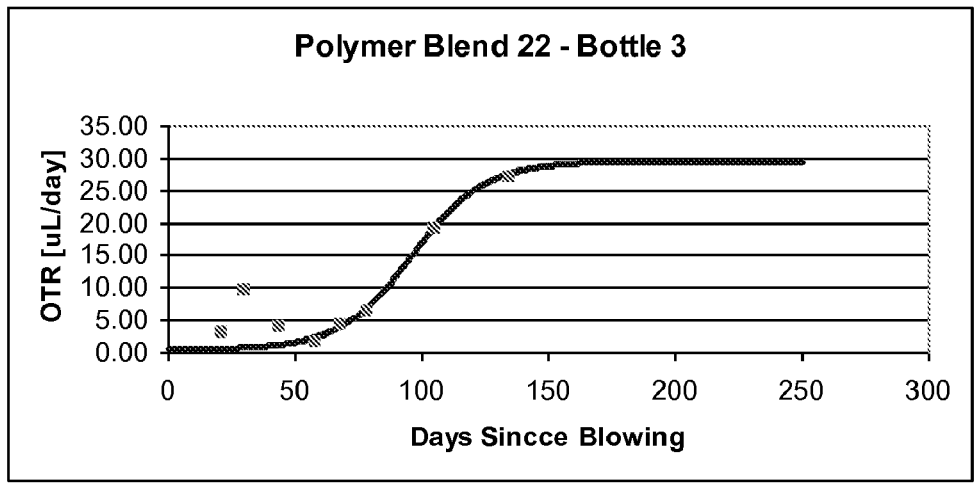

The bottles were mounted for oxygen transmission rate (OTR) testing one week after blowing and tested periodically using a custom-built instrument. Results are shown in FIG. 1A-22C. Prior to mounting, bottles were stored open to air at ambient laboratory conditions.

The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}\ln(\eta_r/C)$$

where $\eta_{int}$=Intrinsic viscosity
$\eta_r$=Relative viscosity=ts/to
$\eta_{sp}$=Specific viscosity=$\eta_r$−1

Instrument calibration involves replicate testing of a standard reference material and then applying appropriate mathematical equations to produce the "accepted" I.V. values.

TABLE 1

Metals Analyses and Intrinsic Viscosity (It.V.) or PET-1 through -13.

| PET | Li [ppm] | Al [ppm] | P [ppm] | Sb | Mn | Ti | Zn | It.V. |
|---|---|---|---|---|---|---|---|---|
| 1 | 8 | 10 | 30 | | | | | 0.88 |
| 2 | 8 | 10 | 75 | | | | | 0.82 |
| 3 | 12 | 17 | 38 | | | | | 0.78 |
| 4 | 8 | 10 | 51 | | | | | 0.86 |
| 5 | 13 | 15 | 0 | | | | | 0.83 |
| 6 | 12 | 15 | 34 | | | | | 0.86 |
| 7 | 14 | 15 | 70 | | | | | 0.83 |
| 8 | 13 | 15 | 111 | | | | | 0.82 |
| 9 | 12 | 17 | 102 | | | | | 0.77 |
| 10 | 13 | 17 | 0 | | | | | — |
| 11 (comp) | | | 25 | 250 | | | | 0.84 |
| 12 (comp) | | | 85-95 | 210-240 | 85-95 | 15-25 | | 0.78-0.82 |
| 13 (comp) | | | 45-55 | 215-245 | | | 60-70 | 0.76-0.80 |

$$\text{Calibration Factor} = \frac{\text{Accepted Ih.V. of Reference Material}}{\text{Average of Triplicate Determinations}}$$

$$\text{Corrected } IhV = \text{Calculated } IhV \times \text{Calibration Factor}$$

The intrinsic viscosity (It.V. or $\eta_{int}$) may be estimated using the Billmeyer equation as follows:

$$\eta_{int} = 0.5[e^{0.5 \times \text{Corrected } Ih.V.} - 1] + (0.75 \times \text{Corrected Ih.V.})$$

Oxygen Transmission Rate (OTR) Test Procedure

The oxygen transmission rate (OTR) test was performed using three stretch-blow-molded bottles prepared from each of Polymer Blends 1 through 13. The sets of three bottles were conditioned without capping under ambient conditions (i.e., about 22° C. and ambient humidity) for about one week after blow molding, then mounted, purged, and tested for OTR using the following procedure. Prior to measurement, the bottles were sealed by gluing it to a brass plate that is connected to a 4 way valve over the finish. This mounting technique seals the bottle, while allowing for control of test gas access. The mounting was assembled as follows. First a brass plate was prepared by drilling two ⅛ inch holes into the plate. Two lengths of ⅛ soft copper tubing (designated A and B) were passed through the holes in the plate and the gaps between the holes and the tubes were sealed either with epoxy glue or by welding. One end of each of these tubes was attached to the appropriate ports on a 4-way ball valve (such as Whitey model B-43YF2). Tubing (which will be designated C and D) and connections were also attached to the other ports of the ball valve to allow the finished assembly to be connected to an oxygen transmission rate test instrument (the OTR instrument is described below).

This mounting was then glued to the finish of the bottle to be tested so that tubes A and B extend into the interior of the bottle. The open end of one tube was positioned near the top of the package and the open end of the other was positioned near the bottom to ensure good circulation of the test gas within the bottle. Gluing of the bottle to the plate was typically performed in two steps using a quick setting epoxy to make the initial seal and temporarily hold the assembly together and then a second coating of a more rugged Metalset epoxy was applied. If desired the brass plate may be sanded before mounting to clean the surface and improve adhesion. If the 4 tubes were correctly connected to the 4-way valve, then when the valve was in the "Bypass" position, tubes A and B communicate and tubes C and D communicate, but tubes A and B did not communicate with tubes C and D. Thus the package was sealed. Similarly, when the valve was in its "Insert" position, tubes A and D communicate and tubes B and C communicates, but A and D do not communicate with tubes B and C, except through the interior of the bottle. Thus the bottle could be swept with purge or test gas.

Once the bottle was mounted on the assembly, it was swept with an oxygen-free gas, and the conditioning period begun. After several minutes of purging, the 4-way valve was moved to the Bypass position, sealing the bottle. At that point the entire bottle and mounting assembly could be disconnected from the purge gas supply without introducing oxygen into the interior of the bottle. Three bottles of each Polymer Blend-1 through -13 were mounted for testing.

When the oxygen transmission rate of the bottle was to be tested, the mounting was connected to the oxygen transmission rate instrument via tubes C and D. A custom-built instrument was used to perform the measurements on the samples discussed in the examples. Nitrogen, which was humidified using a bubbler, was supplied to the instrument and the tubing in the environmental chamber. The custom-built instrument used a Delta-F DF-310 process Oxygen analyzer as the oxygen sensor and an Aalborg Mass flow meter GFM17 to measure the ppm oxygen in and flow rate of the purge stream, from which the oxygen transmission rate through the package was calculated. The custom-built instrument had positions for up to 24 bottles to be connected to the instrument at one time. Once samples are mounted in the chamber, the 4-way valves were turned to the Insert position and the system was allowed to recover from the perturbation caused by this process.

After allowing the system to recover, the test was then begun by "inserting" the instrument sensor in-line. The test sequences were controlled by specially written LabView™ software interfaces for the instrument, by means of which the instrument automatically advanced through the test cells using a preset interval that allowed the instrument to stabilize after each cell change as the test gas from the bottle mounted on the cell was routed through the sensor. The oxygen transmission rate into the carrier gas was calculated from the measured ppm oxygen in the gas and the measured flow rate of the carrier gas. Typically, the instrument was allowed to index through each of the cells 3 or more times and the average of the last 3 measurements was used. Once these readings were obtained, the 4-way valves were moved to their Bypass positions and this process was repeated, providing a measure of the leak rate for the cell and assembly. This value was subtracted from the value obtained for the package, cell, and assembly to yield the value for the package and was reported as the oxygen transmission rate (OTR) of the bottle (in cc(STP) or μl(STP) of oxygen/day). At this point, the test was terminated and the bottles were removed from the instrument (with the 4-way valves still in the Bypass position).

Testing of control packages on the custom built instrument and 2 Mocon Oxtran instruments had yielded equivalent results (within about 10% of each other)

Between tests, bottles were stored at ambient (RH, lighting, barometric pressure) conditions in a lab (22° C. plus or minus 4° C.) with the interior isolated from air. After a period of time, the bottles were reconnected to the oxygen permeation test instrument and a new set of transmission measurements collected.

In this manner, it was possible to monitor the OTR behavior of the bottles over several weeks or months.

Three stretch-blown bottles prepared using each of Polymer Blends 1 through 13 were tested for OTR periodically for approximately 250-days following blow molding (Tables 3-16). The OTR results for each set of three bottles are plotted in FIGS. 1-13, respectively, and each set of data corresponding to a single bottle has a non-linear curve superimposed over the OTR data. The mathematical model used to generate the non-linear fits is:

$$OTR = \text{Theta 1} + \frac{\text{Theta 2} - \text{Theta 1}}{(1 + \exp(\text{Theta 3} \times (\text{Days} - \text{Theta 4})))} \quad \text{Eqn. 1}$$

where
Days is "Days Since Blowing"
Theta 1—Equilibrium Point (i.e., Y-value at infinite "Days")
Theta 2—Starting Point (y-intercept)
Theta 3—Slope
Theta 4—Inflection Point (i.e., X-value corresponding to "Days")
and the corresponding coefficients of Eqn. 1 relating the y-coordinate (i.e., the OTR) to the x-coordinate (i.e., Dayssince-blowing) for the non-linear curves corresponding to Polymer Blends-1 through -13 are reported in Table 16. For example, the model for Polymer Blend-1 predicts bottles 1 through 3 scavenge oxygen and are able to maintain an OTR (i.e., a y-coordinate) less than 5 µl/day for 74.4 days, 75.8 days, and 69.3 days, respectively (see column labeled "Days to 5 µl/day in Table 16). Comparative Polymer Blend-13 is exemplary of a polymer blend comprising a conventional PET polymer that does not exhibit adequate oxygen scavenging (i.e., never achieves an OTR less than 5 µl/day) and as such, is not mathematically modeled.

The OTR results clearly show that the Li/Al-catalyzed resins perform comparably to Comparative Polymer Blends-11 and -13 and much better than Comparative Polymer Blend-12.

TABLE 3

Oxygen Transmission Rate (OTR) for Polymer Blend 1.
Polymer Blend 1

| Days since blowing | OTR (µl/day) | | |
|---|---|---|---|
| | Bottle 1 | Bottle 2 | Bottle 3 |
| 10 | 1.17 | | |
| 12 | | 0.77 | |
| 14 | | | 0.8 |
| 20 | 0.48 | | |
| 23 | | 0.21 | |
| 28 | | | 0.47 |
| 35 | 0.63 | | |
| 38 | | 0.3 | |
| 45 | | | 2.83 |
| 52 | 0.42 | | |
| 58 | | 1.89 | |
| 63 | | | 2.35 |
| 68 | 3.71 | | |
| 73 | | 2.44 | |
| 80 | | | 7.78 |
| 84 | 7.59 | | |
| 89 | | 10.31 | |
| 94 | | | 13.23 |
| 98 | 12.63 | | |
| 115 | | 19.88 | |
| 131 | | | 24.74 |
| 147 | 28.15 | | |
| 161 | | 27.69 | |
| 175 | | | 29.18 |
| 201 | 31.38 | | |
| 217 | | 31.15 | |
| 232 | | 31.51 | |

TABLE 4

Oxygen Transmission Rate (OTR) for Polymer Blend 2.
Polymer Blend 2

| Days since blowing | OTR (µl/day) | | |
|---|---|---|---|
| | Bottle 1 | Bottle 2 | Bottle 3 |
| 10 | 1.93 | | |
| 12 | | 3.25 | |
| 14 | | | 2.01 |
| 20 | 0.29 | | |
| 23 | | | |
| 28 | | | 0.72 |
| 35 | 0.64 | | |
| 38 | | 0.37 | |
| 45 | | | 0.69 |
| 52 | 2.36 | | |

TABLE 4-continued

Oxygen Transmission Rate (OTR) for Polymer Blend 2.
Polymer Blend 2

| Days since blowing | OTR (µl/day) | | |
|---|---|---|---|
| | Bottle 1 | Bottle 2 | Bottle 3 |
| 58 | | 5.90 | |
| 63 | | | 4.72 |
| 68 | 6.89 | | |
| 75 | | 10.86 | |
| 80 | | | 11.41 |
| 84 | 10.57 | | |
| 89 | | 16.19 | |
| 94 | | | 16.62 |
| 98 | 15.77 | | |
| 115 | | 23.47 | |
| 131 | | | 25.50 |
| 147 | 27.78 | | |
| 161 | | 28.74 | |
| 175 | | | 29.63 |
| 201 | 30.76 | | |
| 217 | | 31.47 | |
| 232 | | 32.10 | |

TABLE 5

Oxygen Transmission Rate (OTR) for Polymer Blend 3.
Polymer Blend 3

| Days since blowing | OTR (µl/day) | | |
|---|---|---|---|
| | Bottle 1 | Bottle 2 | Bottle 3 |
| 10 | 1.18 | | |
| 12 | | 4.41 | |
| 14 | | | 1.27 |
| 20 | 0.21 | | |
| 23 | | 0.23 | |
| 28 | | | 0.34 |
| 35 | 0.86 | | |
| 40 | | 1.05 | |
| 45 | | | 1.23 |
| 52 | 1.44 | | |
| 58 | | 4.79 | |
| 63 | | | 2.63 |
| 70 | 3.63 | | |
| 75 | | 10.33 | |
| 80 | | | 8.88 |
| 84 | 8.66 | | |
| 89 | | 16.35 | |
| 94 | | | 16.15 |
| 98 | 14.54 | | |
| 115 | | 23.82 | |
| 131 | | | 26.66 |
| 147 | 27.86 | | |
| 161 | | 29.36 | |
| 175 | | | 30.24 |
| 201 | 30.78 | | |
| 241 | | 32.92 | |

TABLE 6

Oxygen Transmission Rate (OTR) for Polymer Blend 4.
Polymer Blend 4

| Days since blowing | OTR (μl/day) | | |
|---|---|---|---|
| | Bottle 1 | Bottle 2 | Bottle 3 |
| 10 | 1.48 | | |
| 12 | | 0.95 | |
| 14 | | | 0.89 |
| 20 | 0.53 | | |
| 23 | | 0.33 | |
| 33 | | | 0.52 |
| 35 | 0.77 | | |
| 40 | | 0.47 | |
| 45 | | | 0.77 |
| 52 | 0.82 | | |
| 58 | | 2.07 | |
| 66 | | | 2.11 |
| 70 | 2.95 | | |
| 75 | | 5.51 | |
| 80 | | | 5.13 |
| 84 | 6.76 | | |
| 89 | | 9.40 | |
| 94 | | | 9.07 |
| 101 | 13.07 | | |
| 119 | | 19.60 | |
| 131 | | | 19.76 |
| 152 | 26.45 | | |
| 161 | | 26.37 | |
| 175 | | | 27.62 |
| 201 | 30.00 | | 30.00 |
| 241 | | 31.70 | |

TABLE 7

Oxygen Transmission Rate (OTR) for Polymer Blend 5.
Polymer Blend 5

| Days since blowing | OTR (μl/day) | | |
|---|---|---|---|
| | Bottle 1 | Bottle 2 | Bottle 3 |
| 12 | 0.90 | | |
| 12 | | 1.15 | |
| 14 | | | 0.79 |
| 20 | 0.45 | | |
| 23 | | 0.38 | |
| 33 | | | 0.38 |
| 35 | 0.85 | | |
| 40 | | 0.60 | |
| 45 | | | 0.74 |
| 52 | 1.97 | | |
| 61 | | 3.49 | |
| 66 | | | 3.76 |
| 70 | 6.27 | | |
| 75 | | 9.61 | |
| 80 | | | 9.21 |
| 84 | 12.33 | | |
| 89 | | 15.40 | |
| 96 | | | 14.88 |
| 101 | 19.89 | | |
| 119 | | 25.27 | |
| 138 | | | 25.80 |
| 152 | 28.47 | | |
| 166 | | 29.12 | |
| 187 | | | 29.61 |
| 208 | 30.77 | | |
| 248 | | 31.78 | |

TABLE 8

Oxygen Transmission Rate (OTR) for Polymer Blend 6.
Polymer Blend 6

| Days since blowing | OTR (μl/day) | | |
|---|---|---|---|
| | Bottle 1 | Bottle 2 | Bottle 3 |
| 10 | 1.08 | | |
| 12 | | 1.17 | |
| 14 | | | 0.84 |
| 20 | 0.55 | | |
| 28 | | 0.52 | |
| 33 | | | 0.33 |
| 35 | 0.92 | | |
| 42 | | 0.91 | |
| 49 | | | 1.12 |
| 55 | 0.41 | | |
| 61 | | 1.70 | |
| 66 | | | 2.16 |
| 70 | 1.06 | | |
| 75 | | 4.89 | |
| 82 | | | 6.22 |
| 87 | 4.27 | | |
| 91 | | 7.85 | |
| 96 | | | 11.07 |
| 101 | 7.95 | | |
| 124 | | 19.20 | |
| 138 | | | 24.14 |
| 154 | 23.03 | | |
| 168 | | 25.88 | |
| 187 | | | 28.53 |
| 208 | 28.16 | | |

TABLE 9

Oxygen Transmission Rate (OTR) for Polymer Blend 7.
Polymer Blend 7

| Days since blowing | OTR (μl/day) | | |
|---|---|---|---|
| | Bottle 1 | Bottle 2 | Bottle 3 |
| 10 | 1.30 | | |
| 12 | | 0.84 | |
| 14 | | | 1.14 |
| 20 | 0.63 | | |
| 28 | | 0.67 | |
| 33 | | | 0.40 |
| 35 | 0.81 | | |
| 42 | | 0.97 | |
| 49 | | | 0.99 |
| 55 | 1.20 | | |
| 61 | | 0.64 | |
| 66 | | | 1.68 |
| 73 | 1.57 | | |
| 77 | | 2.51 | |
| 82 | | | 4.29 |
| 87 | 6.49 | | |
| 91 | | 5.60 | |
| 96 | | | 8.38 |
| 101 | 10.85 | | |
| 124 | | 18.05 | |
| 140 | | | 20.69 |
| 154 | 25.35 | | |
| 168 | | 28.49 | |
| 194 | | | 29.04 |
| 222 | 30.44 | | |

TABLE 10

Oxygen Transmission Rate (OTR) for Polymer Blend 8.
Polymer Blend 8

| Days since blowing | OTR (μl/day) | | |
|---|---|---|---|
| | Bottle 1 | Bottle 2 | Bottle 3 |
| 12 | 9.14 | | |
| 12 | | 14.54 | |
| 14 | | | 17.59 |
| 23 | 3.90 | | |
| 28 | | 5.26 | |
| 33 | | | 3.26 |
| 38 | 2.32 | | |
| 42 | | 3.58 | |
| 49 | | | 2.20 |
| 55 | 2.10 | | |
| 63 | | 3.26 | |
| 68 | | | 1.81 |
| 73 | 3.50 | | |
| 77 | | 6.02 | |
| 82 | | | 5.18 |
| 87 | 10.99 | | |
| 91 | | 11.14 | |
| 98 | | | 9.18 |
| 110 | 20.32 | | |
| 129 | | 22.41 | |
| 140 | | | 19.90 |
| 159 | 25.77 | | |
| 170 | | 27.82 | |
| 194 | | | 27.25 |
| 222 | 29.37 | | |

TABLE 11

Oxygen Transmission Rate (OTR) for Polymer Blend 9.
Polymer Blend 9

| Days since blowing | OTR (μl/day) | | |
|---|---|---|---|
| | Bottle 1 | Bottle 2 | Bottle 3 |
| 12 | 4.62 | | |
| 14 | | 8.96 | |
| 14 | | | 7.08 |
| 23 | 0.85 | | |
| 28 | | 4.90 | |
| 33 | | | 2.72 |
| 38 | 0.48 | | |
| 42 | | 3.15 | |
| 49 | | | 4.08 |
| 58 | 6.84 | | |
| 63 | | 11.19 | |
| 68 | | | 10.77 |
| 73 | 8.30 | | |
| 77 | | 16.59 | |
| 82 | | | 16.67 |
| 87 | 16.19 | | |
| 94 | | 23.78 | |
| 98 | | | 21.67 |
| 110 | 25.11 | | |
| 129 | | 29.72 | |
| 145 | | | 29.86 |
| 159 | 30.26 | | |
| 170 | | 32.27 | |
| 194 | | | 32.43 |
| 217 | 32.87 | | |
| 227 | 33.64 | | |

TABLE 12

Oxygen Transmission Rate (OTR) for Polymer Blend 10.
Polymer Blend 10

| Days since blowing | OTR (μl/day) | | |
|---|---|---|---|
| | Bottle 1 | Bottle 2 | Bottle 3 |
| 12 | 1.05 | | |
| 14 | | | 0.94 |
| 14 | | 0.85 | |
| 23 | 0.36 | | |
| 28 | | 0.58 | |
| 33 | | | 0.69 |
| 38 | 0.17 | | |
| 42 | | 1.41 | |
| 52 | | | 2.88 |
| 58 | 3.00 | | |
| 63 | | 8.79 | |
| 68 | | | 8.73 |
| 73 | 3.83 | | |
| 77 | | 14.90 | |
| 82 | | | 14.54 |
| 89 | 14.50 | | |
| 94 | | 22.64 | |
| 98 | | | 19.81 |
| 110 | 23.55 | | |
| 129 | | 28.27 | |
| 145 | | | 27.90 |
| 159 | 28.47 | | |
| 170 | | 30.28 | |
| 194 | | | 30.54 |
| 217 | 30.98 | | |
| 227 | 32.01 | | |

TABLE 13

Oxygen Transmission Rate (OTR) for Comparative Polymer Blend 11.
Polymer Blend 11 (Comparative)

| Days since blowing | OTR (μl/day) | | |
|---|---|---|---|
| | Bottle 1 | Bottle 2 | Bottle 3 |
| 10 | 1.60 | | |
| 12 | | 2.57 | |
| 14 | | | 1.53 |
| 20 | 1.32 | | |
| 23 | | 0.67 | |
| 33 | | | 0.67 |
| 35 | 0.73 | | |
| 40 | | 0.40 | |
| 45 | | | 0.51 |
| 55 | 0.89 | | |
| 61 | | 1.60 | |
| 66 | | | 1.96 |
| 70 | 2.26 | | |
| 75 | | 4.37 | |
| 80 | | | 4.50 |
| 84 | 5.89 | | |
| 91 | | 6.04 | |
| 96 | | | 8.52 |
| 101 | 11.70 | | |
| 119 | | 18.53 | |
| 138 | | | 23.97 |
| 152 | 26.44 | | |
| 166 | | 26.78 | |
| 187 | | | 30.10 |
| 208 | 30.78 | | |
| 248 | | 31.72 | |

TABLE 14

Oxygen Transmission Rate (OTR) for Comparative Polymer Blend 12.
Polymer Blend 12 (Comparative)

| Days since blowing | OTR (μl/day) | | |
|---|---|---|---|
| | Bottle 1 | Bottle 2 | Bottle 3 |
| 10 | 6.12 | | |
| 12 | | 11.74 | |
| 14 | | | 4.03 |
| 20 | 17.37 | | |
| 28 | | 14.18 | |
| 33 | | | 15.96 |
| 35 | 22.54 | | |
| 42 | | 17.57 | |
| 49 | | | 20.30 |
| 55 | 21.48 | | |
| 61 | | 12.07 | |
| 66 | | | 15.36 |
| 70 | 15.97 | | |
| 77 | | 4.03 | |
| 82 | | | 10.30 |
| 87 | 10.38 | | |
| 91 | | 2.75 | |
| 96 | | | 8.80 |
| 101 | 8.99 | | |
| 124 | | 12.47 | |
| 140 | | | 17.11 |
| 154 | 20.59 | | |
| 168 | | 22.70 | |
| 187 | | | 30.00 |
| 208 | 31.42 | | |

TABLE 15

Oxygen Transmission Rate (OTR) for Comparative Polymer Blend 13.
Polymer Blend 13 (Comparative)

| Days since blowing | OTR (μl/day) | | |
|---|---|---|---|
| | Bottle 1 | Bottle 2 | Bottle 3 |
| 12 | 3.26 | | |
| 14 | | 5.08 | |
| 14 | | | 1.21 |
| 23 | 2.82 | | |
| 28 | | 4.41 | |
| 35 | | | 2.75 |
| 38 | 1.76 | | |
| 45 | | 2.83 | |
| 52 | | | 1.08 |
| 58 | 4.39 | | |
| 63 | | 3.87 | |
| 68 | | | 4.57 |
| 73 | 5.06 | | |
| 77 | | 8.28 | |
| 84 | | | 8.68 |
| 89 | 14.10 | | |
| 94 | | 16.66 | |
| 98 | | | 14.12 |
| 115 | 22.42 | | |
| 129 | | 25.44 | |
| 147 | | | 28.31 |
| 159 | 29.80 | | |
| 170 | | 30.99 | |
| 201 | | | 32.46 |
| 217 | 33.43 | | |
| 232 | 34.59 | | |

TABLE 16

Oxygen Transmission Rate Fit Parameters

| Polymer Blend | Bottle | Theta 1 | Theta 2 | Theta 3 | Theta 4 | Days to 5 uL/day |
|---|---|---|---|---|---|---|
| 1 | 1 | 0.5 | 32.0 | −0.055 | 107 | 74.4 |
| 1 | 2 | 0.5 | 31.0 | −0.058 | 106 | 75.8 |
| 1 | 3 | 0.5 | 31.0 | −0.052 | 103 | 69.3 |
| 2 | 1 | 0.5 | 31.0 | −0.050 | 98 | 62.9 |
| 2 | 2 | 0.5 | 31.0 | −0.045 | 90 | 51.0 |
| 2 | 3 | 0.5 | 31.5 | −0.053 | 94 | 60.5 |
| 3 | 1 | 0.5 | 31.0 | −0.057 | 103 | 72.2 |
| 3 | 2 | 0.5 | 32.0 | −0.050 | 90 | 54.2 |
| 3 | 3 | 0.5 | 31.0 | −0.057 | 97 | 66.2 |
| 4 | 1 | 0.5 | 30.5 | −0.057 | 109 | 78.6 |
| 4 | 2 | 0.5 | 32.0 | −0.050 | 109 | 73.2 |
| 4 | 3 | 0.5 | 30.5 | −0.045 | 116 | 77.5 |
| 5 | 1 | 0.5 | 30.5 | −0.063 | 92 | 64.5 |
| 5 | 2 | 0.5 | 31.0 | −0.061 | 91.5 | 62.7 |
| 5 | 3 | 0.5 | 30.5 | −0.055 | 100 | 68.5 |
| 6 | 1 | 0.5 | 29.0 | −0.050 | 125 | 91.5 |
| 6 | 2 | 0.4 | 29.0 | −0.045 | 112 | 75.3 |
| 6 | 3 | 0.5 | 29.5 | −0.055 | 107 | 76.2 |
| 7 | 1 | 0.5 | 30.5 | −0.050 | 118 | 83.3 |
| 7 | 2 | 0.4 | 30.0 | −0.060 | 115 | 86.8 |
| 7 | 3 | 0.5 | 30.5 | −0.046 | 120 | 81.9 |
| 8 | 1 | 0.5 | 30.5 | −0.060 | 100 | 71.1 |
| 8 | 2 | 0.4 | 30.0 | −0.050 | 105 | 71.1 |
| 8 | 3 | 0.5 | 30.5 | −0.046 | 120 | 81.9 |
| 9 | 1 | 0.5 | 32.0 | −0.060 | 85 | 55.1 |
| 9 | 2 | 0.4 | 32.5 | −0.060 | 75 | 45.2 |
| 9 | 3 | 0.5 | 32.5 | −0.055 | 82 | 49.1 |
| 10 | 1 | 0.5 | 31.0 | −0.065 | 93 | 66.0 |
| 10 | 2 | 0.4 | 32.0 | −0.065 | 80 | 52.8 |
| 10 | 3 | 0.5 | 31.0 | −0.060 | 86 | 56.8 |
| 11 | 1 | 0.5 | 31.0 | −0.054 | 114 | 81.5 |
| 11 | 2 | 0.5 | 31.0 | −0.052 | 114 | 80.3 |
| 11 | 3 | 0.5 | 31.0 | −0.050 | 114 | 78.9 |
| 12 | 1 | | | | | |
| 12 | 2 | | | | | |
| 12 | 3 | | | | | |
| 13 | 1 | 0.5 | 32.5 | −0.050 | 98 | 61.8 |
| 13 | 2 | 0.4 | 33.0 | −0.050 | 98 | 61.9 |
| 13 | 3 | 0.5 | 33.0 | −0.050 | 105 | 68.4 |

Example 2

Polymer Blends 14-19 were prepared using melt-phase-only PET polymers PET-14 through PET 19, respectively, comprising a Li/Al/P catalyst system as described for Polymer Blend-1 of Example 1. Polymer Blends 20, 21, and 22 were each prepared as controls and comprised PET-11, -12, and -13, respectively, as described in Example 1.

PET-14 through PET-19 were PET copolymers containing residues of terephthalic acid, ethylene glycol, and isophthalic acid, with isophthalic acid residues representing about 2.9 mole % of the dicarboxylic acid residues. Each of copolyesters PET-1 through PET-10 were prepared by means of a melt-phase-only PET polymerization process using a Li/Al/P catalyst system comprising about 9 to about 14 ppm Li, about 11 to about 19 ppm Al, and about 22 to about 70 ppm phosphorus. The melt-phase-only PET polymers PET-14 through PET-19 were prepared by melt polymerizing the dicarboxylic acids and diol residues in the presence of the aluminum and lithium catalysts, reheat additive, and toners to the intrinsic viscosities as set forth in Table 16, after which phosphorus was added to the molten polyester polymers, and the polymer melts were then solidified and pelletized. Metal quantities were determined by Inductively Coupled Plasma Optical Emission Spectroscopy (ICP) and are also set forth in Table 17 for PET-14 through PET-19.

Polymer Blends 14 through 22

Polymer Blends-14 through -19 and corresponding samples for evaluating OTR were prepared as described for Polymer Blend-1 above using PET-14 through PET-19, respectively. Likewise, Polymer Blends-20 through -22 were prepared using PET-11 through -13. Metal analyses and intrinsic viscosities for Polymer Blends-14 through -22 are reported in Table 17.

Polymer Blends 14-22 were blended, molded into preforms, blown into bottles, and tested for oxygen transmission rate (OTR) as described above in Example 1 for approximately 155 days. The OTR results for each set of three bottles are plotted in FIGS. 14-22, respectively, and each set of data corresponding to a single bottle has a non-linear curve superimposed over the OTR data. The corresponding coefficients of Eqn. 1 relating the y-coordinate (i.e., the OTR) to the x-coordinate (i.e., Days-since-blowing) for the non-linear curves corresponding to Polymer Blends-14 through -22 are reported in Table 27. Comparative Polymer Blend-21 is exemplary of a polymer blend comprising a PET polymer that does not exhibit adequate oxygen scavenging (i.e., never achieves an OTR less than 5 µl/day ) and as such, is not mathematically modeled.

The OTR results again show that the Li/Al-catalyzed resins perform comparable to or better than Comparative Polymer Blends-20 and -22 and are much better than Comparative Polymer Blend 21.

TABLE 17

Metals Analyses and Intrinsic Viscosity (It.V.) or PET-1 through -13.

| PET | Li [ppm] | Al [ppm] | P [ppm] | Sb | Mn | Ti | Zn | Ih.V | It.V |
|---|---|---|---|---|---|---|---|---|---|
| 14 | 14 | 15 | 70 | | | | | 0.83 | 0.88 |
| 15 | 12 | 15 | 34 | | | | | 0.78 | 0.82 |
| 16 | 10 | 12 | 62 | | | | | 0.74 | 0.78 |
| 17 | 9 | 11 | 22 | | | | | 0.81 | 0.86 |
| 18 | 14 | 19 | 70 | | | | | 0.79 | 0.83 |
| 19 | 8 | 10 | 51 | | | | | 0.81 | 0.86 |
| 20 (comp) | | | 25 | 250 | | | | | 0.84 |
| 21 (comp) | | | 85-95 | 210-240 | 85-95 | 15-25 | | | 0.78-0.82 |
| 22 (comp) | | | 45-55 | 215-245 | | | 60-70 | | 0.76-0.80 |

TABLE 18

Oxygen Transmission Rate (OTR) for Polymer Blend 14.
Polymer Blend 14

| Days since blowing | OTR (µl/day) | | |
|---|---|---|---|
| | Bottle 1 | Bottle 2 | Bottle 3 |
| 14 | 0.72 | | |
| 16 | | 0.69 | |
| 19 | | | 0.77 |

TABLE 18-continued

Oxygen Transmission Rate (OTR) for Polymer Blend 14.
Polymer Blend 14

| Days since blowing | OTR (µl/day) | | |
|---|---|---|---|
| | Bottle 1 | Bottle 2 | Bottle 3 |
| 21 | 0.57 | | |
| 26 | | 0.60 | |
| 28 | | | 0.59 |
| 33 | 0.45 | | |
| 35 | | 0.46 | |
| 42 | | | 0.85 |
| 44 | 0.34 | | |
| 49 | | 0.54 | |
| 51 | | | 0.94 |
| 54 | 0.61 | | |
| 61 | | 0.91 | |
| 65 | | | 1.73 |
| 68 | 1.79 | | |
| 72 | | 1.59 | |
| 77 | | | 8.25 |
| 84 | 5.04 | | |
| 91 | | 7.93 | |
| 98 | | | 16.10 |
| 107 | 11.37 | | |
| 114 | | 14.96 | |
| 128 | | | 23.37 |
| 135 | 20.35 | | |
| 142 | | 23.12 | |
| 156 | | | 26.37 |

TABLE 19

Oxygen Transmission Rate (OTR) for Polymer Blend 15.
Polymer Blend 15

| Days since blowing | OTR (µl/day) | | |
|---|---|---|---|
| | Bottle 1 | Bottle 2 | Bottle 3 |
| 14 | 0.90 | | |
| 16 | | 0.93 | |
| 19 | | | 0.66 |

TABLE 19-continued

Oxygen Transmission Rate (OTR) for Polymer Blend 15.
Polymer Blend 15

| Days since blowing | OTR (μl/day) Bottle 1 | Bottle 2 | Bottle 3 |
|---|---|---|---|
| 23 | 0.69 | | |
| 26 | | 0.67 | |
| 28 | | | 0.48 |
| 33 | 0.43 | | |
| 35 | | 0.45 | |
| 42 | | | 0.92 |
| 44 | 0.53 | | |
| 49 | | 0.88 | |
| 51 | | | 0.61 |
| 54 | 2.59 | | |
| 61 | | 1.53 | |
| 65 | | | 1.32 |
| 71 | 9.03 | | |
| 72 | | 2.96 | |
| 79 | | | 5.38 |
| 84 | 13.29 | | |
| 93 | | 10.44 | |
| 100 | | | 14.13 |
| 107 | 19.81 | | |
| 114 | | 19.40 | |
| 128 | | | 22.76 |
| 140 | 26.24 | | |
| 149 | | 25.26 | |
| 156 | | | 26.04 |

TABLE 20

Oxygen Transmission Rate (OTR) for Polymer Blend 16.
Polymer Blend 16

| Days since blowing | OTR (μl/day) Bottle 1 | Bottle 2 | Bottle 3 |
|---|---|---|---|
| 14 | 0.27 | | |
| 16 | | 0.97 | |
| 19 | | | 0.71 |
| 23 | 0.75 | | |
| 26 | | 0.73 | |
| 30 | | | 0.50 |
| 33 | 0.67 | | |
| 35 | | 0.58 | |
| 42 | | | 0.50 |
| 47 | 0.73 | | |
| 49 | | 0.63 | |
| 51 | | | 0.61 |
| 54 | 1.06 | | |
| 61 | | 1.50 | |
| 65 | | | 1.48 |
| 71 | 4.53 | | |
| 74 | | 3.10 | |
| 79 | | | 4.75 |
| 86 | 6.45 | | |
| 93 | | 8.30 | |
| 100 | | | 11.54 |
| 107 | 11.96 | | |
| 114 | | 15.86 | |
| 133 | | | 21.60 |
| 140 | 22.10 | | |
| 149 | | 24.41 | |
| 156 | | | 25.10 |

TABLE 21

Oxygen Transmission Rate (OTR) for Polymer Blend 17.
Polymer Blend 17

| Days since blowing | OTR (μl/day) Bottle 1 | Bottle 2 | Bottle 3 |
|---|---|---|---|
| 14 | 0.89 | | |
| 16 | | 0.69 | |
| 21 | | | 0.55 |
| 23 | 0.55 | | |
| 28 | | 0.49 | |
| 30 | | | 0.40 |
| 33 | 0.46 | | |
| 40 | | 0.47 | |
| 42 | | | 1.20 |
| 47 | 0.38 | | |
| 49 | | 1.02 | |
| 56 | 1.65 | | |
| 58 | | | 1.09 |
| 63 | | 4.86 | |
| 65 | | | 3.31 |
| 71 | 6.22 | | |
| 74 | | 7.23 | |
| 79 | | | 7.04 |
| 86 | 10.39 | | |
| 93 | | 14.88 | |
| 100 | | | 16.72 |
| 107 | 18.09 | | |
| 114 | | 21.79 | |
| 133 | | | 25.69 |
| 140 | 25.91 | | |
| 149 | | 27.27 | |
| 156 | | | 27.80 |

TABLE 22

Oxygen Transmission Rate (OTR) for Polymer Blend 18.
Polymer Blend 18

| Days since blowing | OTR (μl/day) Bottle 1 | Bottle 2 | Bottle 3 |
|---|---|---|---|
| 14 | 0.81 | | |
| 16 | | 0.93 | |
| 21 | | | 0.69 |
| 23 | 0.63 | | |
| 28 | | 0.77 | |
| 30 | | | −0.13 |
| 35 | 0.47 | | |
| 40 | | 0.65 | |
| 44 | | | 0.48 |
| 47 | 0.72 | | |
| 51 | | | 1.27 |
| 56 | 3.10 | | |
| 58 | | | 0.97 |
| 63 | | 3.36 | |
| 68 | | | 3.84 |
| 72 | 4.87 | | |
| 74 | | 6.86 | |
| 79 | | | 5.67 |
| 89 | 13.14 | | |
| 93 | | 14.23 | |
| 105 | | | 18.33 |
| 112 | 21.41 | | |
| 126 | | 24.65 | |
| 133 | | | 23.69 |
| 142 | 26.66 | | |
| 154 | | 28.30 | |

TABLE 23

Oxygen Transmission Rate (OTR) for Polymer Blend 19. Polymer Blend 19

| Days since blowing | OTR (µl/day) Bottle 1 | Bottle 2 | Bottle 3 |
|---|---|---|---|
| 14 | 0.88 | | |
| 19 | | 1.04 | |
| 21 | | | 0.57 |
| 23 | 0.70 | | |
| 28 | | 0.66 | |
| 30 | | | 0.42 |
| 35 | 0.63 | | |
| 40 | | 0.44 | |
| 44 | | | 0.34 |
| 47 | 0.40 | | |
| 51 | | 0.70 | |
| 56 | 1.43 | | |
| 58 | | | 0.56 |
| 63 | | 2.46 | |
| 68 | | | 1.74 |
| 72 | 1.82 | | |
| 77 | | 7.41 | |
| 79 | | | 2.86 |
| 89 | 9.14 | | |
| 98 | | 15.13 | |
| 105 | | | 13.30 |
| 112 | 17.40 | | |
| 126 | | 22.74 | |
| 135 | | | 21.16 |
| 142 | 23.85 | | |
| 154 | | 26.23 | |

TABLE 24

Oxygen Transmission Rate (OTR) for Polymer Blend 20. Polymer Blend 20 (Comparative)

| Days since blowing | OTR (µl/day) Bottle 1 | Bottle 2 | Bottle 3 |
|---|---|---|---|
| 14 | 0.79 | | |
| 16 | | 1.95 | |
| 21 | | | 0.85 |
| 23 | 0.47 | | |
| 28 | | 1.34 | |
| 30 | | | 2.14 |
| 35 | 0.46 | | |
| 40 | | 0.53 | |
| 44 | | | 0.35 |
| 47 | 0.30 | | |
| 51 | | 0.41 | |
| 56 | 0.37 | | |
| 58 | | | 0.34 |
| 63 | | 1.57 | |
| 65 | | | 0.73 |
| 72 | 0.34 | | |
| 74 | | 0.92 | |
| 79 | | | 2.09 |
| 89 | 5.33 | | |
| 93 | | 4.07 | |
| 100 | | | 9.10 |
| 112 | 14.36 | | |
| 126 | | 21.99 | |
| 133 | | | 25.96 |
| 140 | 22.92 | | |
| 149 | | 25.49 | |

TABLE 25

Oxygen Transmission Rate (OTR) for Polymer Blend 21. Polymer Blend 21 (Comparative)

| Days since blowing | OTR (µl/day) Bottle 1 | Bottle 2 | Bottle 3 |
|---|---|---|---|
| 14 | 13.02 | | |
| 16 | | 16.84 | |
| 21 | 16.12 | | |
| 23 | | | 16.65 |
| 26 | | 12.55 | |
| 28 | | | 16.45 |
| 33 | 21.81 | | |
| 35 | | 17.92 | |
| 40 | | | 26.35 |
| 44 | 23.14 | | |
| 49 | | 21.44 | |
| 51 | | | 26.94 |
| 56 | | 20.96 | |
| 58 | 22.10 | | |
| 65 | | | 26.71 |
| 68 | 23.25 | | |
| 72 | | 17.46 | |
| 77 | | | 26.23 |
| 84 | 22.02 | | |
| 91 | | 16.49 | |
| 98 | | | 26.09 |
| 105 | 20.64 | | |
| 114 | | 15.29 | |
| 128 | | | 26.85 |
| 135 | | | |
| 142 | | 22.25 | |
| 154 | | | 28.11 |

TABLE 26

Oxygen Transmission Rate (OTR) for Polymer Blend 22. Polymer Blend 22 (Comparative)

| Days since blowing | OTR (µl/day) Bottle 1 | Bottle 2 | Bottle 3 |
|---|---|---|---|
| 14 | 5.94 | | |
| 19 | | 4.52 | |
| 21 | | | 2.98 |
| 26 | 2.27 | | |
| 28 | | 3.19 | |
| 30 | | | 9.51 |
| 35 | 2.36 | | |
| 40 | | 1.76 | |
| 44 | | | 3.72 |
| 47 | 0.48 | | |
| 51 | | 0.68 | |
| 56 | 1.41 | | |
| 58 | | | 1.37 |
| 63 | | 3.05 | |
| 68 | | | 4.07 |
| 72 | 1.93 | | |
| 77 | | 7.55 | |
| 79 | | | 6.27 |
| 91 | 13.12 | | |
| 98 | | 15.39 | |
| 105 | | | 18.99 |
| 112 | 20.83 | | |
| 126 | | 24.05 | |
| 135 | | | 27.00 |
| 142 | 26.82 | | |
| 154 | | 28.73 | |

TABLE 27

Oxygen Transmission Rate Fit Parameters

| Polymer Blend | Bottle | Theta 1 | Theta 2 | Theta 3 | Theta 4 | Days to 5 uL/day |
|---|---|---|---|---|---|---|
| 14 | 1 | 0.5 | 27.0 | −0.055 | 112 | 83.1 |
| 14 | 2 | 0.5 | 27.0 | −0.055 | 110 | 81.1 |
| 14 | 3 | 0.5 | 26.5 | −0.075 | 93 | 72.1 |
| 15 | 1 | 0.5 | 27.0 | −0.065 | 85 | 60.6 |
| 15 | 2 | 0.5 | 26.5 | −0.065 | 100 | 75.9 |
| 15 | 3 | 0.5 | 26.5 | −0.068 | 100 | 77.0 |
| 16 | 1 | 0.5 | 28.0 | −0.050 | 113 | 80.4 |
| 16 | 2 | 0.5 | 27.0 | −0.057 | 108 | 80.2 |
| 16 | 3 | 0.5 | 27.0 | −0.060 | 107 | 80.6 |
| 17 | 1 | 0.5 | 28.0 | −0.055 | 97 | 67.3 |
| 17 | 2 | 0.5 | 28.0 | −0.060 | 93 | 65.8 |
| 17 | 3 | 0.5 | 28.3 | −0.065 | 96 | 70.7 |
| 18 | 1 | 0.5 | 28.0 | −0.063 | 93 | 67.1 |
| 18 | 2 | 0.5 | 29.0 | −0.061 | 95 | 67.6 |
| 18 | 3 | 0.5 | 26.0 | −0.075 | 96 | 75.5 |
| 19 | 1 | 0.5 | 26.0 | −0.063 | 101 | 76.5 |
| 19 | 2 | 0.5 | 27.0 | −0.063 | 95 | 69.8 |
| 19 | 3 | 0.5 | 26.0 | −0.065 | 108 | 84.3 |
| 20 | 1 | 0.5 | 27.0 | −0.063 | 111 | 85.8 |
| 20 | 2 | 0.5 | 27.0 | −0.090 | 110 | 92.4 |
| 20 | 3 | 0.5 | 28.0 | −0.080 | 108 | 87.6 |
| 21 | 1 | | | | | |
| 21 | 2 | | | | | |
| 21 | 3 | | | | | |
| 22 | 1 | 0.5 | 28.0 | −0.070 | 95 | 71.7 |
| 22 | 2 | 0.5 | 29.5 | −0.063 | 96 | 69.1 |
| 22 | 3 | 0.5 | 29.5 | −0.070 | 96 | 71.8 |

We claim:

1. A polymer blend having oxygen scavenging activity, comprising:
   one or more polybutadiene homopolymers or copolymers having at least one functionality capable of entering into condensation reactions;
   one or more polyethylene terephthalate homopolymers or copolymers obtained using a catalyst system comprising:
      aluminum atoms in an amount from about 3 ppm to about 100 ppm, and
      one or more alkaline earth metal atoms, alkali metal atoms, or alkali compound residues in an amount from about 1 ppm to about 25 ppm,
   in each case based on the weight of the one or more polyethylene terephthalate homopolymers or copolymers; and
      one or more transition metal atoms in an amount from about 10 ppm to about 1,000 ppm metal, based on the total weight of the polymer blend.

2. The polymer blend of claim 1, wherein the one or more polybutadiene homopolymers or copolymers are present in an amount from about 0.01 wt % to about 5 wt %, based on the total weight of the polymer blend.

3. The polymer blend of claim 1, wherein the one or more polybutadiene homopolymers or copolymers are present in an amount from about 0.1 wt % to about 1 wt %, based on the total weight of the polymer blend.

4. The polymer blend of claim 1, wherein the one or more polybutadiene homopolymers or copolymers are provided with an average of at least two functionalities capable of entering into polycondensation reactions.

5. The polymer blend of claim 1, wherein the functionality capable of entering into polycondensation reactions comprises hydroxyl functionality.

6. The polymer blend of claim 1, wherein the weight average molecular weight of the one or more polybutadiene homopolymers or copolymers is from about 100 to about 10,000.

7. The polymer blend of claim 1, wherein the weight average molecular weight of the one or more polybutadiene homopolymers or copolymers is from 1,000 to 3,000.

8. The polymer blend of claim 1, wherein the one or more polybutadiene homopolymers or copolymers are provided as a copolycondensate comprising the reaction product of one or more polyethylene terephthalate homopolymers or copolymers, and the one or more polybutadiene homopolymers or copolymers.

9. The polymer blend of claim 1, wherein the one or more polyethylene terephthalate homopolymers or copolymers comprise:
   a carboxylic acid component comprising at least about 80 mole % residues of terephthalic acid, based on the total amount of carboxylic acids comprising 100 mole %; and
   a hydroxyl component comprising at least about 80 mole % residues of ethylene glycol, based on the total amount of hydroxyl components comprising 100 mole %.

10. The polymer blend of claim 1, wherein the one or more polyethylene terephthalate homopolymers or copolymers have an It.V. of at least about 0.72 dL/g obtained by a melt-phase-only polymerization process.

11. The polymer blend of claim 1, wherein the one or more polyethylene terephthalate homopolymers or copolymers have an It.V. of at least 0.80 dL/g obtained by a melt-phase-only polymerization process.

12. The polymer blend of claim 1, wherein the one or more polyethylene terephthalate homopolymers or copolymers have an It.V. of at least about 0.84 dL/g obtained by a melt-phase-only polymerization process.

13. The polymer blend of claim 1, wherein the aluminum atoms are present in an amount from about 5 ppm to about 25 ppm, based on the weight of the one or more polyethylene terephthalate homopolymers or copolymers.

14. The polymer blend of claim 1, wherein the one or more alkaline earth metal atoms, alkali metal atoms, or alkali compound residues comprise sodium atoms.

15. The polymer blend of claim 1, wherein the one or more alkaline earth metal atoms, alkali metal atoms, or alkali compound residues comprise lithium atoms.

16. The polymer blend of claim 1, wherein the aluminum atoms are provided as one or more aluminum compounds having at least one organic substituent.

17. The polymer blend of claim 1, wherein the one or more polyethylene terephthalate homopolymers or copolymers are made without the addition of any catalyst metal atoms other than the aluminum atoms and the one or more of alkaline earth metal atoms, alkali metal atoms, or alkali compound residues comprising lithium atoms, sodium atoms, or potassium atoms.

18. The polymer blend of claim 1, wherein the blend has a degree of crystallinity of at least 30%, an AA generation rate of 20 ppm or less, an L* of at least 60, and an It.V. of at least 0.72 dL/g obtained by a melt-phase polymerization process.

19. The polymer blend of claim 1, wherein the blend is in the form of a bottle preform.

20. The polymer blend of claim 1, wherein:
   the aluminum atoms are present in an amount from 5 ppm to 60 ppm, based on the weight of the one or more polyethylene terephthalate homopolymers or copolymers, and
   the one or more alkaline earth metal atoms, alkali metal atoms, or alkali compound residues comprise one or more of: lithium atoms, sodium atoms, or potassium atoms.

21. The polymer blend of claim 20, wherein the one or more alkaline earth metal atoms, alkali metal atoms, or alkali compound residues comprise lithium atoms, sodium atoms, potassium atoms, or mixture thereof present in a molar ratio to aluminum atoms within a range of about 0.5 to about 10.

22. The polymer blend of claim 1, wherein the one or more polyethylene terephthalate homopolymers or copolymers further comprise residues of a catalyst deactivator.

23. The polymer blend of claim 22, wherein the catalyst deactivator comprises phosphorus atoms.

24. The polymer blend of claim 22, wherein the catalyst deactivator comprises one or more of: phosphoric acid, phosphorous acid, polyphosphoric acid, pyrophosphoric acid, carboxyphosphonic acids, or phosphonic acid derivatives, or each of their salts, esters, or derivatives.

25. The polymer blend of claim 22, wherein the catalyst deactivator comprises phosphorus atoms present in an amount such that a molar ratio of phosphorus atoms to the total moles of aluminum atoms and one or more alkaline earth metal atoms or alkali metal atoms is about 0.5 to about 1.5.

* * * * *